(12) United States Patent
Hieke et al.

(10) Patent No.: US 10,533,760 B2
(45) Date of Patent: Jan. 14, 2020

(54) METHODS AND FUNCTIONAL ELEMENTS FOR ENHANCED THERMAL MANAGEMENT OF PREDOMINANTLY ENCLOSED SPACES

(71) Applicants: Andreas Hieke, San Mateo, CA (US); William Boone Daniels, II, Marikina (PH)

(72) Inventors: Andreas Hieke, San Mateo, CA (US); William Boone Daniels, II, Marikina (PH)

(*) Notice: Subject to any disclaimer, the term of this patent is extended or adjusted under 35 U.S.C. 154(b) by 112 days.

(21) Appl. No.: 15/209,444

(22) Filed: Jul. 13, 2016

(65) Prior Publication Data
US 2016/0320073 A1 Nov. 3, 2016

Related U.S. Application Data

(62) Division of application No. 14/958,494, filed on Dec. 3, 2015.
(Continued)

(51) Int. Cl.
*F24F 5/00* (2006.01)
*F24S 10/00* (2018.01)
(Continued)

(52) U.S. Cl.
CPC ............ *F24F 5/0046* (2013.01); *F24D 3/005* (2013.01); *F24D 3/14* (2013.01); *F24D 11/00* (2013.01);
(Continued)

(58) Field of Classification Search
CPC ........ F24F 5/0046; F24F 5/0017; F24F 11/62; F24F 11/30; F24F 11/46; E04B 1/74;
(Continued)

(56) References Cited

U.S. PATENT DOCUMENTS 3,897,820 A 8/1975 Teeter
3,948,314 A 4/1976 Creswick et al.
(Continued)

FOREIGN PATENT DOCUMENTS

WO WO 2017/002295 1/2017

OTHER PUBLICATIONS

Horvath H., "Gustav Mie and the scattering and absorption of light by particles: Historic developments and basics", J Quantit Spectros Radiative Transfer (2009) 110: 787-799.
(Continued)

*Primary Examiner* — Travis C Ruby
(74) *Attorney, Agent, or Firm* — Knobbe, Martens, Olson & Bear, LLP

(57) ABSTRACT

A method of modulating the impact of electromagnetic irradiance on the thermal energy budget of a predominantly enclosed space includes providing at least an inner shell of the predominantly enclosed space, and placing a plurality of functional elements in an exterior position relative to an outside facing side of the inner shell. The outside facing surfaces of the functional elements have higher reflectivity in the visible (VIS) and near infrared (NIR) wavelength range relative to the (MIR) wavelength range. The inside facing surfaces of the functional elements have higher reflectivity in the NIR and mid-infrared (MIR) wavelength range relative to the (VIS) wavelength range. A thickness of the functional elements is equal to or smaller than a thickness of the inner shell.

30 Claims, 16 Drawing Sheets

US 10,533,760 B2
Page 2

Related U.S. Application Data

(60) Provisional application No. 62/088,067, filed on Dec. 5, 2014.

(51) Int. Cl.
| | |
|---|---|
| *F24S 50/40* | (2018.01) |
| *F24F 13/32* | (2006.01) |
| *F28F 13/18* | (2006.01) |
| *F28F 23/00* | (2006.01) |
| *F24D 3/00* | (2006.01) |
| *F24D 3/14* | (2006.01) |
| *F24D 11/00* | (2006.01) |
| *F24D 19/10* | (2006.01) |
| *F24S 20/00* | (2018.01) |
| *F24S 20/66* | (2018.01) |

(52) U.S. Cl.
CPC ............ *F24D 19/10* (2013.01); *F24F 5/0017* (2013.01); *F24F 13/32* (2013.01); *F24S 10/00* (2018.05); *F24S 50/40* (2018.05); *F28F 13/18* (2013.01); *F28F 23/00* (2013.01); *F24F 2005/006* (2013.01); *F24F 2005/0025* (2013.01); *F24F 2005/0064* (2013.01); *F24F 2221/52* (2013.01); *F24S 20/66* (2018.05); *F24S 2020/12* (2018.05); *F24S 2020/14* (2018.05); *F24S 2020/15* (2018.05); *F24S 2020/16* (2018.05); *F28F 2245/06* (2013.01)

(58) Field of Classification Search
CPC ..... E04B 2001/7679; E04B 2001/7691; E04B 2001/925; E04H 9/16; F24D 3/005; F24D 3/14; F24D 11/00; F24D 19/10; F24D 13/32; F24J 2/04; F24J 2/0422; F24J 2/20; F24J 2/402; F24J 2/407; F24J 2/4647; F24J 2/485; F24J 2/0444; F24J 2002/0053; F24J 2002/0069; F24J 2002/0076; F24J 2002/0084; F28F 13/18; F28F 23/00; F28F 2130/20; F28F 2130/00; F28F 2130/10; F28F 2140/20; F28F 2005/0025; F28F 2005/006; F28F 2005/0064; F28F 2005/0082; F28F 2221/52; F28F 2245/06

See application file for complete search history.

(56) References Cited

U.S. PATENT DOCUMENTS

| | | | | |
|---|---|---|---|---|
| 4,212,289 | A * | 7/1980 | Hebert | F24J 2/0433 |
| | | | | 126/618 |
| 4,235,048 | A | 11/1980 | Gillery | |
| 4,249,340 | A | 2/1981 | Maes, Jr. | |
| 4,290,416 | A * | 9/1981 | Maloney | F24J 2/34 |
| | | | | 126/400 |
| 4,337,754 | A * | 7/1982 | Conger | F24J 2/0433 |
| | | | | 126/618 |
| 4,408,596 | A | 10/1983 | Worf | |
| 4,596,093 | A | 6/1986 | Esposito | |
| 5,314,027 | A | 5/1994 | Wood | |
| 5,675,487 | A | 10/1997 | Patterson et al. | |
| 6,220,339 | B1 | 4/2001 | Krecke | |
| 6,632,516 | B2 * | 10/2003 | Aanestad | B32B 5/18 |
| | | | | 428/304.4 |
| 6,786,056 | B2 | 9/2004 | Bash et al. | |
| 7,434,577 | B2 | 10/2008 | Doherty | |
| 7,610,910 | B2 * | 11/2009 | Ahmed | F24F 11/30 |
| | | | | 126/595 |
| 8,007,898 | B2 * | 8/2011 | Bailey | E04D 1/12 |
| | | | | 428/143 |
| 8,248,256 | B1 | 8/2012 | Gerardi et al. | |
| 8,289,160 | B1 | 10/2012 | Billman | |
| 8,689,490 | B2 * | 4/2014 | Sumner | E04D 1/28 |
| | | | | 126/622 |
| 9,303,930 | B2 | 4/2016 | Ishizaka | |
| 9,639,072 | B2 | 5/2017 | Burke | |
| 10,280,626 | B2 | 5/2019 | Hieke et al. | |
| 2007/0019199 | A1 | 1/2007 | Palmer et al. | |
| 2007/0199562 | A1 | 8/2007 | Doherty | |
| 2008/0000151 | A1 | 1/2008 | Houweling et al. | |
| 2008/0014857 | A1 | 1/2008 | Spadafora et al. | |
| 2008/0241262 | A1 | 10/2008 | Lee et al. | |
| 2009/0013596 | A1 | 1/2009 | Wang | |
| 2010/0170497 | A1 | 7/2010 | Glynn | |
| 2011/0111147 | A1 | 5/2011 | Agrawal et al. | |
| 2011/0223850 | A1 | 9/2011 | Narayanamurthy et al. | |
| 2012/0072032 | A1 | 3/2012 | Powell et al. | |
| 2012/0079833 | A1 * | 4/2012 | Rowe | G05D 23/192 |
| | | | | 62/3.1 |
| 2012/0087085 | A1 | 4/2012 | Moore et al. | |
| 2012/0325126 | A1 | 12/2012 | Tran et al. | |
| 2013/0192131 | A1 | 8/2013 | Abahusayn | |
| 2013/0193005 | A1 | 8/2013 | Hoeth | |
| 2013/0199772 | A1 | 8/2013 | Fischer et al. | |
| 2013/0340969 | A1 | 12/2013 | Vollen et al. | |
| 2014/0277765 | A1 | 9/2014 | Karimi et al. | |
| 2014/0339316 | A1 | 11/2014 | Barooah et al. | |
| 2015/0237812 | A1 | 8/2015 | Gupta | |
| 2015/0253401 | A1 | 9/2015 | Rapoport | |
| 2015/0330923 | A1 | 11/2015 | Smullin | |
| 2016/0053481 | A1 | 2/2016 | Hieke et al. | |
| 2016/0261116 | A1 | 9/2016 | Barooah et al. | |
| 2016/0320073 | A1 | 11/2016 | Hieke et al. | |
| 2016/0320080 | A1 | 11/2016 | Hieke et al. | |
| 2017/0059187 | A1 | 3/2017 | Smith | |
| 2017/0192442 | A1 | 7/2017 | Hieke et al. | |
| 2017/0205105 | A1 | 7/2017 | Adam et al. | |
| 2017/0211829 | A1 | 7/2017 | Slack et al. | |
| 2018/0252423 | A1 | 9/2018 | Hieke et al. | |
| 2018/0252424 | A1 | 9/2018 | Hieke et al. | |
| 2018/0252426 | A1 | 9/2018 | Hieke et al. | |
| 2018/0252427 | A1 | 9/2018 | Hieke et al. | |

OTHER PUBLICATIONS

Mie G., "Contributions to the optics of diffuse media, specifically colloidal metallic suspensions", Annalen der Physik, 4th series, vol. 25, (1908) No. 3, pp. 377-445.

International Search Report and Written Opinion dated Mar. 10, 2017 for Application No. PCT/US2016/66527, filed Dec. 14, 2016.

International Energy Agency. Key world energy statistics. OECD/IEA (2012) http://www.iea.org/publications/freepublications/publication/kwes.pdf.

UNEP. Sustainable buildings & climate initiative, building and climate change. United Nations Environment Program (2009).

Directive 2012/27/EU of the European Parliament and of the Council of Oct. 25, 2012 on energy efficiency, amending Directives 2009/125/EC and 2010/30/EU and repealing Directives 2004/8/EC and 2006/32/EC http://eurlex.europa.eu/LexUriServ/LexUriServ.do?uri=OJ:L:2012:315:0001:0056:EN:PDF.

William Chung, Review of building energy-use performance benchmarking methodologies, Appl. Energy (2011), vol. 88, issue 5, pp. 1470-1479.

National Renewable Energy Laboratory (NREL) htto://www.nrel.gov.

National Solar Radiation Database www.rredc.nrel.gov/solar/old_data.

W. M. Haynes, D. R. Lide, T. J. Bruno (Ed.), The CRC Handbook of Chemistry and Physics, CRC Press, Taylor & Francis Group, 2012, 93rd edition, ISBN 978-1-439-8049-4.

Frank Kreith (Ed.), The CRC Handbook of Thermal Engineering, CRC Press, Taylor & Francis Group, 2000, ISBN 978-0849395819.

D. Yogi Goswami and Frank Kreith (Ed.), Energy Management and Conservation Handbook, CRC Press, Taylor & Francis Group, 2007, ISBN 978-1-4200-4429-4.

Georg Joos (Ed.), Theoretical Physics (3rd edition), Dover Publications Inc., New York, 1986, ISBN 0-486-65227-0.

(56) References Cited

OTHER PUBLICATIONS

M. Santamouris; Cooling the cities—A review of reflective and green roof mitigation technologies to fight heat island and improve comfort in urban environments, Solar Energy 103 (2014) 682-703, http://dx.doi.org/10.1016/j.solener.2012.07.003.
Zhiyang Shi, Xiong Zhang; Analyzing the effect of the longwave emissivity and solar reflectance of building envelopes on energy-saving in buildings in various climates, Solar Energy 85 (2011) 28-37, doi:10.1016/j.solener.2010.11.009.
Paul Berdahl, Hashem Akbari, Ronnen Levinson, Jeffry Jacobs, Frank Klink, Rebecca Everman; Three-year weathering tests on asphalt shingles: Solar reflectance; Solar Energy Materials & Solar Cells 99 (2012) pp. 277-281.
PCT Search Report and Written Opinion for International Application no. PCT/US2015/63398, filed Dec. 2, 2015, dated Feb. 12, 2016.
Wikipedia—"Mie Scattering"; downloaded Jul. 19, 2018 in 9 pages.
Wikipedia—"Rayleigh Scattering"; downloaded Jul. 19, 2018 in 6 pages.

\* cited by examiner

METHODS AND FUNCTIONAL ELEMENTS FOR ENHANCED THERMAL MANAGEMENT OF PREDOMINANTLY ENCLOSED SPACES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The world's energy demand and consumption is rapidly growing. Price increases of energy from fossil resources and environmental concerns make high energy consumption problematic. The International Energy Agency (IEA) has published data on energy consumption trends. While the total primary energy supply (TPES) was doubled from 1973 to 2010 (from 6107 to 12,717 million tons of oil equivalent, MTOE) and crude oil production increased almost 40% (from 2869 to 4011 million tons), the total final energy consumption showed 31% increase (from 2815 to 3691 MTOE). In the last two decades the oil price has increased nearly five times. During the period of 1973-2010, the $CO_2$ emission was also doubled (from 15.637 to 30,326 million tons $CO_2$). These and additional details regarding energy consumption trends can be found, for example, in, International Energy Agency, Key world energy statistics, OECD/IEA (2012), http://www.iea.org/publications/freepublications/publication/kwes.pdf, the entirety of which is incorporated herein by reference. Currently, the energy used for heating or cooling of buildings constitutes a major part of the total global energy (40%) and water (25%) consumption. Buildings are the source of nearly one third of the greenhouse gas emission. These and additional details regarding energy consumption trends can be found, for example, in UNEP, Sustainable buildings & climate initiative, building and climate change, United Nations Environment Program (2009), the entirety of which is incorporated herein by reference. Therefore, buildings provide a substantial potential for reducing emission at relatively low cost.

The European Union's Energy Efficiency Directive (passed on 25 Oct. 2012) recognizes that " . . . the rate of building renovation needs to be increased, as the existing building stock represents the single biggest potential sector for energy savings. Moreover, buildings are crucial to achieving the Union's objective of reducing greenhouse gas emissions by 80-95% by 2050 compared to 1990." These and additional details regarding the European Union's Energy Efficiency Directive can be found, for example, in Directive 2012/27/EU of the European Parliament and of the Council of 25 Oct. 2012 on energy efficiency, amending Directives 2009/125/EC and 2010/30/EU and repealing Directives 2004/8/EC and 2006/32/EC, the entirety of which is incorporated herein by reference.

A second problematic aspect is the relative cost of energy. In most of the equatorial regions, where developing countries are predominantly located, the price for electricity compared to the average income is too high to permit 24/7 active air conditioning of most residential buildings.

Therefore, any design improvements to buildings which will noticeably lower indoor temperatures, especially during dry seasons—i.e., during periods of high solar radiation input, will considerably contribute to well-being and efficiency of its occupants. The disclosed invention enables, among other applications, the construction of new buildings and/or modifications to existing buildings, involving various functional elements and methods of operating them, which consume little or no energy, or where at least the costs for the required energy is small e.g. in comparison with costs associated with conventional active air conditioning.

If operating in conjunction with conventional active air conditioning, the energy requirements thereof are generally reduced. Obviously, such methods and functional elements can not only be beneficially applied in equatorial, tropical, and subtropical regions, but also e.g. in areas like the southwest of the Unites States, or central and southern parts of Europe during summer.

Description of the Related Art

Energy budget and temperature inside predominantly enclosed spaces, such as buildings or similar habitats, depends on several physical, climatic, and human variables. These and additional details regarding energy budget and temperature inside predominantly enclosed spaces can be found, for example, in William Chung, Review of building energy-use performance benchmarking methodologies, Appl. Energy (2011), vol. 88, issue 5, pages 1470-1479, the entirety of which is incorporated herein by reference. From a physical perspective this comprises, among other influences, at least the following: The levels of primary electromagnetic irradiance, reflective properties of surfaces, heat capacity and thermal conductivity of the used materials, spatial distribution of said materials, convective heat transfer, thermal radiation (which in turn depends on reflective and thus also emissive properties of surfaces), as well as resulting air flow in combination with externally imposed air flows.

A considerable portion of the energy, which contributes to temperatures inside predominantly enclosed spaces, can be the result of absorbed solar radiation by the building envelope. This effect typically dominates in tropical and subtropical regions, but it can also apply in moderate climate zones, for example, during summer or times of increased relative temperature (e.g., in North America, Central or Southern Europe, and Australia).

The relevant part of the electromagnetic spectrum can conceptually be divided in Ultraviolet (UV), visible (VIS) [≈0.38 μm-0.7 μm], Near Infrared (NIR) [0.7 μm-3.0 μm], Mid Infrared (MIR) [3 μm-50 μm], and Far Infrared (FIR) [50 μm to 1 mm]. The exact definition of the boundaries of NIR, MIR, and FIR are somewhat arbitrary and different values are used by different scientific communities. (For example, sometimes the NIR range is defined smaller and an additional Short Wavelength IR SWIR is defined.) For physical reasons (the corresponding black body temperatures) we will henceforth follow the values given above.

The disclosed invention relates in some embodiments to predominantly enclosed spaces, which are buildings, or other habitats, and which are exposed to electromagnetic radiation in the UV, VIS, NIR, MIR, and FIR range, including solar radiation. Unless explicitly excluded, the term 'light' shall henceforth be understood to apply for all of these spectral ranges, not only to the portion of the spectrum visible to humans.

We will subsequently consider reflectance and reflectivity to be synonymous, describing the ratio of reflected over incident electromagnetic power, and consider only this net result of returned vs. incoming radiation, independent of the thickness of any layer or layers (including interference layers, embedded nano- and/or microparticles or cavities) and/or of any bulk material, which may actually be responsible for the effect.

Furthermore, we will subsequently denote any type of relative heat capacity with a small c and the total heat capacity (in the context of buildings sometimes referred to a "thermal mass") of an object with capital C [J/K].

As is well know, we distinguish between molar heat capacity $c_n$ in [J/(mol·K)], i.e., heat capacity relative to the number of atoms or molecules, specific heat capacity $_m c_p$ in [J/(kg·K)], i.e., heat capacity relative to mass, and volumetric heat capacity $_v c_p$ in [J/(m³·K)] i.e., heat capacity relative to volume. Obviously, the volumetric heat capacity of a substance can be derived from its specific heat capacity by multiplying it with its density $\rho$ in [kg/m³]. These are isobaric heat capacity values, as indicated by the index p.

It is interesting to note that for most simple (monoatomic) solids the molar heat capacity is approximately constant, as expressed by Dulongs-Petit's law $$c_n \approx 3 \cdot R$$
$$\approx 3 \cdot 8.3 \text{ J}/(\text{mol} \cdot \text{K}) = 25 \text{ J}/(\text{mol} \cdot \text{K})$$

with R being the universal gas constant. There are of course significant differences with respect to specific and volumetric heat capacity.

A few practical values of material, which are relevant for buildings, shall serve as example:

TABLE 1

Density, specific and volumetric heat capacity of some materials and substances (typical values, given at T = 300 K and p = 100 kPa)

| | $\rho$ [kg/m³] | $_m c_p$ [kJ/ (kg · K)] | [kWh/ (kg · K)] | $_v c_p$ [kJ/ (m³ · K)] | [kWh/ (m³ · K)] |
|---|---|---|---|---|---|
| wood (pine, dry) | 500 | 2.1 | 0.58 10⁻³ | 1050 | 0.29 |
| concrete | 2,200 | 0.72 | 0.20 10⁻³ | 1600 | 0.44 |
| brick | 2,000 | 0.9 | 0.25 10⁻³ | 1800 | 0.50 |
| steel (SS310) | 7,800 | 0.48 | 0.13 10⁻³ | 3700 | 1.0 |
| air (dry) | 1.2 | 1.0 | 0.28 10⁻³ | 1.2 | 0.000, 33 |
| water | 1,000 | 4.2 | 1.2 10⁻³ | 4200 | 1.16 |

All given solid materials, specifically wood, steel and concrete, are being produced in a wide variety of specific forms, compositions, and qualities, and exhibit thus considerably different mechanical and thermal properties. The given numbers shall only serve to illustrate practically possible values and are rounded to 2 significant digits.

We give these values with energy expressed in kJ (=kWs) as well as kWh, which is very helpful to put it conceptually and practically in relation to the effort and expense related to heating and cooling.

The combined influence of thermal conductivity k in [W/(m·K)] and volumetric heat capacity $\rho \cdot c_p$ in [J/(m³·K)] is referred to as thermal inertia, or sometimes as thermal effusivity, and defined as $e = (k \cdot \rho \cdot c_p)^{0.5}$.

Predominantly enclosed spaces, such as conventional buildings, with immobile surface elements with constant surface and/or volumetric properties, i.e. surfaces and structural elements which do not dynamically change their orientation, reflective properties, or other caloric or thermal properties, result in a thermal behavior of the enclosed space, which is to a large part determined by (a) the (constant) spectral reflective properties of its surfaces, and (b) its (constant) total heat capacity, effectively integrating the absorbed portion of the incident electromagnetic power. In particular, the amplitude of temperature changes inside predominantly enclosed spaces, and their delay with respect changes of the irradiance, largely depends on the heat capacity of the structure (and thermal conductivity of the walls).

In general, a large total heat capacity of a predominantly enclosed space is desirable to reduce temperature variation on the inside. For example, a medieval church or halls in castles with massive stone walls, often with a thickness on the order of 1 m or even more, and thus very high heat capacity ("thermal mass") will have relatively modest temperature swings on the inside, which follow slowly (integrated over many days) the averaged changes in solar irradiance and ambient air temperature on the outside. Such buildings tend to have relatively low air temperatures on the inside, even during summer and/or at tropical and subtropical locations.

The large ratio of heat capacity of the structure itself compared to the heat capacity of the contained air, helps to stabilize the temperature of the air, i.e. the building can e.g. cool or heat inflowing air for a relatively long time (primarily via radiation from and direct contact with its walls).

We will illustrate this point with a very crude first order approximation by assuming said church or hall to be a cube with 25 m outside edge length and 1 m wall thickness (which protrude into said cube volume), made from bricks, and assuming the material parameters values given in Table 1. The ratio of the volume of all 6 walls $V_{wall}=(25 \text{ m})^3-(25 \text{ m}-2 \text{ m})^3=3458 \text{ m}^3$ to the volume of the enclosed air $V_{air}(25 \text{ m}-2 \text{ m})^3=12167 \text{ m}^3$ is 1:3.5, yet the ratio of the thermal capacity of the wall to the enclosed air 426:1. Specifically, in this case the wall would have a thermal capacity of $C_{wall} \approx 1730$ kWh/K and the enclosed $\approx 12,200 \text{ m}^3$ air have a thermal capacity of $C_{air} \approx 4.1$ kWh/K.

To exemplify the implication, we assume further that in one particular instance the walls are at $T_{wall}=20°$ C.=293.1 K, and that the enclosed air is suddenly completely exchanged with air at $T_{air}=40°$ C.=313.1 K, i.e. $\Delta T=20$ K (e.g. outside air in a equatorial region). Abstractly assuming ideal, complete thermal exchange between the gas and the wall (incl. no thermal exchange with the outside, etc.), this would result in a new equilibrium at approximately $T_{wall}=T_{air}=20.05°$ C., i.e. the temperature change of the walls is only $\Delta T_{wall}=0.05$ K. Correspondingly often such a gas exchange could occur, before the cooling (or heating) effect of the structure diminishes.

In contrast, the temperature changes inside a simple shack, made primarily from thin steel plates, which also relatively high thermal conductance, will under the same outside conditions have relatively high amplitudes and relatively closely follow the change in radiative power input. Such habitats are frequently found in developing countries.

Similarly, many trailers and mobile homes have at least partially relatively thin metal walls.

In the US, many residential homes are made from relatively thin walls from plywood and/or, gypsum drywall/ sheet rock, often in conjunction with insufficient insulation, have in fact relatively low thermal capacity, which makes such buildings very susceptible to changes in solar irradiance and ambient temperature changes, and also results in increased energy expenditure for air conditioning and heating. (Material for thermal insulation, such as glass wool etc, is in general not primarily used to contribute to the thermal capacity of such house, instead it aims at reducing thermal conductance, which changes the heat flux per thermal gradient across the wall, and thus only the required time to reach a new equilibrium, if ever.)

We will again illustrate this point with a very crude first order approximation by assuming the house to be a cube with 8 m (outside) edge length and 3.5 cm wall thickness, made from wood (pine plywood), and again assuming the material parameters values given in Table 1. The ratio of the volume of all 6 walls to the volume of the enclosed air is now 1:37, and the ratio of the thermal capacity of the wall to the enclosed air is only 23:1, about 18× lower compared to the previous example.

Specifically, in this case the wall would have a thermal capacity of only $C_{wall} \approx 3.9$ kWh/K and the enclosed 505 m$^3$ of air have a thermal capacity $C_{air} \approx 0.17$ kWh/K. To exemplify the implication, we assume again that in one particular instance the walls are at $T_{wall}=20°$ C.=293.1 K, and that the enclosed air is suddenly completely exchanged with air at $T_{air}=40°$ C.=313.1 K, i.e. $\Delta T=20$ K. Again abstractly assuming ideal, complete thermal exchange between the gas and the wall (incl. no thermal exchange with the outside, etc.), this would now result in a new equilibrium temperature of approximately $T_{wall}=T_{air}=20.82°$ C., i.e. the temperature change of the wall $\Delta T_{wall}=0.82$ K, i.e. the temperature change is correspondingly about 18× higher than in the previous example. Correspondingly fewer gas exchanges could occur, before the cooling (or heating) effect of the structure diminishes.

For obvious economic reasons (price of raw material, transport, installation), it is desirable to use as little as possible material (concrete, stone, clay, steel, aluminum, glass, wood, various insulation materials etc. to erect a structure of given size. In most cases this will be determined by requirements on the structural integrity and stability. On the other hand, as pointed out above, this implies in many cases a relatively low heat capacity of the structure. Therefore, additional methods and predominantly passive elements (in terms of expenditure of external energy) are desirable, which in some cases reduce the amount of solar radiation, which is absorbed by a structure. In addition, relatively inexpensive elements and methods to increase the thermal capacity and/or to dynamically redistribute thermal energy are desirable.

Several elementary forms of passive cooling are well known. Historic examples from the Middle-East include so-called "wind chimneys". More recently passively ventilated roof structures of buildings have been introduced in the United States, which can in some circumstances contribute somewhat to reducing the temperature increase inside a building, in particular in attic space, under given solar radiation levels. However, existing designs, which were essentially empirically derived (in contrast to CFD computer simulations or laser- or sound-based flow measurements), are far from optimal in terms of size, shape, and placement of the air in- and outlets as well as the resulting airflow patterns.

As an additional, principle limitation, solely passive (or driven/"active") ventilation based methods cannot achieve temperature lower than ambient air temperature.

SUMMARY OF THE INVENTION

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In an embodiment, a method of modulating the impact of electromagnetic irradiance, predominantly at least in the visible (VIS) and near infrared (NIR) wavelength range, on the absolute amount of the temperature inside a predominantly enclosed space, which is exposed to directionally and temporally varying levels of said primary electromagnetic radiation, is provided. The method comprises at least an inner shell of said predominantly enclosed space. In the relative proximity of said inner shell a plurality of functional elements are placed in such a way that said functional elements cover at least partially at least those areas of the predominantly enclosed space, which are predominantly exposed to said primary electromagnetic radiation. Thermally conductive bridges to the inner shell via direct contact are one or both of reduced or eliminated by mounting said functional elements, or a plurality of frames which support said functional elements, directly onto the inner shell of said predominantly enclosed space using a plurality of additional support elements, which are predominantly small compared to the size of said functional elements, or by mounting said functional elements, or frames to which they are mounted, on a supportive structure, which is predominantly separate and structurally independent from said inner shell. The thickness, and thus material expenditure, of said functional elements is predominantly equal or small compared to the thickness of said inner shell. The predominantly outside facing surfaces of said functional elements have predominantly relatively high reflectivity at least at the VIS and NIR wavelength range whereby the relative amount of incoming radiative power is reduced, which is absorbed by said functional elements. The predominantly inside facing surfaces of said functional elements has predominantly relatively high reflectivity at least in the NIR and MIR wavelength range, whereby the radiative thermal emissivity of said functional elements is reduced.

In another embodiment, a method of modulating the impact of electromagnetic irradiance, predominantly at least in the visible (VIS) and near infrared (NIR) wavelength range, on the absolute amount and the variations of the temperature inside a predominantly enclosed space, which is exposed to directionally and temporally varying levels of said primary electromagnetic radiation is provided. The method comprises at least an inner shell of said predominantly enclosed space. In the relative proximity of said inner shell a plurality of functional elements are placed in such a way that said functional elements cover at least partially at least those areas of the predominantly enclosed space, which are predominantly exposed to said primary electromagnetic radiation. Thermally conductive bridges to the inner shell via direct contact are one or both of reduced or eliminated by mounting said functional elements, or a plurality of frames which support said functional elements, directly onto the inner shell of said predominantly enclosed space using a plurality of additional support elements, which are small compared to the size of said functional elements, or by mounting said functional elements, or frames to which they are mounted, on an supportive structure, which is predominantly separate and structurally independent from said inner shell. The thickness, and thus material expenditure, of said functional elements is predominantly equal or small compared the thickness, and thus material expenditure, of said inner shell. The plurality of said functional elements are mounted such that they are at least in one degree of freedom spatially adjustable in a manner, which permits to change the ratio of the amount of surface area of said inner shell, which is exposed to the radiation source vs. the amount that is shielded by said functional elements. The predominantly outside facing surfaces of said functional elements have predominantly relatively high reflectivity at least at the VIS and NIR wavelength range. The predominantly inside facing surfaces of said functional elements have predominantly relatively high reflectivity at least in the NIR and mid infrared (MIR) wavelength range. The predominantly outside facing surfaces of said inner shell has predominantly relatively low reflectivity and thus high emissivity at least in the NIR and MIR wavelength range. A control system adjusts the spatial position of said functional elements such that thermal energy budget of said predominantly enclosed space is influenced according to at least one desired target value.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

A brief description of the drawings shall serve to summarize some principles of the disclosed invention.

DETAILED DESCRIPTION

Figure 1:
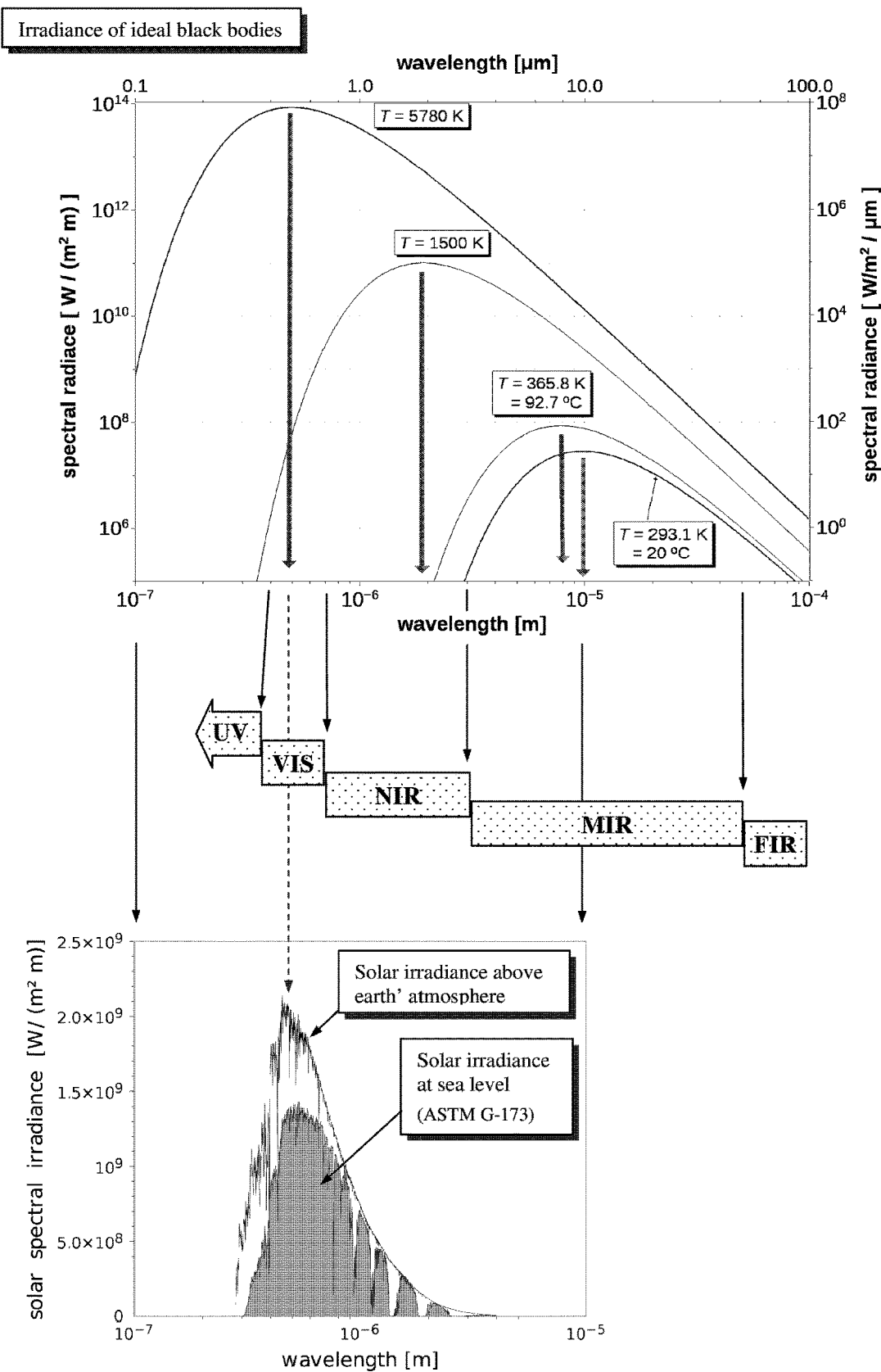
FIG. 1 illustrates the spectral distribution of the spectral radiative flux, i.e., spectral radiance, an ideal black body emits as a function of wavelength, for four different temperatures.

FIG. 1 illustrates the spectral distribution of the spectral radiative flux, i.e., spectral radiance, an ideal black body emits as a function of wavelength, for four different temperatures, according to Planck's law. Also shown is the conceptual division of this part of the electromagnetic spectrum in ultra-violet (UV), visible (VIS), Near Infrared (NIR), Mid Infrared (MIR), and Far Infrared (FIR).

As will be subsequently be discussed in more detail, by integrating Planck's law over all wavelengths Stefan-Boltzmann's law can be derived, which makes more apparent the (highly non-linear) correlation between the temperature and the total radiated. i.e. emitted power density (per area), i.e. radiative flux or irradiance, of an ideal black body.

The lower the temperature of an object is, the more is the spectral distribution of the emitted radiance shifted towards larger wavelength. The value of the wavelength where the spectral radiance has its maximum shall be denoted $\lambda_{max}$. For example, at T=5780 K, the temperature of the surface of the sun, $\lambda_{max} \approx 0.5$ μm and the integrated spectral radiance reaches 63 MW/m². By integrating the spectral irradiance over the corresponding wavelength ranges (and assuming ideal unfiltered black-body radiation) one can derive that at this temperature of a radiating object, about 10% of the emitted radiation (i.e. emitted power) is within the UV, 39% is visible to humans, 49% is within the NIR range, and only about 2% within the MIR range.

To give another example, at T=1500 K the highest spectral irradiance is at $\lambda_{max} \approx 1.93$ μm. Already at this temperature (and of course lower ones) most of the emitted radiation is invisible to humans. In this particular example of T=1500 K, the amount of spectral irradiance at the upper wavelength limit visible to humans of about λ=0.7 μm, relative to the maximum irradiance at $\lambda_{max}$ 1.93 μm is only about 2.5%. Again, integrated over the corresponding wavelength ranges one derives that about 0.05% of the emitted radiation is visible to humans, 56% is within the NIR range, and 44% within the MIR range.

At T=365.8 K=92.7° C. the integrated spectral radiance has dropped to 1 kW/m² and the highest spectral irradiance is at $\lambda_{max} \approx 8$ μm. There is no radiation visible to humans, 0.08% of the emitted radiation is within the NIR range, and 98% within the MIR range.

At a typical room temperature of T=293.1 K=20° C. the maximum of the spectral radiance is at $\lambda_{max}$=9.9 μm. Here, about 97% the emitted radiation is within the MIR range, and 2.8% range within the FIR range.

This illustrates that (a) higher temperatures of an object, corresponding to shorter wavelength, nonlinearly higher power is radiatively transferred and that (b) the visual color and appearance of an object can be considerably different from its thermal radiative behavior.

At the bottom of FIG. 1 is a plot given, which shows the actual solar irradiance at the average distance between sun and earth, i.e. the irradiance outside earth' atmosphere, as well as the typical maximal irradiance at sea level. This plot is based on the reference solar spectral irradiance ASTM G-173. Further details on this topic can be found, for example, at National Renewable Energy Laboratory (NREL), http://www.nrel.gov, the entirety of which is incorporated herein by reference. As illustrated, most of the solar irradiance is contained in the wavelength range between 0.25 μm and 3.0 μm. Integrated over the entire spectral range, the irradiance, which arrives from the sun at the average distance between the sun and the earth (i.e., at the outer edge of the atmosphere) is approximately 1.36 kW/m². Determined by the chemical composition and density of the air and furthermore influenced by humidity (incl. clouds), dust, pollution levels, latitude, time of day, date, etc., the solar irradiance is attenuated while passing through the atmosphere and the spectrum is filtered (some bands are suppressed). Under best-case conditions, the peak levels of the irradiance at sea level is about 900 W/m².

The solar irradiance, which arrives at sea level after passing through earth' atmosphere, now comprises only about <4% within the UV range, about 45% within the VIS range, and 51% in the NIR range (more precisely between 750 nm and 2.5 µm). These ratios are good approximates. More precise values depend on numerous other parameters.

These plots also illustrate that solar radiation can in first order still be approximated as black body radiation.

As an additional reference it shall be commented, that in the southwest of the United States, at ground level, the average energy density per day on a horizontal plate is about 5 to 6 kWh/(m²·day) on a horizontal plate and >9 kWh/(m²·day) on a surface, which is 2-axis tracking to remain normal to the incidence (Source: National Solar Radiation Data Base).

Figure 2:
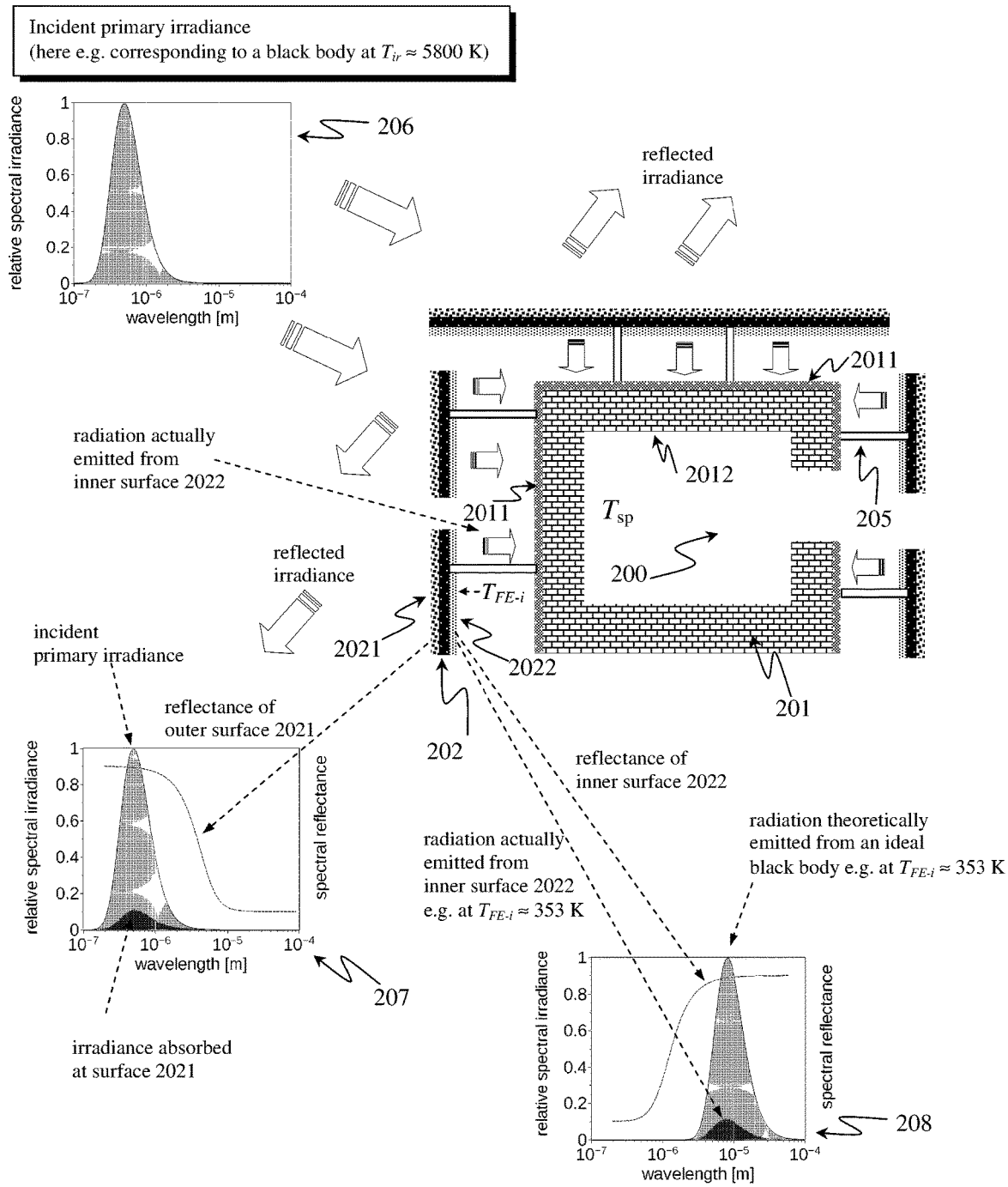
FIGS. 2-6 schematically illustrate various embodiments of a 2D cross section of a typically 3D and predominantly closed space.

FIG. 2 illustrates highly schematically (and not to scale) a 2D cross section of a typically 3D and predominantly closed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation. Inside said predominantly enclosed structure 200 shall predominantly be a temperature $T_{sp}$, which may be defined as a gas temperature (if present), or the average radiant temperature of the inner surfaces 2012, or a combination thereof.

Said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

The placement of said functional elements 202 is such that thermally conductive bridges to the inner shell 201 via direct contact are reduced and/or eliminated by mounting said functional elements 202, or a plurality of frames which support said functional elements, directly onto the inner shell of said predominantly enclosed space using a plurality of additional support elements 205, which are predominantly small compared to the size of said functional elements 202.

The predominantly outside facing surfaces 2021 of said functional elements 202 have generally highly reflective properties for electromagnetic waves at least in the VIS and NIR wavelength range. The predominantly inside facing surfaces 2022 of said functional elements have predominantly relatively highly reflectivity at least in the NIR and MIR wavelength range, whereby the radiative thermal emissivity of said functional elements is reduced.

In one typical embodiment, the predominant effect and target is to reduce, on average, the radiative energy input in said predominantly enclosed space 200. A typical application is to reduce the temperature increase inside of human habitats under extensive solar radiation. In such embodiments the outside facing surfaces 2011 of the inner shell 201 of the predominantly enclosed space 200 have, like the inside facing sides 2022 of said functional elements, relatively high reflectivity (as close as possible to unity) at least at NIR and MIR wavelength, thereby reducing absorption as well as thermal emissions in these wavelength ranges.

In the shown example the incident radiation corresponds to black body ration at $T_{ir} \approx 5800$ K, shown in plot 206, and the spectral reflectance of said outside facing surfaces 2021 of said functional elements 202 is such that about 10% of the incident power is absorbed, as illustrated in plot 207. In the shown example (which is of course a snapshot in time of a typically dynamic process) at least some of said inside facing surfaces 2022 of said functional elements 202 are assuming a temperature of $T_{FE-i} \approx 353$ K, corresponding to spectral distribution, which has an about 20× red-shifted spectral center. As illustrated in plot 208, the spectral reflectance of said inside facing surfaces 2022 of said functional elements 202 is such that at this temperature only about 10% of the theoretical maximum power is emitted towards at least some of the outside facing surfaces 2011 of said inner shell. Thus, overall in this highly simplified example, the radiation incident on said inner shell is about 1% of the primary irradiance thus substantially reducing heating caused by said primary irradiance (further dependent on the absorption properties of surfaces 2011).

As mentioned, FIG. 2 provides several radiation spectra, which, for simplicity, assume the radiation from ideal black bodies, and it also shows very smooth and simple spectral reflectance curves. This shall only serve as a simplified example to convey the principle functionality. Realistically, for embodiments related to buildings on earth, the incident solar radiation of course only approximates black body radiation and exhibits several characteristic absorption bands caused by earth' atmosphere. Likewise, typical reflectance curves can exhibit less smooth characteristics. Also, these spectral reflectance curves are in some respect minimal requirements. In some embodiments it may be desirable to have said surfaces with relatively high reflectivity at least at NIR and MIR, to have also relatively high reflectivity at the VIS wavelength range.

Figure 3:
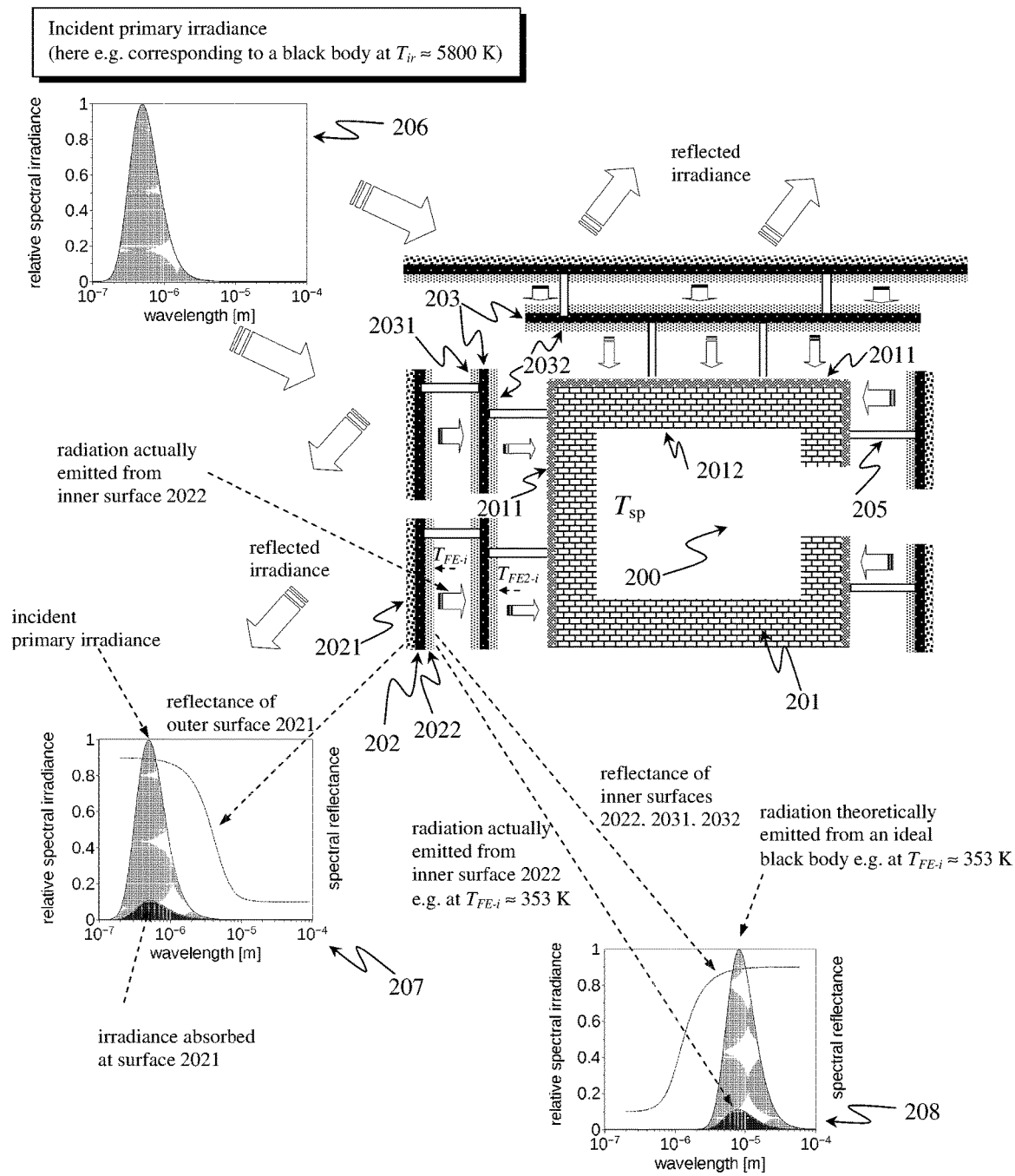

FIG. 3 illustrates, similar to FIG. 2, highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation.

In the shown embodiment said functional elements 202 are arranged such that a plurality of predominantly parallel outer layers is formed, which are positioned in relative proximity to each other compared to their size (of the two large dimensions). The outermost layer predominantly receives the incident electromagnetic radiation and converts, according to its reflective spectral properties, a relatively small portion thereof to thermal energy, and the conductive thermal power transfer between said layers is small compared to the radiative thermal power transfer between those layers. The radiative output of the inside of one layer constitutes the predominant radiative input of the adjacent inwardly located layer. The radiant emittance of the most inwardly located layer constitutes the predominant radiative input of the outside facing surfaces 2011 of said inner shell.

At the (conceptually original) outermost layer, the predominantly toward the outside facing surfaces 2021 of said functional elements 202 have generally highly reflective properties for electromagnetic waves at least in the VIS and NIR wavelength range. The predominantly inside facing surfaces 2022 of said functional elements have predominantly relatively highly reflectivity at least in the NIR and MIR wavelength range, whereby the radiative thermal emissivity of said functional elements is reduced.

For any additional, inwardly located layers of said plurality of functional elements, such as 203, both outside 2031 and inside 2032 facing surfaces have predominantly relatively highly reflectivity at least in the NIR and MIR wavelength range, whereby the radiative thermal emissivity of said functional elements is reduced. The additional single or plurality of inwardly located layers of said plurality of functional elements, such as 203, will under substantial primary irradiance, assume surface temperatures which are lower than those of the more outwardly located layers. In the shown example the temperature $T_{FE2-i}$ of inside facing side 2032 of said plurality of functional elements 203 will in general be lower than $T_{FE-i}$, thus the emission of radiation from surfaces 2032 is even less efficient (since it is more red-shifted) than the emission of radiation from surfaces 2022. The net result is an even further reduced attenuation of the primary irradiance, which arrives at surfaces 2011.

Again, the provided radiation spectra assume for simplicity radiation from ideal black bodies, and also show very smooth and simple spectral reflectance curves. This shall only serve as a simplified example to convey the principle functionality. Realistically, for embodiments related to buildings on earth, the incident solar radiation of course only approximates black body radiation and exhibits several characteristic absorption bands caused by earth' atmosphere. Likewise, typical reflectance curves can exhibit less smooth characteristics. Again, these spectral reflectance curves are in some respect minimal requirements. In some embodiments it may be desirable to have said surfaces with relatively high reflectivity at least at NIR and MIR, to have also relatively high reflectivity at the VIS wavelength range.

Figure 4:
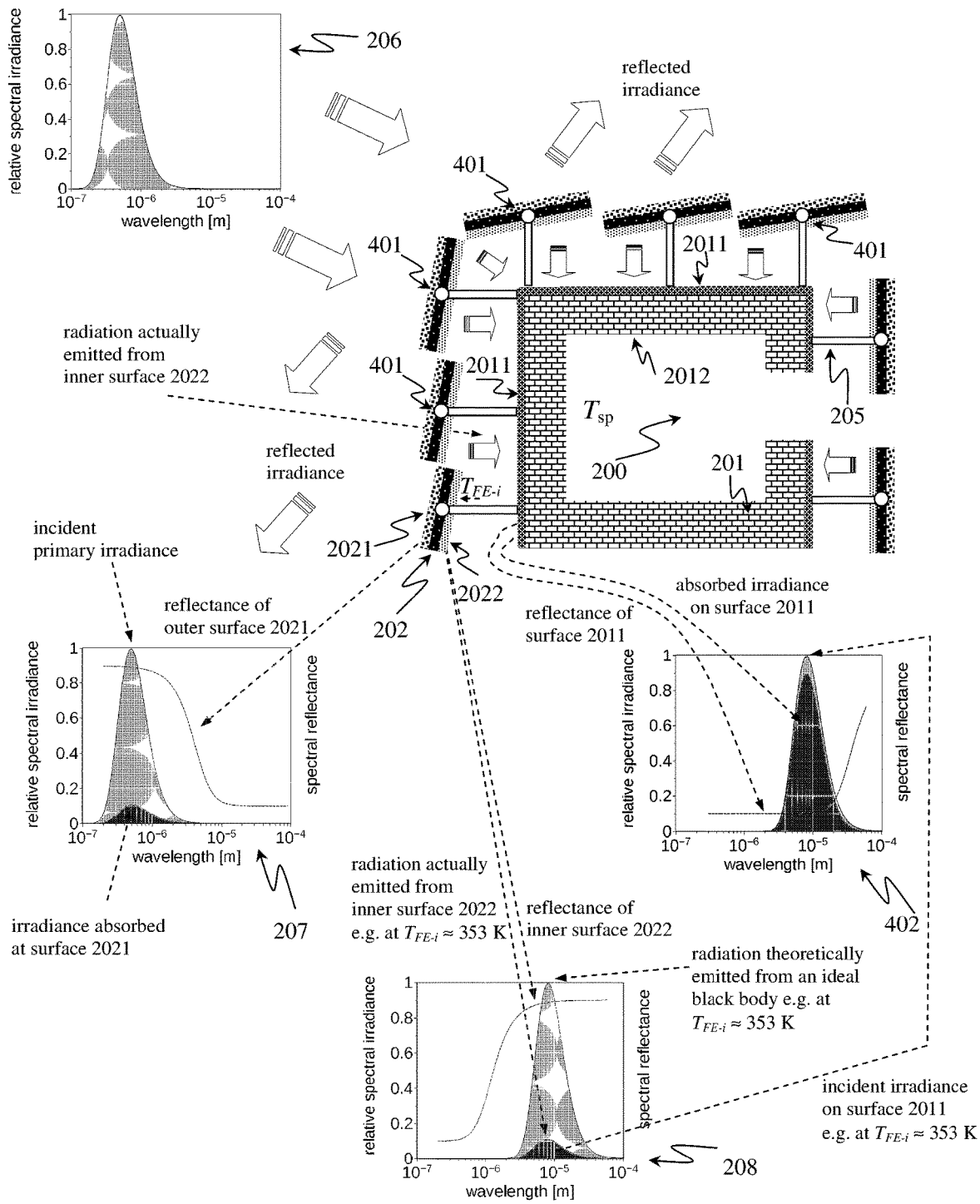

FIG. 4 illustrates highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation. Inside said predominantly enclosed structure 200 shall predominantly be a temperature $T_{sp}$, which may be defined as a gas temperature (if present), or the average radiant temperature of the inner surfaces 2012, or a combination thereof.

Said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

The placement of said functional elements 202 is such that thermally conductive bridges to the inner shell 201 via direct contact are reduced and/or eliminated by mounting said functional elements 202, or a plurality of frames which support said functional elements, directly onto the inner shell of said predominantly enclosed space using a plurality of additional support elements 205, which are predominantly small compared to the size of said functional elements 202.

In addition, said plurality of said functional elements are mounted such that they are at least in one rotational or translational degree of freedom spatially adjustable in a manner, which permits change of the relative amount of area of surfaces 2011 that is exposed to the outside. This is schematically illustrated by a plurality of hinge-like elements 401. Thereby the ratio of absorbed to incident primary irradiance can be changed over a substantial range. In many embodiments said elements 401, independent if they enable one or more of a rotational and/or a translational degree of freedom, are powered by at least one motor, which is driven by a control system, which at least affects said spatial adjustment of said functional elements to approximate at least one control goal, such as a desired level of temperature inside said predominantly enclosed space.

The predominantly outside facing surfaces 2021 of said functional elements 202 have generally highly reflective properties for electromagnetic waves at least in the VIS and NIR wavelength range. The predominantly inside facing surfaces 2022 of said functional elements have predominantly relatively highly reflectivity at least in the NIR and MIR wavelength range, whereby the radiative thermal emissivity of said functional elements is reduced.

The outside facing surfaces 2011 of said inner shell 201 of the predominantly enclosed space 200 have relatively low reflectivity (as close as possible to zero) at least at the NIR and MIR wavelength range. This enables to utilize, when needed, the thereby enhanced emissivity and absorption in this wavelength range. Said low reflectivity at the NIR and MIR wavelength range is suitable for situations when there is typically excessive primary irradiance, i.e. when the desired effect is to reduce the relative amount of absorbed irradiance.

For situations under which it is at least temporarily desirable to also increase the relative amount of absorbed irradiance under relatively high primary irradiance, i.e. to increase the thermal budget of said predominantly enclosed space as efficiently as possible, then said outside facing surfaces 2011 of the inner shell will have relatively low reflectivity at least in the VIS, NIR and MIR wavelength range. This case is illustrated in plot 402 in FIG. 4. (In these cases said functional elements 202 are spatially adjusted differently, as for example shown in FIG. 6.)

As a result of said broadband reflectivity at least in the VIS, NIR and MIR, surfaces 2011 will have generally highly efficient absorption of radiation in that wavelength range, even under condition when it is not desirable to increase the thermal budget of said predominantly enclosed space. Since said functional elements 202 will be spatially adjusted identically or similarly as shown in FIG. 4, said radiation will be predominantly emitted by surfaces 2022, but as discussed, the total amount thereof is relatively small, thus the radiative thermal gain is low and the benefit of being able to maximally absorb e.g. solar radiation under certain other conditions outweighs this occasional drawback.

The illustrated specific spatial adjustment of said functional elements 202 is typically used under condition of excessive incident primary irradiance and desirably reduced increase of said thermal budget, as illustrated. However, the same or a similar specific spatial adjustment of said functional elements is typically also used under conditions of negligible primary irradiance and desirably reduced decrease of said thermal budget.

Figure 5:
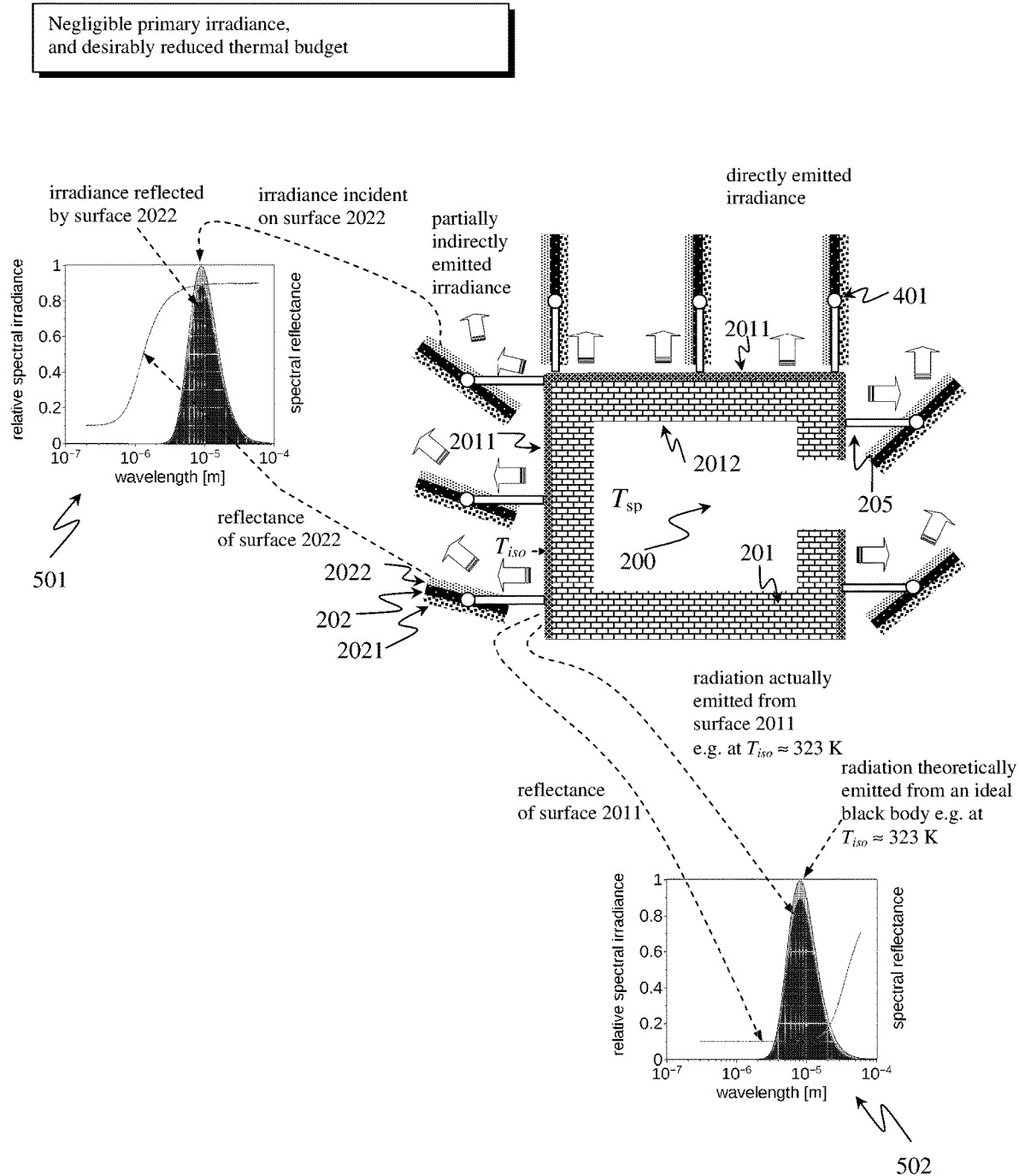

FIG. 5 illustrates highly schematically (and not to scale) a 2D cross section of a typically 3D and predominantly enclosed space 200, predominantly defined by a shell 201 under effectively inverse conditions. It is assumed that there is negligible primary irradiance (e.g. at night), that said outside facing surfaces 2011 of said inner shell 201 have a temperature of $T_{iso} \approx 323$ K, and that it is desired to lower the thermal budget of said predominantly closed space.

Illustrated is a configuration wherein at least some of said functional elements 202 have been positioned such that a relatively large amount of surfaces 2011 is exposed to the outside, preferably in many embodiments to the sky as thermal sink, either directly or indirectly via reflection on the previously predominantly inside facing side 2022 of said plurality of functional elements. Due the specific spectral properties of surfaces 2022 (relatively high NIR and MIR reflectivity as illustrated in plot 501), which previously resulted in desirably low emissivity, now permit again desirably a degree of reflectivity of the radiation emitted from surface 2011, as illustrated in plot 502.

Such a configuration is typically used when it is desirable to affect enhanced thermal losses from said inner shell under conditions of negligible primary irradiance, and excess thermal energy budget of said predominantly enclosed space.

Figure 6:
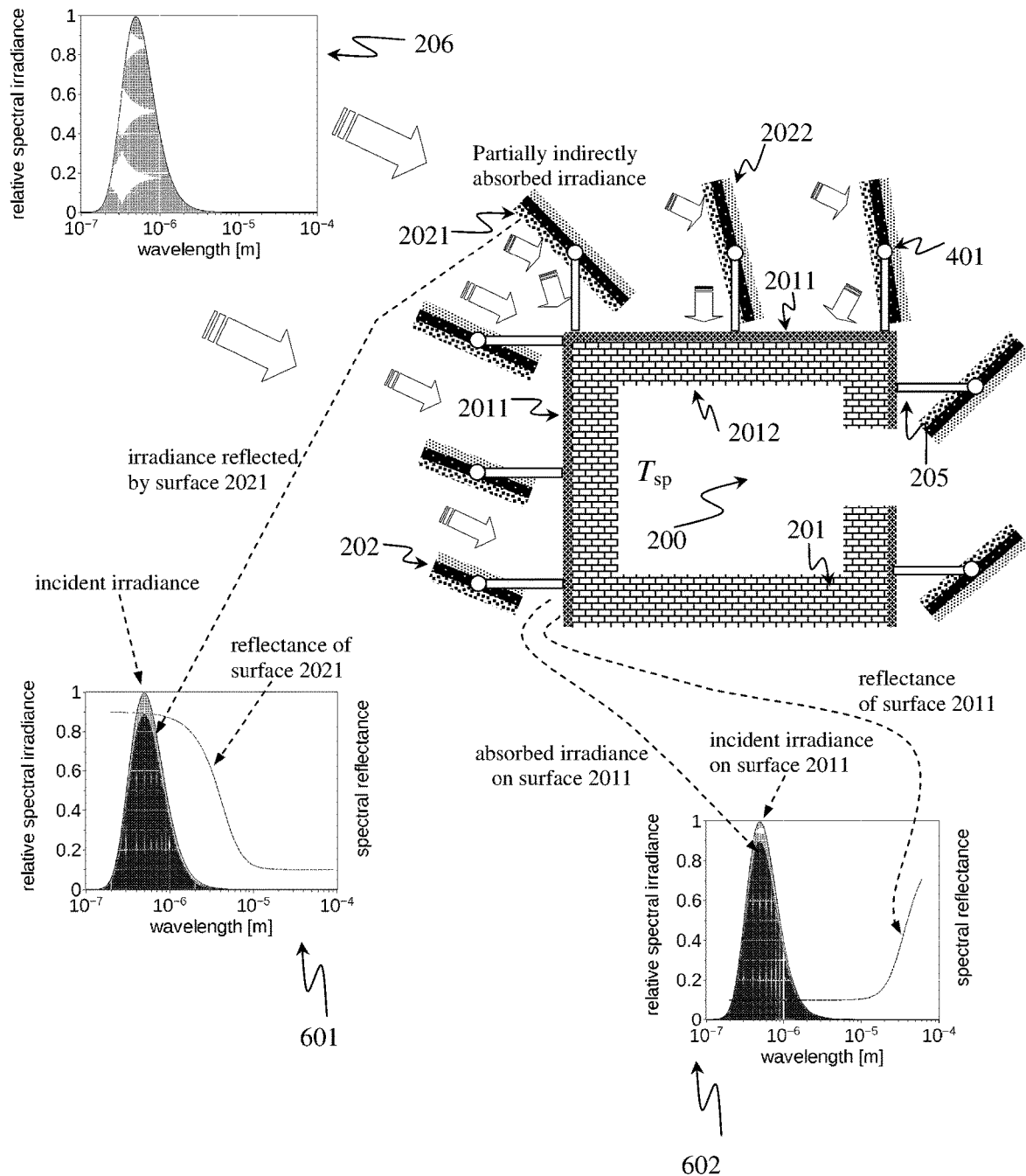

FIG. 6 illustrates highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation.

The depicted scenario shows an operational mode wherein it is desirable to increase the thermal budget of the predominantly enclosed space under conditions of sufficient primary irradiance.

Illustrated is a configuration wherein at least some of said functional elements 202 have been positioned such that a relatively large amount of area of surfaces 2011 is exposed to the primary radiation source, in many embodiments the sun, either directly or indirectly via reflection on the previously predominantly outside facing side 2021 of said plurality of functional elements. Due the specific spectral properties of surfaces 2021 (relatively high VIS and NIR reflectivity), which previously resulted in desirably reflection away from said predominantly enclosed space, now permit again desirably a high degree of reflectivity off of said primary irradiance onto surfaces 2011, as illustrated in plot 601.

The low broadband reflectivity (at least at the NIR and MIR wavelength range, in the depicted case in FIG. 6 at the VIS, NIR and MIR wavelength range) enables high absorption efficiency as shown in plot 602.

Figure 7:
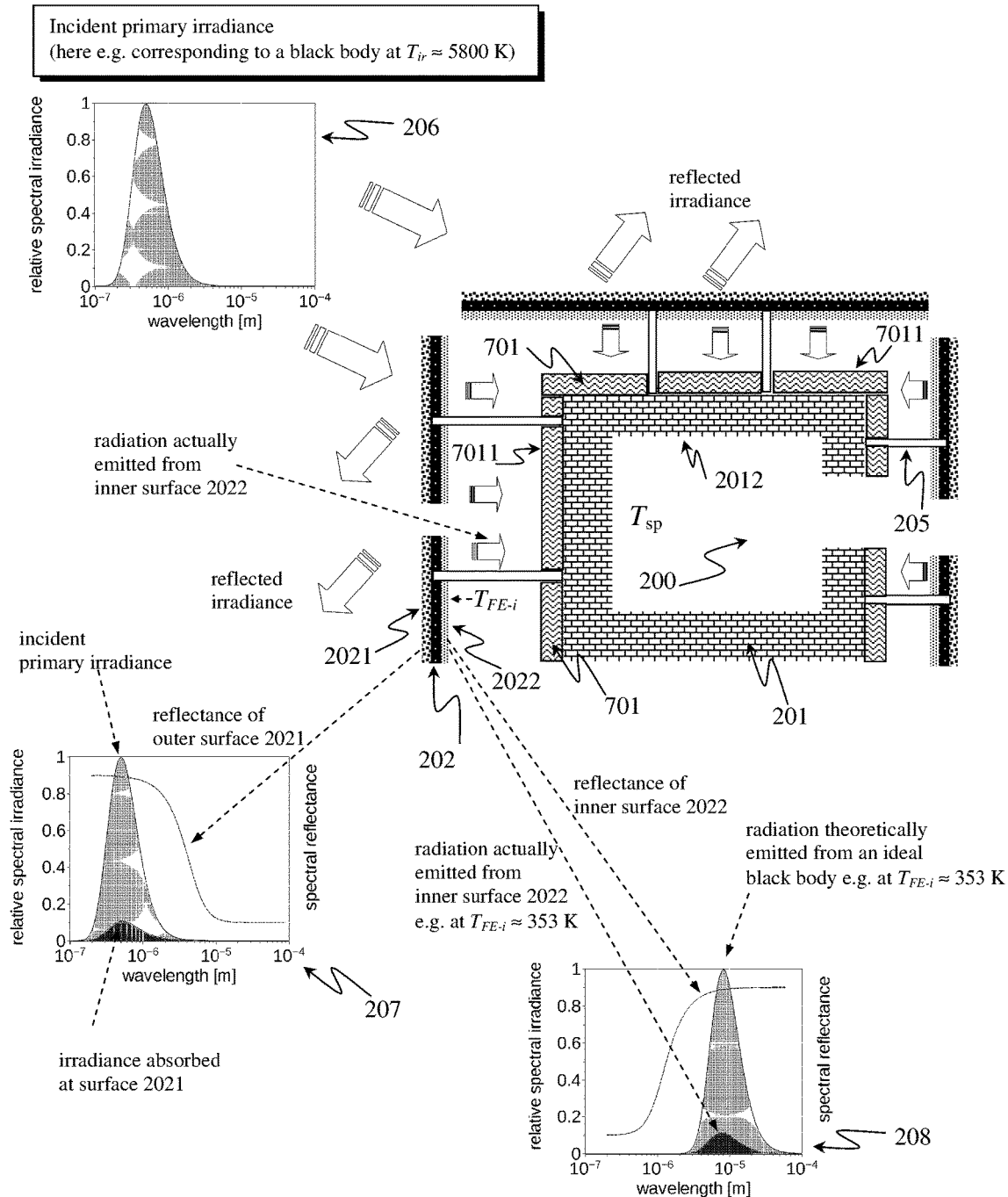
FIG. 7 is comparable to the embodiment shown in FIG. 2, with panels.

FIG. 7 is comparable to the embodiment shown in FIG. 2.

It illustrates highly schematically (and not to scale) a 2D cross section of a typically 3D and predominantly enclosed space 200, predominantly defined by shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation. Inside said predominantly enclosed structure 200 shall predominantly be a temperature $T_{sp}$, which may be defined as a gas temperature (if present), or the average radiant temperature of the inner surfaces 2012, or a combination thereof.

Said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

The placement of said functional elements 202 is such that thermally conductive bridges to the inner shell 201 via direct contact are reduced and/or eliminated by mounting said functional elements 202, or a plurality of frames which support said functional elements, directly onto the inner shell of said predominantly enclosed space using a plurality of additional support elements 205, which are predominantly small compared to the size of said functional elements.

The predominantly toward the outside facing surfaces 2021 of said functional elements 202 have generally highly reflective properties for electromagnetic waves at least in the VIS and NIR wavelength range. The predominantly inside facing surface 2022 of said functional elements has predominantly relatively highly reflectivity at least in the NIR and MIR wavelength range, whereby the radiative thermal emissivity of said functional elements is reduced.

In typical embodiments, the predominant effect and target is to reduce, on average, the radiative energy input in said predominantly enclosed space 200. A typical application is to reduce the temperature increase inside of human habitats under extensive solar radiation. In such embodiments the outside facing surfaces 2011 of the inner shell 201 of the predominantly enclosed space 200 have, like the inside facing sides 2022 of said functional elements, relatively high reflectivity (as close as possible to unity) at least at NIR and MIR wavelength, thereby reducing absorption and thermal emissions in these wavelength ranges.

In addition to the embodiment shown in FIG. 2, FIG. 7 shows also highly schematically (not to scale, and in 2D cross section) panels 701, which are at least partially filled with a thermal carrier medium, and which are geometrically relatively flat compared to their width and length, and which are mounted, at least in some locations, onto the outside facing surface of said inner shell 201 such that predominantly direct conductive thermal contact is achieved. In the shown embodiment said panels, which are at least partially filled with thermal carrier medium, serve to increase the thermal capacity of the wall of said inner shell 201.

The outside facing sides 7011 of said thermal carrier medium filled panels, where present, now assumes the functions in terms of absorption, reflection, and emission of radiation (and optionally convective thermal exchange with any gas, in some embodiments air), which otherwise of the outside facing sides 2011 of the inner shell would have in terms of supporting relatively efficient absorption of solar radiation as well as emission of thermal radiation. In other words, said outside facing sides 7011 of said thermal carrier medium filled panels predominantly receive radiation emitted from the inside facing sides 2022 of said functional elements 202.

Figure 8:
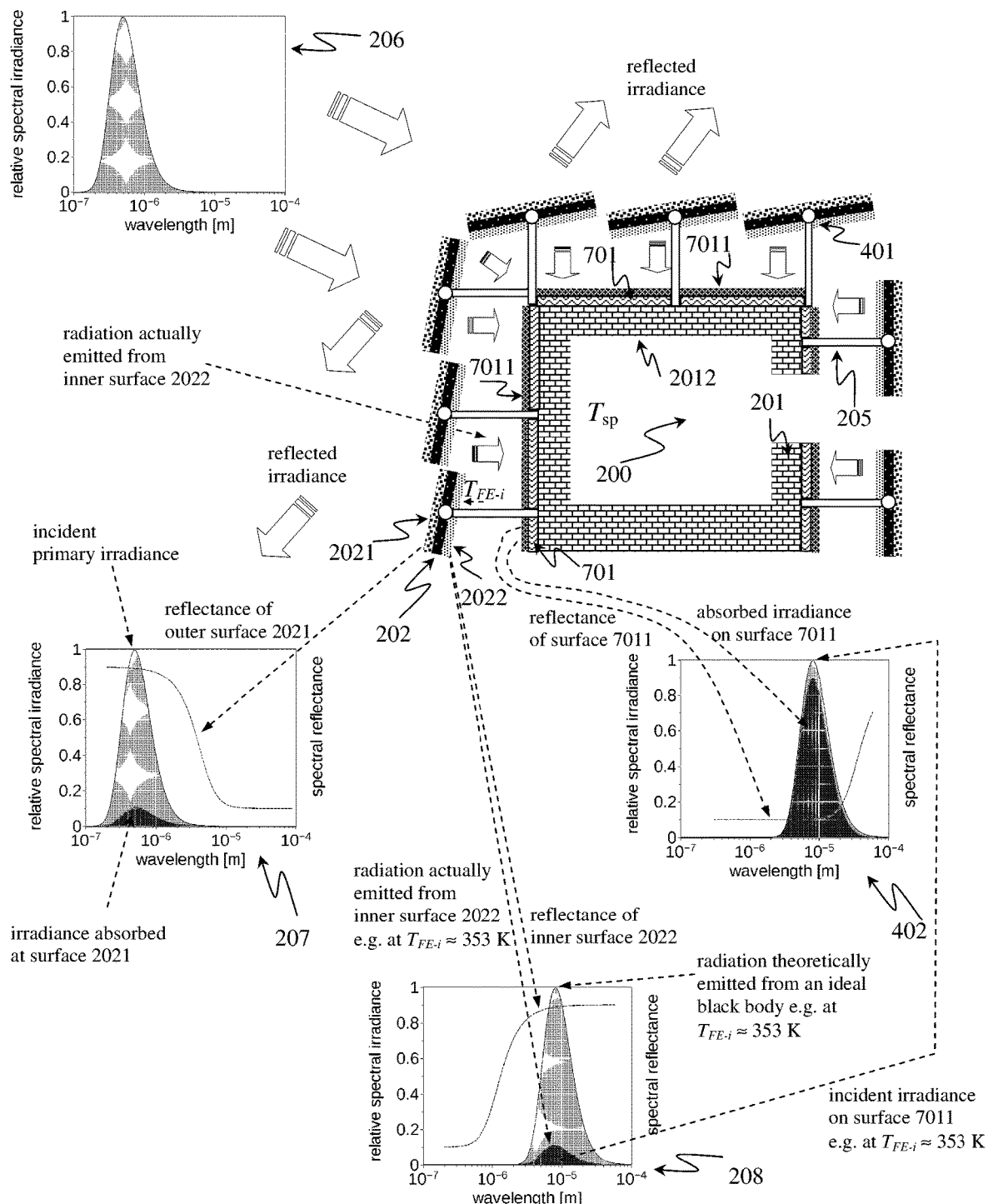
FIG. 8 is comparable to the embodiment shown in FIG. 4, with spatially adjustable elements.

FIG. 8 is comparable to the embodiment shown in FIG. 4.

It illustrates highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation. Inside said predominantly enclosed structure 200 shall predominantly be a temperature $T_{sp}$, which may be defined as a gas temperature (if present), or the average radiant temperature of the inner surfaces 2012, or a combination thereof.

Said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

The placement of said functional elements 202 is such that thermally conductive bridges to the inner shell 201 via direct contact are reduced and/or eliminated by mounting said functional elements 202, or a plurality of frames which support said functional elements, directly onto the inner shell of said predominantly enclosed space using a plurality of additional support elements 205, which are predominantly small compared to the size of said functional elements.

In addition, said plurality of said functional elements are mounted such that they are at least in one rotational or translational degree of freedom spatially adjustable in a manner, which permits to change the relative amount of area of surfaces 7011 (and optionally of surfaces 2011, which is not cover by said panels 701), which is exposed to the outside. This is schematically illustrated by a plurality of hinge-like elements 401. Thereby the ratio absorbed to incident primary irradiance can be changed over a substantial range. In many embodiments said elements 401, independent if they enable one or more of a rotational and/or a translational degree of freedom, are powered by at least one motor, which is driven by a control system, which at least affects said spatial adjustment of said functional elements to approximate at least one control goal, such as a desired level of temperature inside said predominantly enclosed space.

The predominantly toward the outside facing surfaces 2021 of said functional elements 202 have generally highly reflective properties for electromagnetic waves at least in the VIS and NIR wavelength range. The predominantly inside facing surfaces 2022 of said functional elements have predominantly relatively highly reflectivity at least in the NIR and MIR wavelength range, whereby the radiative thermal emissivity of said functional elements is reduced.

In addition to the embodiment shown in FIG. 4, FIG. 8 shows also highly schematically (not to scale, and in 2D cross section) panels 701, which are at least partially filled with a thermal carrier medium, and which are geometrically relatively flat compared to their width and length, and which are mounted, at least in some locations, onto the outside facing surfaces of said inner shell 201 such that predominantly direct conductive thermal contact is achieved. In the shown embodiment said panels, which are at least partially filled with thermal carrier medium, serve to increase the thermal capacity of the predominantly enclosed space.

The outside facing side 7011 of said thermal carrier medium filled panels 701, where present, now assumes the functions in terms of absorption, reflection, and emission of radiation (and optionally convective thermal exchange with any gas, in some embodiments air), which otherwise of the outside facing side 2011 of the core shell would have in terms of supporting relatively efficient absorption of solar radiation as well as emission of thermal radiation.

Specifically, the outside facing surfaces 7011 of said thermal carrier medium filled panels 701 have relatively low reflectivity (as close as possible to zero) at least at the NIR and MIR wavelength range. This enables to utilize, when needed, the thereby enhanced emissivity and absorption in this wavelength range. Said low reflectivity at the NIR and MIR wavelength range is suitable for situations when there is typically excessive primary irradiance, i.e. when the desired effect is to reduce the relative amount of absorbed irradiance.

For situations under which it is at least temporarily desirable to also increase the relative amount of absorbed irradiance under relatively high primary irradiance, then said outside facing surfaces 7011 of the inner shell will have relatively low reflectivity at least in the VIS, NIR and MIR wavelength range. This scenario is illustrated in plot 402 in FIG. 8.

Further illustrated is the generally efficient absorption of the radiation, here predominantly emitted by surfaces 2022, but as discussed, the total amount thereof is relatively small, thus the radiative thermal gain is low.

FIG. 8 illustrates a specific spatial adjustment of said functional elements 202, whereby only a relatively small portion of said primary irradiance contributes positively to the thermal budget of said predominantly enclosed space 200, its shell 201, and said thermal carrier medium filled panels 701.

The shown specific spatial adjustment of said functional elements is typically used under condition of excessive incident primary irradiance and desirably reduced increase of said thermal budget, as illustrated. However, the same or a similar spatial adjustment of said functional elements is typically also used under conditions of negligible primary irradiance and desirably reduced decrease of said thermal budget.

Figure 9:
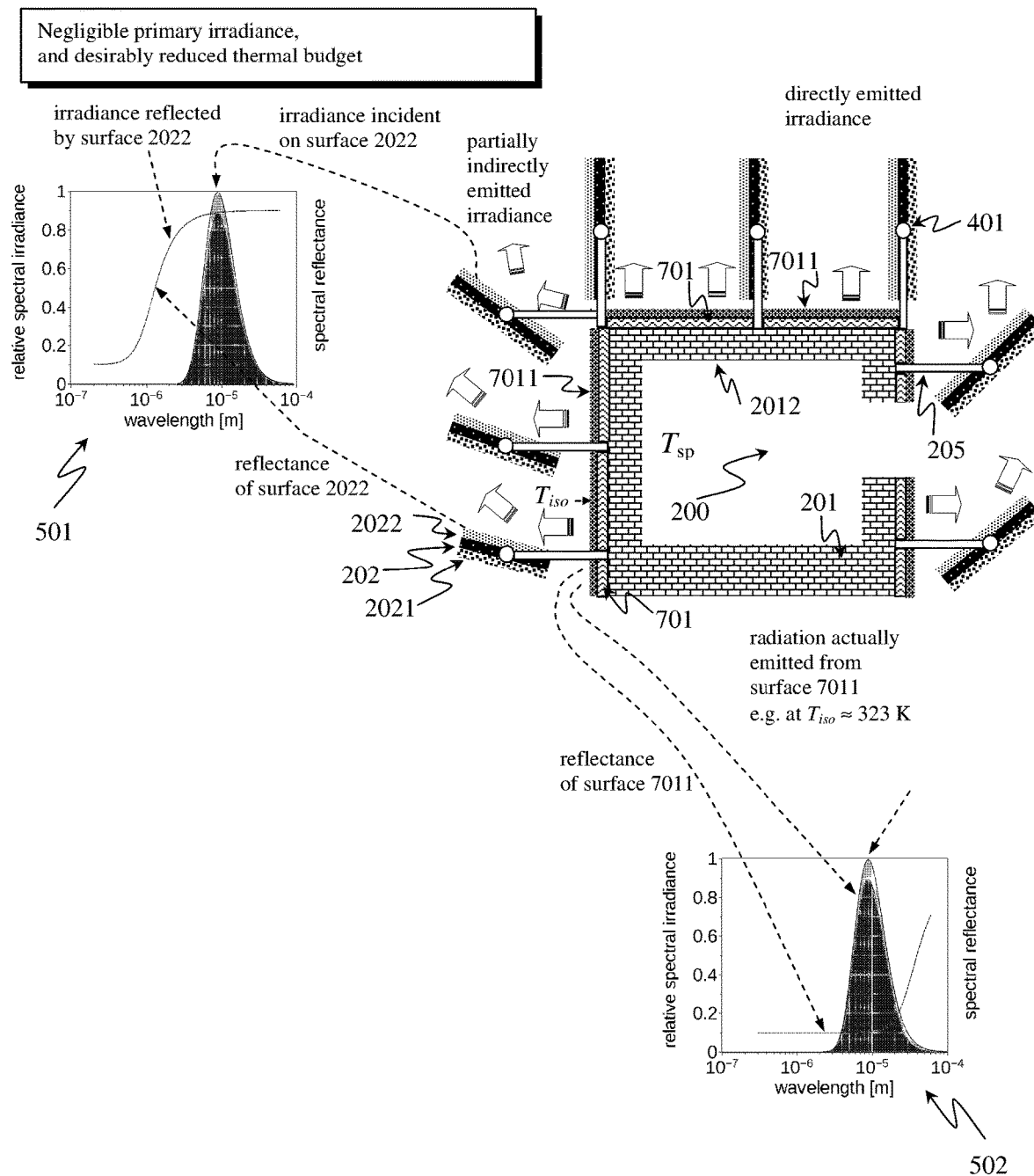
FIG. 9 is comparable to the embodiment shown in FIG. 5, with panels.

FIG. 9 is comparable to the embodiment shown in FIG. 5.

It illustrates highly schematically (and not to scale) a 2D cross section of a typically 3D and predominantly enclosed space 200, predominantly defined by shell 201 under effectively inverse conditions compared to those shown in FIGS. 5 and 8. It is assumed that there is negligible primary irradiance (e.g. at night), that said outside facing surfaces 2011 of said inner shell 201 have a temperature of $T_{iso} \approx 323$ K, and that it is desired to lower the thermal budget of said predominantly closed space.

In addition to the embodiment shown in FIG. 5, FIG. 9 shows (like FIG. 8) also highly schematically (not to scale, and in 2D cross section) panels 701, which are at least partially filled with a thermal carrier medium, and which are geometrically relatively flat compared to their width and length, and which are mounted, at least in some locations, onto the outside facing surfaces of said inner shell 201 such that predominantly direct conductive thermal contact is achieved. In the shown embodiment said panels, which are at least partially filled with thermal carrier medium, serve to increase the thermal capacity of the predominantly enclosed space.

Specifically, the outside facing surfaces 7011 of said thermal carrier medium filled panels 701 have relatively low reflectivity (as close as possible to zero) at least at the NIR and MIR wavelength range. This enables to utilize, when needed, the thereby enhanced emissivity and absorption in this wavelength range. Said low reflectivity at the NIR and MIR wavelength range is suitable for situations when there is typically excessive primary irradiance, i.e. when the desired effect is to reduce the relative amount of absorbed irradiance.

For situations under which it is at least temporarily desirable to also increase the relative amount of absorbed irradiance under relatively high primary irradiance, then said outside facing surfaces 7011 of the inner shell will have relatively low reflectivity at least in the VIS, NIR and MIR wavelength range. This case is illustrated in plot 502 in FIG. 9.

Illustrated is a configuration wherein at least some of said functional elements 202 have been positioned such that a relatively large amount of area of surfaces 7011 is exposed to the outside, preferably in many embodiments to the sky as thermal sink, either directly or indirectly via reflection on the previously predominantly inside facing sides 2022 of said plurality of functional elements. Due the specific spectral properties of surfaces 2022 (relatively high NIR and MIR reflectivity, as illustrated in plot 501), which previously resulted in desirably low emissivity, now permit again desirably a degree of reflectivity of the radiation emitted from surfaces 7011, as illustrated in plot 502.

Such a configuration is typically used when it is desirable to affect enhanced thermal losses from said inner shell under conditions of negligible primary irradiance, and excess thermal energy budget, i.e. desirably reduced thermal budget of said predominantly enclosed space.

Figure 10:
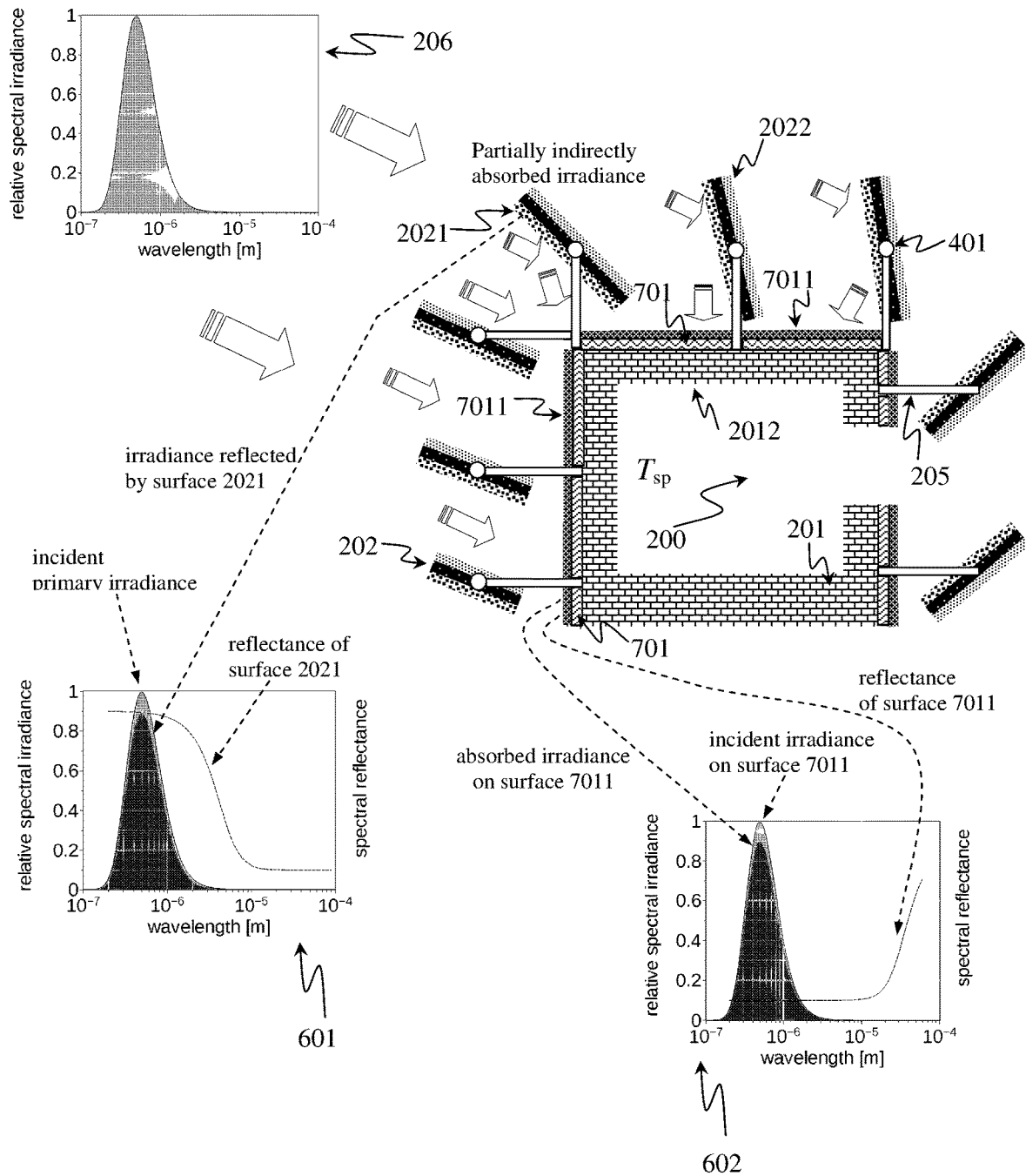
FIG. 10 is comparable to the embodiment shown in FIG. 6, with panels.

FIG. 10 is comparable to the embodiment shown in FIG. 6.

It illustrates highly schematically (and not to scale) a 2D cross section of a typically 3D and predominantly enclosed space 200, predominantly defined by shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation.

The depicted scenario shows an operational mode wherein it is desirable to increase the thermal budget of the predominantly enclosed space under conditions of sufficient primary irradiance.

In addition to the embodiment shown in FIG. 6, FIG. 10 shows (like FIGS. 8 and 9) also highly schematically (not to scale, and in 2D cross section) panels 701, which are at least partially filled with a thermal carrier medium, and which are geometrically relatively flat compared to their width and length, and which are mounted, at least in some locations, onto the outside facing surface of said inner shell 201 such that predominantly direct conductive thermal contact is achieved. In the shown embodiment said panels, which are at least partially filled with thermal carrier medium, serve to increase the thermal capacity of the predominantly enclosed space.

Specifically, the outside facing surfaces 7011 of said thermal carrier medium filled panels 701 have relatively low reflectivity (as close as possible to zero) at least at the NIR and MIR wavelength range. This enables utilization, when needed, of the thereby enhanced emissivity and absorption in this wavelength range. Said low reflectivity at the NIR and MIR wavelength range is suitable for situations when there is typically excessive primary irradiance, i.e. when the desired effect is to reduce the relative amount of absorbed irradiance. For situations under which it is at least temporarily desirable to also increase the relative amount of absorbed irradiance under relatively high primary irradiance, then said outside facing surfaces 7011 of the inner shell will have relatively low reflectivity at least in the VIS, NIR and MIR wavelength range. This case is illustrated in plot 602 in FIG. 10.

FIG. 10 illustrates a specific spatial adjustment of said functional elements 202 whereby a relatively large amount of surfaces 7011 is exposed to the primary radiation source, in many embodiments the sun, either directly or indirectly via reflection on the previously predominantly outside facing sides 2021 of said plurality of functional elements. Due the specific spectral properties of surfaces 2021 (relatively high VIS and NIR reflectivity), which previously resulted in desirably reflection away from said predominantly enclosed space, now permit again desirably a high degree of reflectivity off of said primary irradiance onto surfaces 7011, as illustrated in plot 601.

The low broadband reflectivity (at least at the NIR and MIR wavelength range, in the depicted case in FIG. 10 at the VIS, NIR and MIR wavelength range) enables high absorption efficiency as shown in plot 602.

Figure 11:
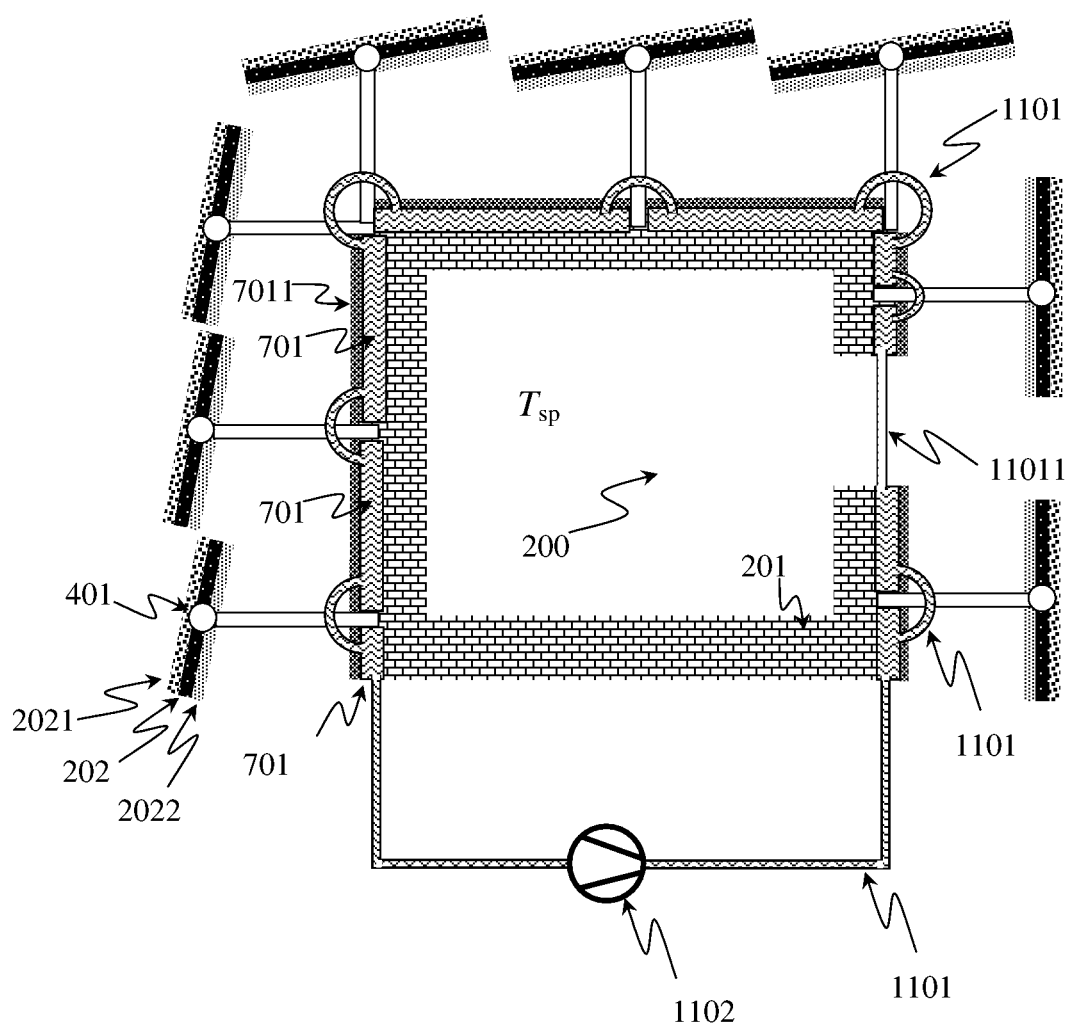
FIG. 11 schematically illustrates a 2D cross section of a typically 3D and predominantly enclosed space with a plurality of functionally connected panels.

FIG. 11 illustrates highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation.

As discussed above, said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

As discussed above, said plurality of said functional elements are mounted such that they are at least in one rotational or translational degree of freedom spatially adjustable in a manner, which permits to change the relative amount of area of surfaces 7011 (and optionally of areas 2011, which is not cover by said panels 701), which is exposed to the outside. This is schematically illustrated by a plurality of hinge-like elements 401. Thereby the ratio absorbed to incident primary irradiance can be changed over a substantial range.

Also as discussed above, shown are highly schematically (not to scale, and in 2D cross section) said panels 701, which are at least partially filled with a thermal carrier medium, and which are geometrically relatively flat compared to their width and length, and which are mounted, at least in some locations, onto the outside facing surface of said inner shell 201 such that predominantly direct conductive thermal contact is achieved. In the shown embodiment said panels, which are at least partially filled with thermal carrier medium, serve to increase the thermal capacity of the predominantly enclosed space.

The reflective properties of surfaces 2021, 2022, and 7011 are also as describes above.

In addition to the embodiments shown in the preceding Figures, FIG. 11 illustrates an embodiment wherein a plurality of at least partially thermal carrier medium filled panels 701 are functionally connected by additional piping 1101 or similar components (incl. tubes, duct, channels, etc.) in a predominantly closed configuration, which enables to redistribute (circulate) said thermal carrier medium. This flow circuitry comprises also a pump 1102 to affect said redistribution.

In many embodiments said elements 401, independent if they enable one or more of a rotational and/or a translational degrees of freedom, are powered by at least one motor, which is driven by a control system, which at least affects said spatial adjustment of said functional elements and/or of the flow of said thermal carrier medium to approximate at least one control goal, such as a desired level of temperature inside said predominantly enclosed space.

The illustration is not meant to suggest, that the pipe or channel 11011 connecting two of said panels on the right side would be fully closing said predominantly enclosed space. This applies as well to similar additional flow circuitry show in the subsequent Figures.

Figure 12:
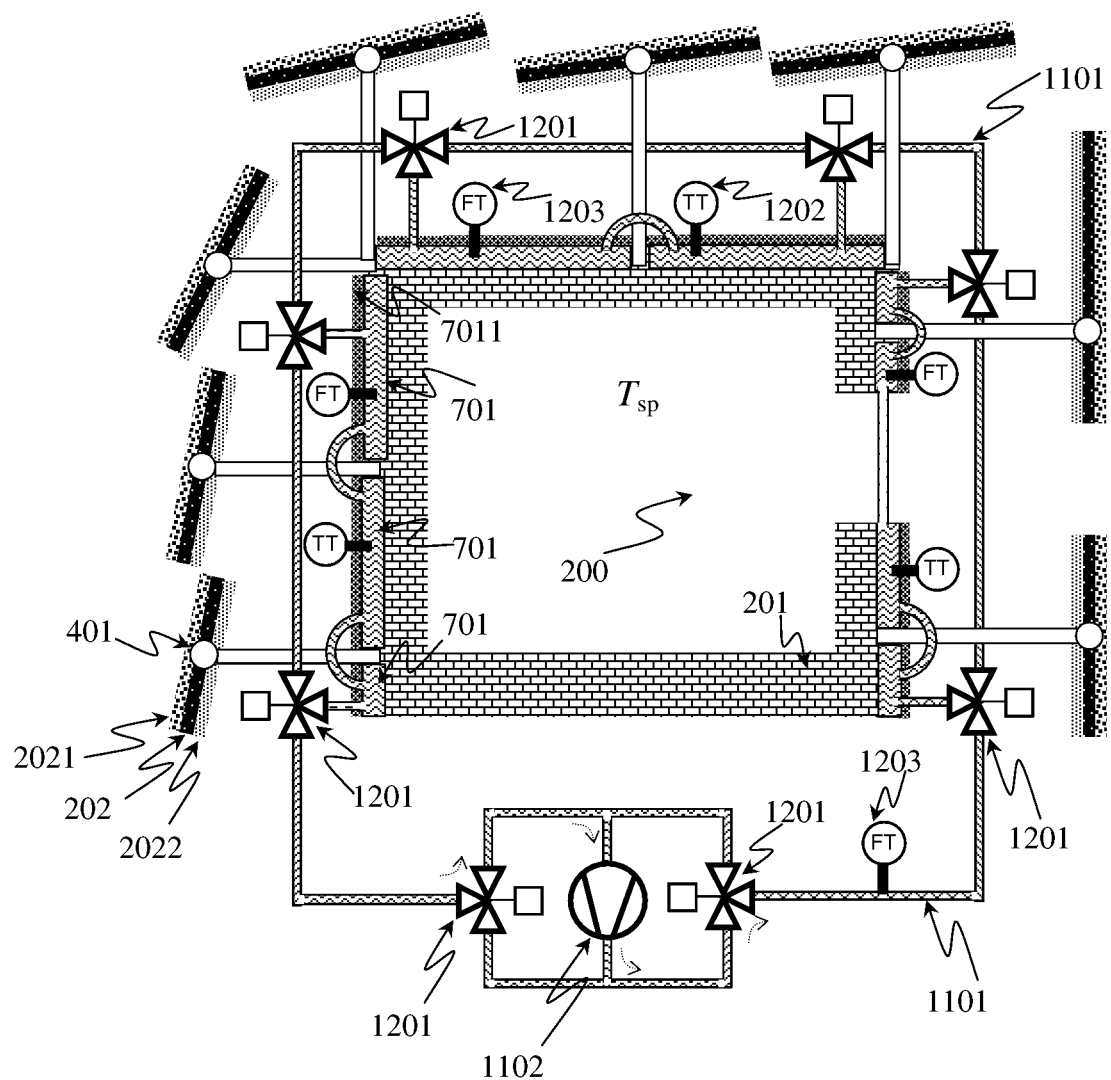
FIG. 12 schematically illustrates a 2D cross section of a typically 3D and predominantly enclosed space with several pluralities of functionally connected panels.

FIG. 12 illustrates highly schematically (and not to scale) a 2D cross section of a typically 3D and predominantly enclosed space 200, predominantly defined by a shell 201, which is exposed to direct and indirect, directionally and temporally varying levels of primary electromagnetic radiation, at least in the VIS and NIR wavelength range, often similar to spectral distributions of black bodies at temperatures of several thousand Kelvin, which in typical embodiments is predominantly solar radiation.

As discussed above, said predominantly enclosed space 200 is preferably completely covered with a single or a plurality of functional elements 202, but at least those areas are covered, which are predominantly directly exposed to said radiation. Said elements are mounted in relative proximity to the walls of the predominantly enclosed space, thereby forming effectively an inner shell 201 and an outer shell.

As discussed above, said plurality of said functional elements are mounted such that they are at least in one rotational or translational degree of freedom spatially adjustable in a manner, which permits to change the relative amount of area of surface 7011 (and optionally of area 2011, which is not cover by said panels 701), which is exposed to the outside. This is schematically illustrated by a plurality of hinge-like elements 401. Thereby the ratio absorbed to incident primary irradiance can be changed over a substantial range.

Also as discussed above, shown are highly schematically (not to scale, and in 2D cross section) said panels 701, which are at least partially filled with a thermal carrier medium, and which are geometrically relatively flat compared to their width and length, and which are mounted, at least in some locations, onto the outside facing surfaces of said inner shell 201 such that predominantly direct conductive thermal contact is achieved. In the shown embodiment said panels, which are at least partially filled with thermal carrier medium, serve to increase the thermal capacity of the predominantly enclosed space.

The reflective properties of surfaces 2021, 2022, and 7011 are also as describes above.

In addition to the embodiments shown in the preceding Figures, FIG. 12 illustrates an embodiment wherein several pluralities of at least partially thermal carrier medium filled panels 701 are functionally connected by additional piping 1101 or similar components (incl. tubes, duct, channels, etc.) as discrete groups of panels, in a predominantly closed configuration, which enables to dynamically change how said thermal carrier medium is redistributed among said set of panels.

FIG. 12 illustrates an embodiment wherein a set of three groups of independent panels 701 is formed, here one group shown on the left, one group on top, and one group to the right of side of said predominantly enclosed space 200. Said 3 groups of panels are optionally functionally connected via a plurality of powered (typically electrically driven) three-way control valves 1201, which permit to either bypass a particular group of panels, or to include it in the active flow. In addition, said pump 1102 is also positioned between two powered three-way control valves 1201, which permits to switch the direction in which the thermal carrier medium is pumped. The small dotted arrows indicate one flow mode wherein thermal carrier medium is pumped counter-clockwise. Switching those two valves will reverse the flow. (In some other embodiments a pump may be able to operate in two flow directions.)

Thus the shown configuration allows (a) use only any single group panels out of said plurality, (b) to connect and use any combination of two group of panels, (c) connect and use all three groups of panels, and (d) to choose the direction of the flow.

However, the shown configurations shall be understood to serve only as an example of many similar configurations of said flow circuitry (e.g. comprising switching matrices valves, 2-way valve, 4-way valves, etc.), which will achieve the same or similar functionality (of being able to redistribute said thermal carrier medium in a highly flexible and adoptable manner), and which should be apparent to those skilled in the art. Some such embodiments may comprise flow circuitry, which is effectively equivalent of having two counter-flowing "busses" into which any panel and/or any reservoir can be linked.

In some embodiments some of said powered three-way control valves may be solenoid powered and bi-stable, i.e. switch the flow (this is e.g. necessary for those two valves adjacent to the pump), whereas other powered three-way control valves maybe electric motor powered and permit to redirect the flow in an analog manner, i.e. permit e.g. a partial bypass of a panel.

Furthermore, the temperature and/or flow velocity (and/or flow volume per time, i.e. throughput) of said thermal carrier medium is measures by a plurality of temperature transmitters 1202 and flow transmitters 1203. Those are typically based on electronic sensors and comprise suitable electronics to transmit the measured values, in preferred embodiments digitally, either wired or wirelessly to a control system.

In many embodiments said elements 401, independent if they enable one or more of a rotational and/or a translational degrees of freedom, are powered by at least one motor, which is driven by said control system, which at least affects said spatial adjustment of said functional elements and/or of the flow of said thermal carrier medium to approximate at least one control goal, such as a desired level of temperature inside said predominantly enclosed space.

As mentioned, the illustration is highly schematic to convey the principle arrangement. The flow circuitry will practically not limit the spatial adjustment of said functional elements 202 as the image might suggest.

Figure 13:
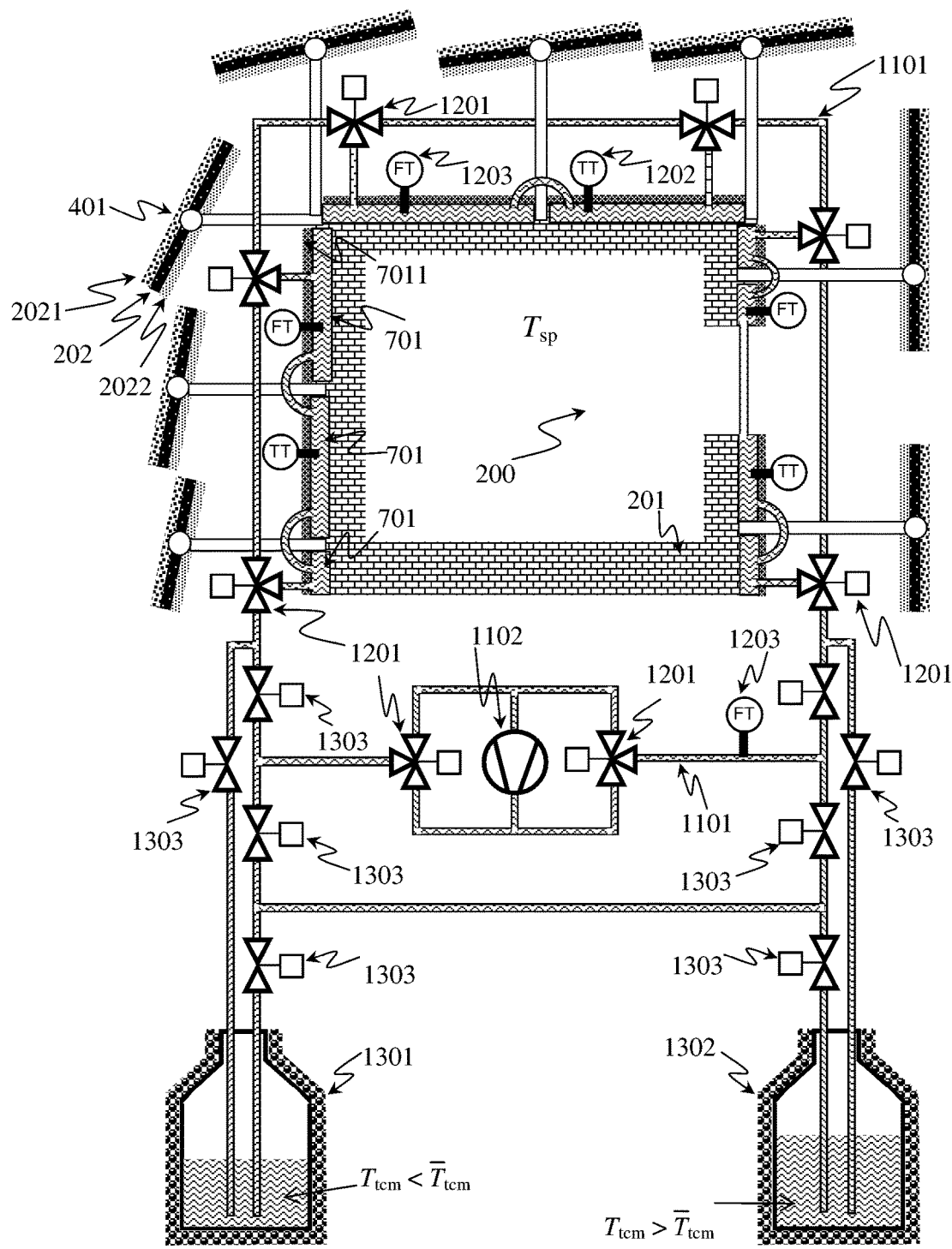
FIG. 13 is comparable to the embodiment shown in FIG. 12, with a thermal carrier medium storage tank.

FIG. 13 is comparable to the embodiment shown in FIG. 12. All components, elements, cases, and surface properties are as discussed above.

In addition, the shown embodiment further comprises one at least partially filled thermal carrier medium storage tank 1301, which is acting as a reservoir for said thermal carrier medium, which is kept at least temporarily at a temperature $T_{tcm}$ below the average temperature of said thermal carrier medium, i.e., it is in some embodiments used to store the ability to cool the shell of said predominantly enclosed space. In such an embodiment said thermal carrier medium would typically be cooled at least in some of said panels to below average operating temperature and then accumulated in at least one of said thermal carrier medium storage tanks 1301.

In addition, the shown embodiment further comprises one at least partially filled thermal carrier medium storage tank 1302, which is acting as a reservoir for said thermal carrier medium, which is kept at least temporarily at a temperature $T_{tcm}$, which is above average temperature of said thermal carrier medium, i.e. it may in some embodiments be used to store the ability to heat the shell said predominantly enclosed space and/or it is used to accumulate thermal energy during daytime, which is then disposed of during nighttime. In such embodiments thermal carrier medium would typically be heated at least in some of said panels to above average operating temperature and then accumulated in at least one of said thermal carrier medium storage tanks.

In addition, the embodiment shown in FIG. 13 comprises further additional flow circuitry 1101, such as piping or similar components (incl. tubes, duct, channels, etc.) as well as a plurality of additional (simple 2-way) power valves 1303. The shown configuration enables a very high degree of flexibility of how thermal carrier medium is distributed to and from any storage tank and any group of panels. In some embodiments some of said powered control valves 1303 may be solenoid powered and bi-stable, i.e. switch the flow on or off, whereas other powered control valves 1303 maybe electric motor powered and permit to adjust (throttle) the flow in an analog manner.

Obviously, not all possible sets of valve settings will result in useful flow paths. Thus, said control system will select from a subset of suitable flow paths, depending on said at least one control target and current and/or expected environmental conditions and thermal budget.

Again, the shown configurations shall be understood to serve only as an example of many similar configurations of said flow circuitry (e.g. comprising switching matrices valves, other types of control valves etc.), which will achieve the same or similar functionality (of being able to redistribute said thermal carrier medium in a highly flexible and adoptable manner), and which should be apparent to those skilled in the art. Some such embodiments may comprise flow circuitry, which is effectively equivalent of having two counter-flowing "busses" into which any panel and/or any reservoir can be linked.

As previously mentioned, the illustration is highly schematic to convey the principle arrangement. The flow circuitry will practically not limit the spatial adjustment of said functional elements as the image might suggest.

Figure 14:
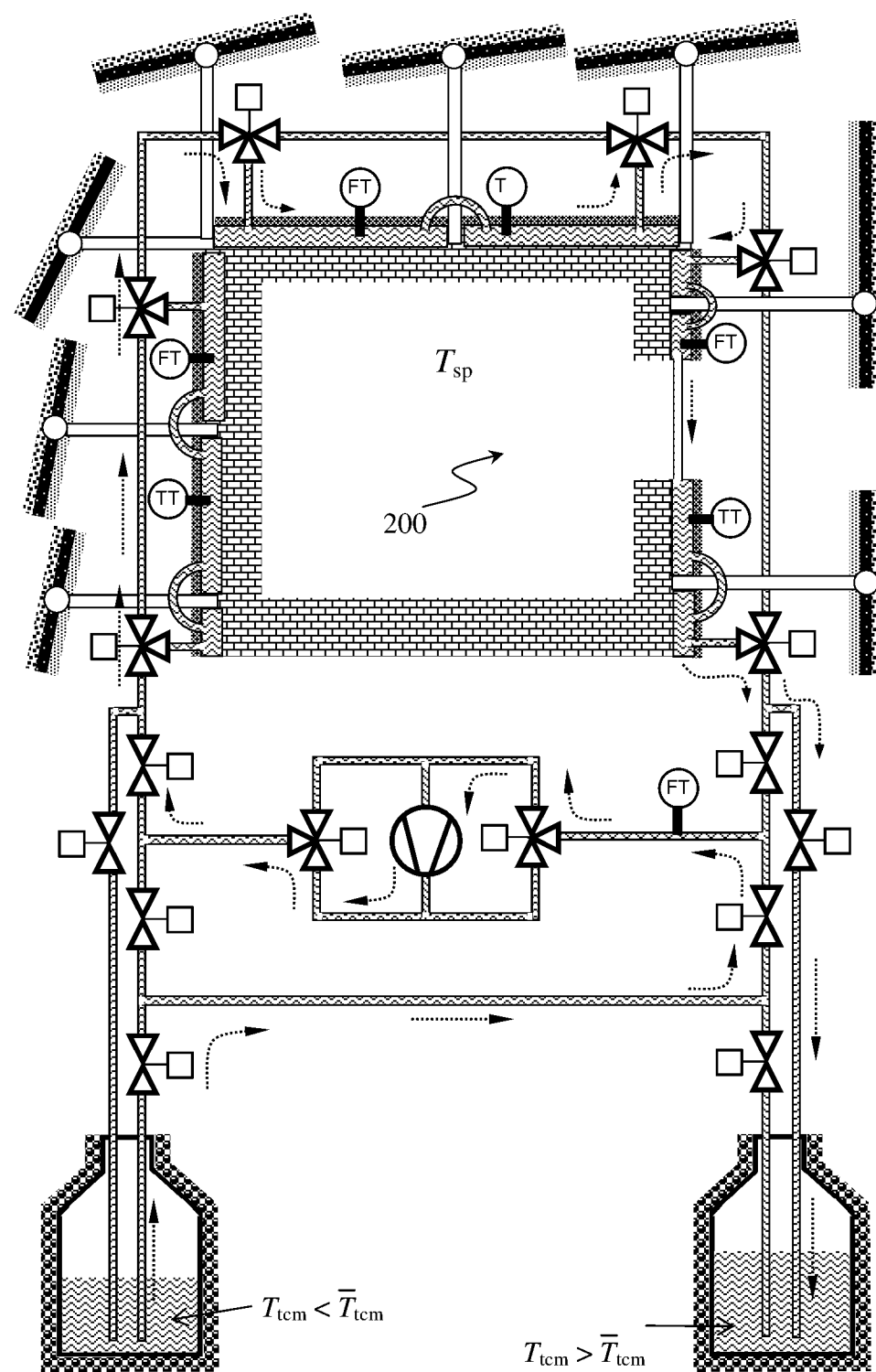
FIG. 14 is essentially identical to FIG. 13, and illustrates one example of many possible flow paths of the thermal carrier medium.

FIG. 14 is essentially identical to FIG. 13. It illustrates one example of the many possible flow paths, which the illustrated flow circuitry and valves does permit. Here, thermal carrier medium is pumped from storage tank 1301 with below average temperature on the lower left, toward the right and into the pump flow circuitry, with the two adjacent 3-way valves set such that the pumping occurs clockwise around said predominantly enclosed space. The set of said group of panels on the left side are bypassed. Then the thermal carrier medium flows into the group of panels on the top of said predominantly enclosed space, from where it flows the group of panels on the right side said predominantly enclosed space. From there it flows into the storage tank 1302 with above average temperature of said thermal carrier medium.

The large plurality of possible flow paths should thus become apparent to those skilled in the art.

Figure 15:
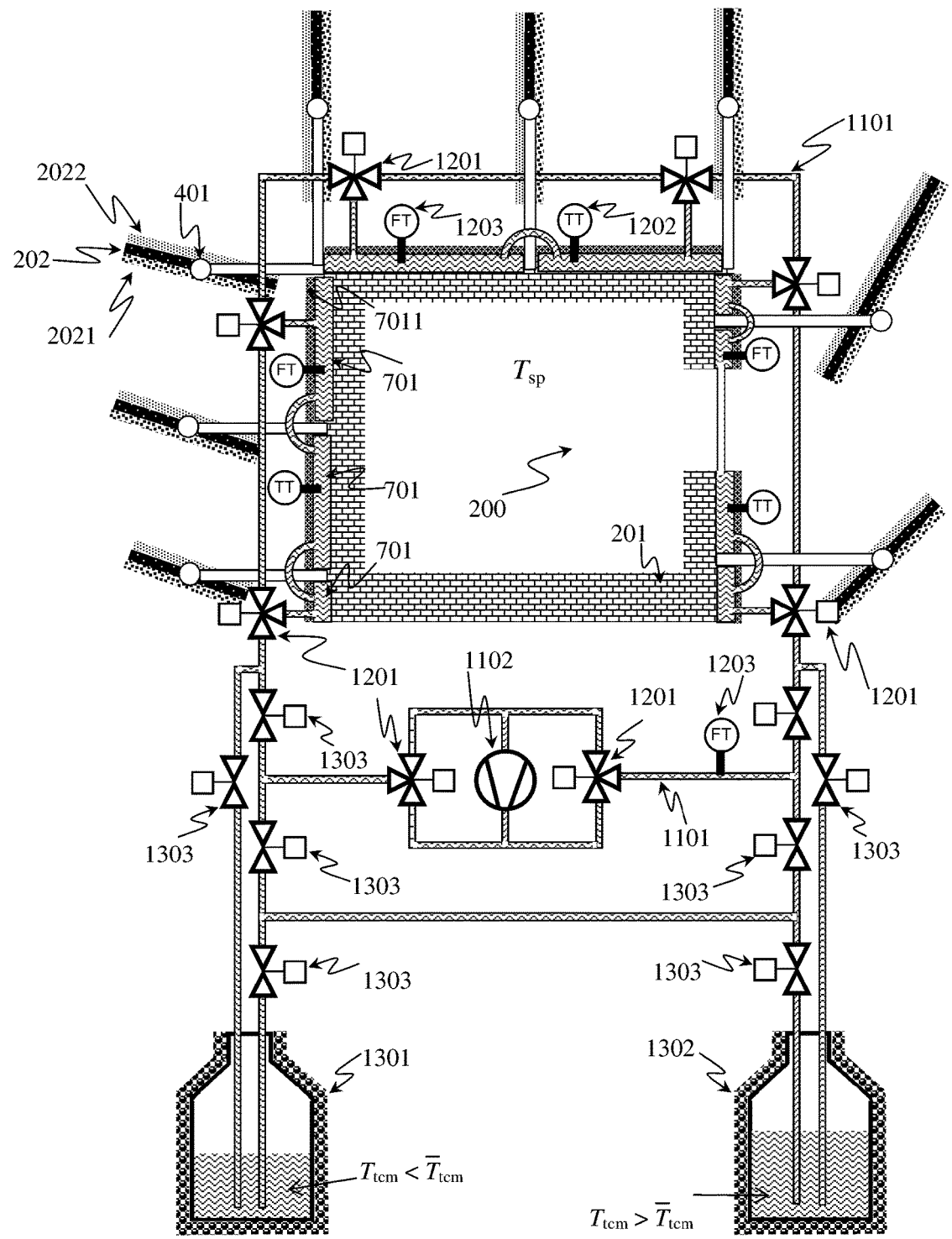
FIG. 15 is essentially identical to FIG. 13, but illustrates functional elements with a different spatial adjustment.

FIG. 15 is essentially identical to FIG. 13. However, it illustrates said functional elements 202 with a different spatial adjustment, which in some embodiments may be used to reduce the thermal budget of said predominantly enclosed space and/or said thermal carrier medium under conditions of negligible primary irradiance as already discussed in more detail above under to comments to FIGS. 5 and 9.

Figure 16:
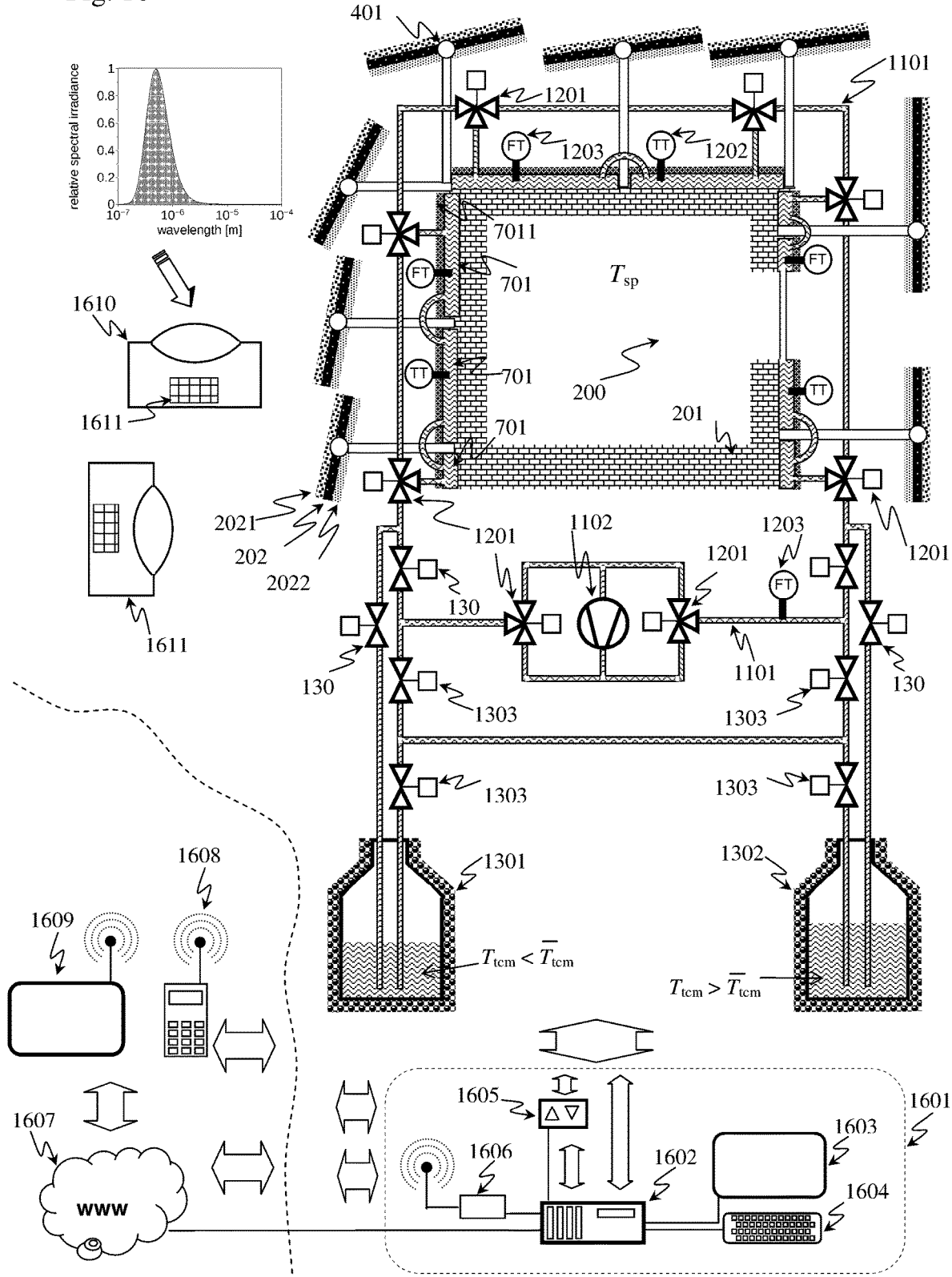
FIG. 16 is essentially identical to FIG. 13, but also schematically indicates the presence of a control system.

FIG. 16 is essentially identical to FIG. 13. In addition, it schematically indicates the presence of a control system 1601. However it must be noted that such a control system will typically have been present in the embodiments shown in the previous Figures, but it was omitted in the illustration for clarity and to better convey the technical principle.

In typical embodiments said control system comprises at least one processing unit 1602, which may further comprise a plurality of analog and/or digital I/O boards, which send signals to and/or receive signals from a plurality of sensors (such as 1202 and 1203), motors, and other actuators, such as for example motors affecting the spatial adjustment of said functional elements 202 (e.g. a rotational motion pivoting on hinge-like elements 401) and of said flow of thermal carrier medium (e.g. via said at least one pump 1102 and said valves 1201 and 1303). For digital signals this may in some embodiments comprise standards such as RS232, RS485, RS422, GPM, LonWorks, SCADA, CAN, CANopen, Profibus, SafetyBUS, INTERBUS, SERCOS, Sinec H1, Ethernet, EtherCAT, (and all other Ethernet based communications systems) or other types of networks and field buses.

The processing unit may be based on any suitable computational architecture, incl. for example x86, x86-64, ARM etc, incl. embedded systems, and may at least partially also comprise FPGAs and/or PLCs. The chassis and/or bus structure of said processing unit 1602 may in some embodiments be based on PCI, PXI, PXIe.

In some embodiments said at least one processing unit 1602 has a human-machine interface comprising at least one display 1603 and/or at least one keyboard 1604. In some embodiments there are options for voice based interactions with said at least one processing unit. In some embodiments at least one processing unit 1602 may be connected to a computer network used within said predominantly enclosed space and a person may use another computer on said network to exchange date, including commands, with said at least one processing unit.

In some embodiments some signal lines from said plurality of analog and/or digital i/o boards may be directly connected to said a plurality of sensors, motors, and other actuators, while some other signals may have to undergo amplification, filtering, conversion, or other processing in additional electronic components 1605. This may in some embodiments comprise, power amplifiers, driver for stepper motors, signal modulators/demodulators etc. In some embodiments the communication between said at least one processing unit 1602 including said additional electronic components 1605 and said sensors and actuators may at least partially be wirelessly.

Furthermore, schematically shown is said at least one processing unit 1602 at least temporary achieving connectivity of said control system 1601 to the internet and/or a cell network for mobile devices. In some such embodiments said control system 1601 is directly connected to the internet using an ethernet network already present in said predominantly enclosed space. In some embodiments said control system 1601 may comprise or exchange data with a module 1606 at least in part compatible with any one of IS-95, IS-2000 (CDMA), EV-DO, GSM, EDGE, UMTS, LTE, HSPDA, WiMAX (IEEE 802.16), LMDS/WiBAS, HiperMAN, HiperLAN, iBurst, standards, or a radio-transmitter compatible with any future comparable such standard (incl. '5G').

Thus, in some embodiments remote (or local) mobile devices such as telephones 1608, including so-called smartphones, or other effectively mobile computers, incl. so-called pads, may be used to communicate with said control system 1601 either via the internet and/or a mobile phone network, and/or any other communication at least partially comprising such forms of data exchange.

In some embodiments said control system 1601 also receives signals from a single or a plurality of electronic sensors, which acquire irradiance levels, and/or directional information of said irradiance, and/or temperature measurement of any one or any combination of radiation sources and sinks, which are external to said predominantly closed space. This is symbolically illustrates by a camera like sensor 1610, further comprising a two-dimensional receptor array (e.g. a CMOS or CCD chip), which allows to computationally derive directional information, thus enabling for example solar tracking and corresponding adjustment of said functional elements 202 according to a specific control target.

In some embodiments said sensors, such as the two-dimensional receptor array, is at least in part sensitive to radiation at NIR and/or MIR wavelength and radiative temperature information can be derived. In some embodiments at least one of such sensors is used to acquire temperature data (in particular the spatial distribution thereof) of said predominantly enclosed space 200, and/or said functional elements 202, and/or said at least partially thermal carrier medium filled panels 701, and the information is used to aid said control system to approximate its at least one control target. Such a sensor is schematically illustrates as item 1611, which is predominantly facing towards said predominantly enclosed space.

It shall be noted that the disclosed invention is applicable to a wide variety of predominantly enclosed spaces ranging from simple shacks, shelters, tents, containers, temporary or emergency housing units, mobile homes, trailer, or vans, to high-end energy-consumption optimized villas and other houses (incl. so called "zero-energy house") in the first world. This also includes structures, which are being used for fabrication or storage of goods, including food, garages, office buildings, and even high-rising buildings typically found in the center of modern cities.

Furthermore, the invention relates to any other predominantly enclosed spaces, which are exposed to electromagnetic radiation at least in the VIS and NIR wavelength range, and wherein it is desired to reduce temperature variations on the inside of said predominantly enclosed spaces while minimizing or completely eliminating the energy expenditure for required heating or cooling, and/or wherein it is desired to reduce the time to reach a desired temperature on the inside of said predominantly enclosed spaces, and/or wherein it is desired to increase the precision with which the temperature inside said predominantly enclosed spaces can be controlled.

In some respects the disclosed invention concerns methods and strategies how a control system operates, which at least in one aspect attempts to achieve a certain control goal, and which is able to affect said changes in effective reflective properties and spatial distribution of thermal energy. A typical control goal may be to sustain, within a certain range, a certain desirable temperature on the inside of a building or other predominantly enclosed space, with reduced effort in terms of energy expenditure (and corresponding average and peak power requirements), specifically in some embodiments with respect to reducing electrical energy consumption for air conditioning.

Thus, in some embodiments the primary purpose of the disclosed invention is the thermal management of predominantly enclosed spaces, habitats, and other buildings with reduced effort in terms of operational cost (expenditure of external energy), and not primarily to extract (ultimately electric) energy from the incoming solar radiation. For such applications thermal troughs (focusing solar-thermal systems, wherein an operational medium/liquid will typically reach temperatures of several hundreds of degrees Celsius), or photo-voltaic (PV) systems are much better suited, but they are considerably more expensive. In contrast, the disclosed methods and functional elements are in many instances based on relatively inexpensive and abundant materials and other relatively simple components. Nevertheless, the disclosed methods and elements can advantageously be combined with e.g. solar-voltaic elements, i.e. portions of the building envelope can also be used to obtain electric energy, or even some of the disclosed elements may also have photo-voltaic cells mounted onto them.

In some respects the disclosed invention concerns various functional elements and methods to operate them, which enable the construction of buildings, which react to varying levels of incident electromagnetic irradiance, ambient temperature, and other environmental factors, in that a building, or other predominantly enclosed space, changes its effective reflective behavior, i.e. the (on average) relative amount of incident electromagnetic irradiance, which is absorbed and converted to thermal energy (and conversely also the mount of thermal energy, which is radiated from the building under conditions of negligible irradiance), as well as changes the spatial distribution of thermal energy within the building, but specifically also on and in its walls. To use an analogy, living creatures can to some degree change their skin structure and blood flow as a reaction to changing environmental conditions.

As mentioned, three of the dominating physical mechanisms (of numerous physical effects, which have influence, depending on a particular structure), which are essential for thermal management are:

radiative energy transfer of thermal energy (via electromagnetic waves), conductive thermal energy transfer, and thermal energy storage and spatial distribution.

Subsequently, electromagnetic irradiance, also referred to as radiative flux, or radiant flux density, i.e., power per area, shall be denoted as $\Phi_r = P/A$ in [W·m$^{-2}$]. To clearly distinguish this from energy, we will henceforth denote the later only with Q in [Ws], or [J].

Radiative thermal energy transfer is primarily governed by the following laws:

Planck's law describes the spectral distribution of the radiative flux, i.e., spectral radiance, an ideal black body emits as a function of temperature and wavelength. Expressed in differential form $$d\Phi_r(\lambda,T) = 2\pi hc^2\lambda^{-5} \cdot (\exp(hc\lambda^{-1}k^{-1}T^{-1})-1)^{-1}d\lambda,$$

it gives the radiative power density per wavelength "slice", wherein h=6.63·10$^{-34}$ Ws$^2$ is Planck's constant, c=3·10$^8$ m/s is the velocity of light, and k=1.3810$^{-23}$ Ws/K is Boltzmann's constant.

(An approximation to Planck's law is Wien's law, here again in differential form:

$$d\Phi_r(\lambda,T) = 2\pi hc^2\lambda^{-5} \cdot (\exp(h\ c\lambda^{-1}k^{-1}T^{-1}))^{-1}d\lambda$$

which somewhat underestimates spectral radiance at wavelength larger than the wavelength of the maximum spectral radiance.)

We shall give a few examples for irradiance levels of ideal black bodies at temperatures not uncommonly found on earth within the environment. For example, at T=293.1 K=20° C. the irradiance is $\Phi_r$=412 W/m$^2$, at an only 20 K higher temperature of T=313.1 K=40° C. it already increases to P=537 W/m$^2$ and at T=365.8 K=92.7° C. it reaches P≈1 kW/m$^2$.

However, at T=5780 K, the surface temperature of the sun, the radiance of an ideal black body reaches 62 MW/m$^2$. This extraordinary increase in power emission efficiency with temperature is one of the reasons why the sun, at its given size, can emit such an enormous power ($\approx 4 \cdot 10^{26}$W) that the solar irradiance at the average distance to earth, i.e. above earth' atmosphere, is about 1370 W/m², despite the large distance to the sun.

By integrating Planck's law over all wavelengths Stefan-Boltzmann's law can be derived, which makes more apparent this (highly non-linear) correlation between the temperature and the total radiated. i.e. emitted power density (per area), i.e. radiative flux or irradiance, of an ideal black body $$\Phi_r = \sigma T^4$$

with $\sigma \approx 5.67 \cdot 10^{-8}$ W m$^{-2}$ K$^{-4}$ being the Stefan-Boltzmann constant. Furthermore noteworthy is that the lower the temperature of an object, the more is the spectral distribution of the emitted radiance shifted towards larger wavelength. The value of the wavelength where the spectral radiance has its maximum, as a function of temperature can be derived to be $$\lambda_{max}(T) = 0.201 \cdot h \, c \, \lambda^{-1} k^{-1} T^{-1}$$

$$\lambda_{max}(T) = 2.9 \cdot 10^{-3} \, m/K \cdot T^{-1}$$

For example, at T=5780 K, the temperature of the surface of the sun, $\lambda_{max} \approx 0.5$ μm, whereas for example at the mentioned temperature of T=365.8 K=92.7° C. the highest spectral irradiance is at approximately $\lambda_{max} \approx 8$ μm. At a room temperature of T=293.1 K=20° C. the maximum of the spectral radiance is at $\lambda_{max}$=9.9 μm. Thus visual color, and thermal radiative behavior can be considerably different.

To describe the reduced emitted power density of non-black bodies, an additional dimensionless multiplicative factor, the spectral emissivity dε(T,λ) [0,1] is introduced. If integrated over all wavelengths, this factor represents the emissivity s relative to a perfect black body. Following Kirchhoff's law, we will here assume emissivity and absorptivity dα (T,λ) (i.e., the ration of absorbed to incident radiation, either per wavelength, or integrated over the considered spectrum) to be effectively identical. Related to emissivity is spectral reflectivity, or integrated over al wavelength referred to just as reflectivity, which is given by (1-ε), or correspondingly (1-α)

The spectral distribution of solar radiation (prior to wavelength-selective attenuation by earth' atmosphere) resembles a black body spectrum of the same temperature relatively well. Objects, which are exposed to solar radiation, specifically those with high absorption at least at VIS and NIR wavelength, and which are placed in vacuum and have thereby negligible convective losses, can reach temperature of several hundreds of Kelvin. (Theoretically the same temperature as the radiation source under ideal conditions). This effect is utilized in some solar-thermal absorbers. (The effectiveness of vacuum insulation can also make thermal management of spacecraft under prolonged solar radiation exposure non-trivial.)

Surfaces of objects on earth and under atmospheric conditions, which are exposed to direct sunlight, can still easily reach temperatures substantially (several 10s of Kelvin) above ambient values and the heat flux into the building can significantly increase the temperature inside buildings (and increase the energy stored in the structure). To give one practical example, in south-western location of the US, and at sea level, the solar radiation levels can be such that at an ambient temperature of T=20° C. the surface of a stone or concrete wall can easily reach T=50 to 60° C. Black surfaces, such as layer of tar, can reach T=80° C.

Conventional methods of improving the thermal insulation of building envelopes, which primarily aims at reducing the thermal conductance of the structure (thus minimizing temperature variations on the inside), are generally static in nature, both in a sense that the involved components and elements are (a) immobile and that (b) the spatial distribution of retained thermal energy cannot be intentionally changed (since it is only determined by the energy input and the arrangement of the building material and its properties (heat capacity, thermal conductance, density, reflectivity, etc.)

According to the disclosed invention, the impact of electromagnetic irradiance, predominantly at least in the VIS and NIR wavelength range, on the absolute amount of the temperature inside a predominantly enclosed space, which is exposed to directionally and temporally varying levels of said primary electromagnetic radiation is modulated by placing in the relative proximity of said predominantly enclosed space a plurality of functional elements 202. The predominantly enclosed space 200 is preferably completely covered with said elements, but at least those areas are covered, which are predominantly directly exposed to said radiation.

Said functional elements are mounted in relative proximity to the walls 201 of the predominantly enclosed space 200, thereby forming effectively an inner shell and an outer shell. The inner shell remains in most embodiments primarily responsible for sealing the predominantly enclosed space against water and wind, and potentially gas pressure differences, and in most embodiments also for its structural integrity.

In some embodiments said functional elements can be metallic, ceramic (incl. glass, clay, minerals, or concrete), or plastic (or other polymer based synthetic materials), and/or multi-layered composites of such materials. Said elements have generally one spatial dimension with is significantly smaller than the two others.

The placement of said functional elements is such that thermally conductive bridges to the inner shell via direct contact are relatively small or effectively negligible.

In some embodiments the placement of said functional elements is at least partially such that thermally conductive bridges to the inner shell via direct contact are reduced by mounting said functional elements, or a plurality of frames which support said functional elements, directly onto the inner shell of said predominantly enclosed space using a plurality of additional support elements, which are predominantly small compared to the size of said functional elements.

In some embodiments the placement of said functional elements is at least partially such that thermally conductive bridges to the inner shell via direct contact are effectively eliminated by mounting said functional elements, or a plurality of frames which support said functional elements, on a supportive structure, which is predominantly separate and structurally independent from said inner shell.

In general the thickness, and thus material expenditure, of said functional elements is predominantly equal or small compared to the thickness of said inner shell.

The predominantly toward the outside facing surfaces 2021 of said functional elements have generally highly reflective properties for electromagnetic waves at least in the VIS and NIR wavelength range. In some embodiments the surface has additional layers or coatings applied to achieve super-reflective properties (or the material has corresponding bulk properties), i.e., relatively very high reflectivity both at VIS and at NIR wavelength is realized.

In some embodiments said surfaces 2021 have at VIS wavelength certain non-white colors (incl. patterns mimicking the appearance of conventional building envelopes, such as stones or tiles), but retain relatively high reflectivity at NIR wavelength thereby considerably reducing the relative amount of solar radiation, which is converted to thermal energy (initially on said functional element.). In some embodiments said reflective properties are achieved by using coatings or bulk materials, which are at least in part based on tailored mixes of nano- and micro particles (and/or cavities) to approximate a desired spectral reflectivity.

Thus the relative amount of incoming radiative power, which is absorbed by said functional elements 202, is reduced. For example, 96% of the solar irradiance arriving at sea level is within the VIS and NIR wavelength range. Said functional elements will under exposure to sufficient VIS and/or NIR radiation in general assume a temperature which is considerably lower than the temperature of the radiation source, but larger than the temperature of the surfaces 2011 of said inner shell.

As a result, the spectral irradiance of the radiation emitted by said elements will predominantly be shifted into the NIR and MIR wavelength range. Thus, in some sense said functional elements act at least partially as a spectral transformers, which shift the spectrum to wavelengths were radiative energy transfer is less efficient. According to the disclosed invention, the predominantly inside facing surfaces 2022 of said functional elements have predominantly relatively highly reflectivity at least in the NIR and MIR wavelength range, whereby the radiative thermal emissivity of said functional elements is reduced. Thereby their ability of radiative power transfer to the inner shell is reduced.

In some embodiments said functional elements are arranged such that a plurality of predominantly parallel outer layers is formed, which are positioned in relative proximity to each other compared to their size (of the two large dimensions). The outermost layer predominantly receives the primary incident electromagnetic radiation and converts, according to its reflective spectral properties, a relatively small portion thereof to thermal energy, and the conductive thermal power transfer between said layers is small compared to the radiative thermal power transfer between those layers. The radiative output of the inside of one layer constitutes the predominant radiative input of the adjacent inwardly located layer. The radiant emittance of the most inwardly located layer constitutes the predominant radiative input on the surfaces 2011 of the inner shell.

In some preferred embodiments of the disclosed invention, the predominant effect and target is to reduce, on average, radiative energy input in said predominantly enclosed space. A typical application is to reduce the temperature increase inside of human habitats under extensive solar radiation. In such embodiments the outside facing surfaces 2011 of the inner shell of the predominantly enclosed space have, like the inside facing sides 2022 of said functional elements, relatively high reflectivity (as close as possible to unity) at least at NIR and MIR wavelength, ideally also at FIR, thereby reducing absorption and thermal emissions in these wavelength ranges. In some such embodiments said outside facing surfaces 2011 of said inner shell may have certain (non-black and non-white) colors or patterns in the VIS range. Again, such reflective properties may be achieved by using coatings or bulk materials, which are at least in part based on tailored mixes of nano- and micro particles (and/or cavities) to approximate a desired spectral reflectivity.

Some degree of functionality and improvements in terms of the thermal management (e. g. expenditure of external energy for air conditioning) can already be achieved with this static (i.e., immobile) arrangement of said functional elements and said reflective surface properties compared to regular building envelopes, which are also based also on conventional building materials.

The outer shell, at least partially formed by said functional elements 202, being thermally convectively predominantly decoupled from said inner shell, substantially reduces the portion of solar radiation, which the entire structure has to absorb. However, during continued exposure to substantial solar radiation, and due to the practically always remaining finite absorption values, even of the best reflective surfaces, a temperature increase of said functional elements will result, which in turn increases the temperature of said predominantly enclosed space.

Therefore, substantial additional improvements can be realized, if according to the disclosed invention said functional elements are spatially adjustable.

Spatially adjustable, or a spatial degree of freedom, shall mean that said plurality of functional elements 202 are mounted such that there is at least one translational or rotational degree of freedom. In some embodiments this may be a single rotational degree of freedom around a horizontal or vertical axis, such as for example the hinge-like elements 401. In some embodiments there may be two rotational degrees of freedom whereas in other embodiments there may be one rotational and one translational degree of freedom. In yet some other embodiments said functional elements may also be able to change their shape.

The primary, incoming electromagnetic irradiance shall be denoted as $_p\Phi_r$ in [W·m$^{-2}$]. The electromagnetic irradiance, which is incident on the inner shell, shall be denoted as $_{is}\Phi_r$ in [W·m$^{-2}$].

The average ratio of irradiance on the inner shell to the primary incoming irradiance the $_p\Phi_r/_{is}\Phi_r$ is at least in some respect a measure for the degree to which the incoming electromagnetic power has been attenuated. (This value may also locally vary across the surface of the predominantly enclosed space.) This value is helpful and meaningful under most conditions with substantial primary irradiance (i.e., sufficient to cause relevant changes in the total energy stored in the predominantly enclosed space), the value ranges from [0,1], with 0 corresponding to a (theoretically) perfect attenuation, and 1 corresponding to a non-existing attenuation.

From a theoretical standpoint it shall be commented, that this value is only meaningful while there is a non-zero amount of primary irradiance. There can be times, when the primary irradiance becomes very weak, and more irradiance, which is incident on the inner shell, is produced by said functional elements. In such a case the value would already exceed unity (theoretically going to infinity for zero incoming irradiance). In such cases the predominantly enclosed space becomes the primary radiation source and it would be more suitable to define ratios, which describe the effectiveness of how its radiative properties are influenced by the functional elements.

The change in spatial orientation of said functional elements allows modulating said ratio in a desirable manner, specifically to help increase or reduce total energy stored in said predominantly enclosed space and/or in subsequently described panels, which are filled with a thermal carrier medium. This works particularly efficient if sides 2021 of said functional elements have relatively reflectivity at least within the VIS and NIR wavelength range, and the other sides 2022 have relatively high reflectivity at least within the NIR and MIR wavelength range, and the outside facing surfaces 2011 of the inner shell of the predominantly enclosed space has relatively low reflectivity (as close as possible to zero) at least at the NIR and MIR wavelength range, ideally also at FIR. Thereby the $_p\Phi_r/_{is}\Phi_r$ ratio can be changed over a substantial range.

Above mentioned embodiment is particularly suitable for situations when there is typically excessive primary irradiance, i.e. when the desired effect is to reduce the relative amount of absorbed irradiance under exposure and to enhance the amount or emitted thermal energy during phases of negligible primary irradiance.

For situations under which it is not only desirable to reduce the relative amount of absorbed irradiance under relatively high primary irradiance, but it is also desirable, at least temporarily and during certain periods, to increase the relative amount of absorbed irradiance under relatively high primary irradiance, the above mentioned embodiments is modified such the said outside facing surfaces 2011 of said inner shell of said predominantly enclosed space have not only relatively low reflectivity (as close as possible to zero) at least at the NIR and MIR wavelength range, but at least in the VIS, NIR and MIR wavelength range.

This allows the predominantly enclosed space, such as buildings or other human habitats, to react to changing levels of solar irradiance, potentially also taking into account ambient air temperature, air speed, and humidity. Thus, according to the disclosed invention, also a method and elements are provided, which allow modulating the impact of electromagnetic irradiance, predominantly at least in the VIS and NIR wavelength range, on the absolute amount and the variations of the temperature inside a predominantly enclosed space, which is exposed to directionally and temporally varying levels of said primary electromagnetic radiation.

As previously described, said plurality of functional elements 202 are mounted in relative proximity to the walls of the predominantly enclosed space, thereby forming effectively an inner shell and an outer shell. The inner shell remains primarily responsible for sealing the predominantly enclosed space against water and wind, and potentially gas pressure differences, as well as in most cases for the structural integrity.

The placement of said spatially adjustable functional elements is such that thermally conductive bridges to the inner shell via direct contact are relatively small or effectively negligible.

In some embodiments the placement of said spatially adjustable functional elements is at least partially such that thermally conductive bridges to the inner shell via direct contact are reduced by mounting said functional elements, or a plurality of frames which support said functional elements, directly onto the inner shell of said predominantly enclosed space using a plurality of additional support elements, which are predominantly small compared to the size of said functional elements.

In some embodiments the placement of said spatially adjustable functional elements is at least partially such that thermally conductive bridges to the inner shell via direct contact are effectively eliminated by mounting said functional elements, or a plurality of frames which support said functional elements, on a supportive structure, which is predominantly separate and structurally independent from said inner shell.

In addition, said plurality of said functional elements are mounted such that they are at least in one degree of freedom spatially adjustable in a manner, which permits to change the ratio of the amount of surface area of said inner shell, which is exposed to the radiation source vs. the amount that is shielded by said functional elements.

In typical embodiments a control system adjusts the spatial position of said functional elements such that thermal energy budget of said predominantly enclosed space is influenced according to at least one desired control target, which has been computed, preset, or based on a remote or local user input.

In some embodiments there are additional suitable means, which enable said control system to affect said adjustments of said at least one translational or rotational degree of freedom of said plurality of functional elements. In many embodiments these are electric motors, including stepper motors and suitable drive electronics. In some embodiment there are additional suitable mechanical means, including but not limited to chains, belts, shafts, gears etc., to mechanically at least partially couple at least some of said plurality of functional elements. Thus, in some embodiments a smaller number of motors is required than the number of functional elements. For example, in some embodiments there may be a single motor per wall of said predominantly enclosed space.

In some embodiments said control system may, in order to achieve its control target or targets, at least in part be based on any single or any combination of the following strategies:

Said control system predominantly positioning said functional elements such that the area of the inner shell, which is effectively exposed to the primary radiation source, is relatively small when it is desirable to reduce the average ratio the irradiance, which is incident the inner shell, compared to the primary electromagnetic irradiance, which is incident on the outside of said functional elements under conditions of excessive primary irradiance, and sufficient thermal energy budget of said predominantly enclosed space. Thereby the rate of increase of the thermal budget (i.e. power converted to thermal energy) of the predominantly enclosed space is relatively small. The adjustment of said functional elements 202 is such that predominantly sides 2021 are facing towards the outside and/or the radiation source. This applies for example under scenarios of relative high primary irradiance, when the control target is to avoid or reduce speed of the increase of the temperature inside said space. This may in many instances be the case during daytime hours, when the ambient temperature is already sufficient, if not too high for human comfort, and in addition there are conditions of predominantly cloudless sky, hence substantial solar radiation.

Said control system predominantly positioning said functional elements such that the area of the inner shell, which is effectively exposed to the primary radiation source, is relatively large, when it is desirable to increase the average ratio the irradiance, which is incident the inner shell, compared to the primary electromagnetic irradiance, which is incident on the outside of said functional elements, under conditions of sufficient primary irradiance, and reduced thermal energy budget of said predominantly enclosed space. Thereby the rate of increase of the thermal budget (i.e. power converted to thermal energy) of the predominantly enclosed space is relatively large. This applies for example under scenarios of relative high primary irradiance, and when the control target is to increase the thermal budget and/or the temperature inside said space.

Said control system predominantly positioning said functional elements such that the area of the inner shell, which is effectively exposed to outside, is relatively small when it is desirable to reduce radiative thermal losses of the inner shell under conditions of insufficient primary irradiance, and reduced thermal energy budget of said predominantly enclosed space. Thereby the rate of decrease of the thermal budget of the predominantly enclosed space is relatively small. The spatial adjustment of said functional elements 202 is such that predominantly sides 2022 are facing towards the inside and towards surface 2011. The relatively high NIR and MIR reflectivity of the inside facing side of said functional elements helps to reduce radiative losses from said inner shell. This applies for example under scenarios of relative low primary irradiance, e.g. at night, i.e. when the irradiance is insufficient to affect an increase of the thermal budget of said predominantly enclosed space and instead radiative or other losses would dominate and reduce the thermal budget, and when the control target is to predominantly sustain the temperature inside said space.

Said control system predominantly positioning said functional elements such that the area of the inner shell, which is effectively exposed to the outside, is relatively large when it is desirable to increase radiative thermal losses of the inner shell under conditions of insufficient primary irradiance, and excess thermal energy budget of said predominantly enclosed space. This may in many instances be the case during nighttime hours, when ambient temperatures are relatively low.

Said control system predominantly positioning said functional elements such that the area of the inner shell, which is effectively exposed via reflection on the predominantly inward facing side of said functional elements towards the sky, is relatively large when it is desirable to affect enhanced radiative thermal losses of the inner shell under conditions of negligible primary irradiance, and excess thermal energy budget of said predominantly enclosed space. Under conditions of low humidity of the air (also preferably at higher elevation) a cloudless night sky represents a good sink for thermal radiation. Theoretically, the background radiation (present beyond earth' atmosphere space) corresponds to a temperature of $T=4$ K, but practically an observer at the surface of the earth can measure values, which corresponds to the temperature of the upper atmosphere. Even during daytime, the equivalent temperature of a clear sky (shielded from solar radiation of course) can be several 10s of Kelvin below ambient temperature.

Thus, it can be preferable that during clear nights said control system adjusts said functional elements such that thermal radiation, which is emitted from the inner shell, is predominantly reflected towards the sky. The sky will represent a far better thermal sink e.g. compared to the direct environment e.g. of a building, such as soil, pavement, or vegetation. Since for most practical cases (typical temperatures of buildings) the radiative losses occur primarily at FIR and NIR wavelength, the inventive properties of sides 2022 of said spatially adjustable elements having high reflectivity at these wavelengths support such an operational mode.

Again, in some embodiments the predominantly outside facing sides 2021 of said spatially adjustable functional elements 202 may have broadband super-reflective properties at least in the VIS and NIR wavelength range, either due to applying additional layers or by using bulk materials, which are at least in part based on the use of tailored mixtures of populations of nano- and/or micro particles and/or cavities with distinct properties per population.

In some other embodiments The predominantly outside facing sides 2021 of said spatially adjustable functional elements 202 may have certain desired non-white and non-black colors within the VIS wavelength range (although typically very bright colors), but retain super-reflective properties at least in the NIR wavelength range, either due to applying additional layers or by using bulk materials, which are at least in part based on the use of tailored mixtures of populations of nano- and/or micro particles and/or cavities with distinct properties per population. In such embodiments the colors and patterns in the VIS range may resemble the appearance of walls and roofs of conventional building.

In some embodiments The predominantly inside facing sides 2022 of said functional elements 202 may have broadband super-reflective properties at least in the NIR and MIR wavelength range, either due to applying additional layers or by using bulk materials, which are at least in part based on the use of tailored mixtures of populations of nano- and/or micro particles and/or cavities with distinct properties per population.

In some embodiments The predominantly inside facing sides 2022 of said spatially adjustable functional elements 202 may have broadband super-reflective properties at least in the NIR and MIR wavelength range as well as certain desired non-white and non-black colors within the VIS wavelength range, either due to applying additional layers or by using bulk materials, which are at least in part based on the use of tailored mixtures of populations of nano- and/or micro particles and/or cavities with distinct properties per population.

In some embodiments the outside facing surfaces 2011 of the inner shell may have super emissive properties at least in NIR and MIR wavelength range, either due to applying additional layers or by using bulk materials, which are at least in part based on the use of tailored mixtures of populations of nano- and/or micro particles and/or cavities with distinct properties per population.

In some embodiments the outside facing surfaces 2011 of the inner shell may have super emissive properties at least in NIR and MIR wavelength range as well as certain desired non-white and non-black colors within the VIS wavelength range, either due to applying additional layers or by using bulk materials, which are at least in part based on the use of tailored mixtures of populations of nano- and/or micro particles and/or cavities with distinct properties per population.

Again, in some embodiments said spatially adjustable functional elements 202 are arranged such that a plurality of predominantly parallel outer layers is formed, which are positioned in relative proximity compared to their size (of the two large dimensions). The outermost layer predominantly receives the incident electromagnetic radiation and converts, according to its reflective spectral properties, a relatively small portion thereof to thermal energy, and the conductive thermal power transfer between said layers is small compared to the radiative thermal power transfer between those layers. The radiative output of the inside of one layer constitutes the predominant radiative input of the adjacent inwardly located layer. The radiant emittance of the most inwardly located layer constitutes the predominant radiative input of the inner shell.

While the foregoing embodiments of the disclosed invention enable a very high degree of modulation of the amount of thermal energy, which is deposited into or removed from predominantly enclosed space, substantial additional improvements are possible with the additional elements and methods as subsequently discussed. Furthermore, said additional elements and methods enable to control the spatial distribution of thermal energy at least within the inner shell of said predominantly enclosed space.

As previously discussed, a relative high thermal capacity (thermal mass) of the inner shall is highly desirable to support stabilizing the inside temperature. However, in conventional buildings, even those with very thick stone or concrete walls, the spatial distribution of the stored thermal energy cannot be dynamically controlled.

Radiative energy input in buildings tends to be directionally changing, resulting in anisotropy of the thermal energy stored in walls, and thus temperature differences of said walls, which contribute to the need for additional cooling or heating to sustain a certain a desired average temperature of the enclosed air.

As subsequently explained, the ability to dynamically modulate not only the amount of thermal energy, which is deposited into or removed from predominantly enclosed space, but also to dynamically change the spatial distribution the stored thermal energy offers enormous advantages for the thermal management of the entire predominantly enclosed space and reduces or in some instances even eliminates the requirements for external energy and/or power for additional conventional heating and/or air conditioning (cooling).

Fundamentally, the invention furthermore comprises panels 701, at least partially filled with a thermal carrier medium, which are relatively flat compared to their width and length, and which are mounted, at least in some locations, onto the outside facing surface of said inner shell such that predominantly direct conductive thermal contact is achieved, and by means such that a relatively low thermal resistance is achieved. In some simple embodiments said panels, which are at least partially filled with thermal carrier medium, serve to increase the thermal capacity of the wall of said inner core, while requiring less and in some instances also cheaper material than comparable conventional building materials. In more advanced embodiments, as discussed further down, they also enable to redistribute the thermal energy.

Where present, the outside facing sides 7011 of said thermal carrier medium filled panels now assume the functions in terms of absorption, reflection, and emission of radiation which otherwise of the outside facing sides 2011 of the inner shell would have in terms of supporting relatively efficient absorption of solar radiation as well as emission of thermal radiation.

In other words, the outside facing sides 7011 of said thermal carrier medium filled panels 701 comprises surfaces, which have highly absorbing, and thus emissive, properties at least in the NIR and MIR wavelength range, in some embodiments in the NIR, MIR, and FIR wavelength range. In some embodiments this is achieved due to applying additional layers or by using bulk materials, which are at least in part based on the use of tailored mixtures of populations of nano- and/or micro particles and/or cavities with distinct properties per population.

In some embodiments it may be desirable, e.g. for aesthetic reasons, to have surfaces 7011, which do not appear black or dark grey, even though this may to some degree reduce the overall performance in terms of said thermal management. Thus, in some such embodiments said outside facing surfaces 7011 of said liquid filled panels 701, which have highly reflective properties in the VIS wavelength range, and highly absorbing, and thus emissive, properties in the NIR and MIR wavelength range, either due to applying additional layers or by using bulk materials, which are at least in part based on the use of tailored mixtures of populations of nano- and/or micro particles and/or cavities with distinct properties per population.

Similarly, in some embodiments it may e.g. be desirable to mimic the appearance (color an patterns) of surfaces of conventional houses or other buildings. In such embodiments the surfaces 7011 of said liquid filled panels 701 and/or of any remaining outside facing surface 2011 of the inner shell, which are not covered by said liquid filled panels, have certain desired non-white and non-black colors within the VIS wavelength range and independently relatively highly absorbing and thus emissive properties in the NIR and MIR wavelength range, either due to applying additional layers or by using bulk materials, which are at least in part based on the use of tailored mixtures of populations of nano- and/or micro particles and/or cavities with distinct properties per population.

But it is important to get back to the implications of having thermal carrier medium filled structures such as said panels 701, as part of the envelope of said predominantly enclosed space 200. Such thermal carrier medium filled panels, in particular in conjunction with said functional elements 202, are very effective and also flexible barrier against radiative energy transfer into the inside of the inner shell.

In some embodiments said thermal carrier medium will be based on water. Water, while in general inexpensively and abundantly available, has a number of extraordinary physical properties, including numerous physical anomalies.

Two of the extraordinary properties are the high dielectric constant and the high specific heat capacity of $c_p = \delta Q/(m \cdot \Delta T) \approx 4.2$ kJ/(kg·K). In principle, at 300 K and 100 kPa this is surpassed by $D_2O$ with $_m c_p \approx 5.5$ kJ/(kg·K), but this is obviously of little practical consequence due to its scarcity and price, thus completely ruling out applications related to buildings.

It is in particular interesting to recognize the very high heat capacity of water relative to common building materials as given in Table 1. Its specific cheat capacity of 4.2 kJ/(kg·K) is equal to $1.1 \cdot 10^{-3}$ kWh/(kg·K) and its volumetric heat capacity of $\approx 4.2$ MJ/(m³·K), which is equal to 1.1 kWh/(m³·K).

In comparison, wood has about 50% of its specific heat capacity and 25% of its volumetric heat capacity. Concrete can have only about 17% of the specific heat capacity of water and about 38% of its volumetric heat capacity. In other words, in terms of heat capacity, a 10 cm thick layer of water corresponds to a 40 cm thick wall of wood and a 26 cm thick wall of concrete. Water has less than 45% of the density of concrete and thus causes correspondingly less structural load. Thermal carrier medium filled panels or reservoirs, which contain predominantly water, are therefore well suited to serve as a stationary, or dynamically adjustable, or disposable thermal buffer or shields.

In some embodiments the inside of these panels or reservoirs has additional channels and or baffles, which help to increase how well and how homogeneous the (slow) water flow covers the entire volume.

The impact in terms of thermal behavior of having effectively an additional layer of water around a building shall be briefly illustrated.

First, we will again make a very crude first order approximation by assuming a building to be a cube with 8 m (outside) edge length and 10 cm wall thickness, "made from" water, i.e., held in place by a hypothetical container with infinitely thin walls. (Practically, of course, the water would have to be contained by a material with finite thickness, which would add some heat capacity, modify thermal conductance etc.)

The ratio of the volume of all 6 walls to the volume of the enclosed air is now 1:12.7, yet the ratio of the thermal capacity of the wall to the enclosed air is 2741, more than 18× higher compared to the previous example with wooden walls.

Specifically, in this case the "water wall" would have a thermal capacity of $C_{wall} \approx 43$ kWh/K and the enclosed 493 m³ of air have a thermal capacity $C_{air} \approx 0.16$ kWh/K. To exemplify the implication, we assume again that in one particular instance the walls are at $T_{wall}=20°$ C.=293.1 K, and that the enclosed air is suddenly completely exchanged with air at $T_{air}=40°$ C.=313.1 K, i.e. $\Delta T=20$ K. Again abstractly assuming ideal, complete thermal exchange between the gas and the wall (incl. no thermal exchange with the outside, etc.), this would now result in a new equilibrium temperature of approximately $T_{wall}=T_{air}=20.07°$ C., i.e. the temperature change of the wall would only be $\Delta T_{wall}=0.07$ K, more than order of magnitude less than in the previous example assuming wooden walls. (There, the temperature change of the wall was $\Delta T_{wall}=0.8$ K). Correspondingly, over 10 times more gas exchanges could occur, before the cooling (or heating) effect of the structure diminishes.

In this particular example, the heat capacity of a building assumed to be a (8 m)³ cube with walls comprising a 10 cm thick layer of water, is approximately equal to the heat capacity of the same size cube but with 25 cm thick walls made from concrete. Moreover, the mass of the used water ($m_{wall} \approx 37$ t) would be only about 18% compared the mass of the required concrete ($m_{wall} \approx 198$ t). Correspondingly lower is the structural load. In addition, water is much less expensive than concrete and in general readily available or can be collected in most locations (i.e. may not have to be transported e.g. by truck).

Thus, in some relatively simple embodiments the inner shell of said predominantly enclosed space will be predominantly covered with said panels, filled with said thermal carrier medium, and in other embodiments the inner shell will essentially consist of such panels, filled with said thermal carrier medium. In some such embodiments said panels, which effectively constitute the wall, would be mounted on and/or in a frame (which defines the shape of the predominantly enclosed space) whereas in other similar embodiments said panels, which effectively constitute the wall, would be of sufficient structural strength to be predominantly be mounted on each other.

To further illustrate the moderating effect of said layer of thermal carrier medium, we will now assume that above discussed highly simplified model of a building, represented by said (8 m)³ cube with walls comprising a 10 cm thick layer of water, shall be exposed to solar radiation.

We will furthermore assume that one vertical wall is perfectly aligned towards south and that the thermal carried liquid in the individual panels (=walls) does not mix, in other words the cube comprises 6 independent panels, which are independently filled with thermal carrier medium and that no energy exchange other than said radiative solar input occurs. (In some practical embodiments though said panels may constitute a continuous reservoir, i.e. said thermal carrier medium can be exchanged among them.)

In addition, we assume that the irradiance is perfectly absorbed and converted into thermal energy (practically the function of wall material of the panel), and is also perfectly conducted into said water, and we furthermore ideally assume no other convective energy exchange.

We will also only consider the radiative input on said south facing vertical wall and on the perpendicular horizontal top wall. For simplicity we also assume that their thickness is 0.1 m across the entire area, thus ignoring the edges.

We will further assume that the solar radiation levels which are typical for a location in the south-western United States, incl. Southern California, New Mexico, Arizona, and Nevada (see e.g. National Solar Radiation Database, www.rredc.nrel.gov/solar/old_data, the entirety of which is incorporated herein by reference) although approximately the same levels can be measured at geographically and meteorologically comparable locations across the globe.

The total solar energy input per day is thus assumed to be relatively high, about 8 kWh/(m²·day) on a horizontal surface and, about 2.4 kWh/(m²·day) on the vertical, south-facing surface.

Thus, in case of said assumed (8 m)³ cube, the areas of the horizontal roof and the south facing wall will have a combined total energy input of 64 m²·(8+2.4) kWh/(m²·day)=666 kWh.

If the broadband spectral emissivity and absorptivity of said surfaces would be ε=0.9, i.e. relatively high, and thus most radiation converted to thermal energy, the temperature changes of said horizontal and vertical layer would be $$\Delta T = \varepsilon \cdot Q \cdot (V \cdot c_p)^{-1}$$

$$\Delta T_h = 0.9 \cdot 8 \text{ kWh/m}^2 \cdot (0.1 \text{ m}^3 \cdot 1.16 \text{ kWh/(m}^3 \cdot \text{K)})^{-1} = 62 \text{ K}$$

$$\Delta T_v = 0.9 \cdot 2.4 \text{ kWh/m}^2 \cdot (0.1 \text{ m}^3 \cdot 1.16 \text{ kWh/(m}^3 \cdot \text{K)})^{-1} = 19 \text{ K}$$

(This relatively large change in temperature also illustrates the well-known possibility of solar water heating, whereby the water is typically later used for applications such as washing or bathing etc.)

If we now assume that the broadband spectral emissivity and absorptivity of said surfaces would be e=0.1, i.e. relatively low, and thus a relatively small amount of radiation would be converted to thermal energy, the temperature changes of said horizontal and vertical layer would be $$\Delta T_h = 0.1 \cdot 8 \text{ kWh/m}^2 \cdot (0.1 \text{ m}^3 \cdot 1.16 \text{ kWh/(m}^3 \cdot \text{K)})^{-1} = 6.2 \text{ K}$$

$$\Delta T_v = 0.1 \cdot 2.4 \text{ kWh/m}^2 \cdot (0.1 \text{ m}^3 \cdot 1.16 \text{ kWh/(m}^3 \cdot \text{K)})^{-1} = 1.9 \text{ K}$$

If we now assume that a plurality of said functional elements 202 has been placed adjacent to said horizontal and vertical wall, and said functional elements have been oriented such that the area of said walls, which is effectively exposed to the primary radiation source (in this case the sun) is relatively small, the effective absorption can be substantially further reduced, since the inside facing sides 2022 of said functional elements, which due to partial conversion of the radiation into heat will now emit most of the radiate input of said walls. However, this irradiance is at substantially lower levels, since the temperature of said functional elements will be substantially lower than the equivalent temperature of the original primary radiation source (in this case the sun).

If we assume that the primary radiation is (via said conversion on said functional elements) reduced by a factor of $10^{-2}$, yet the broadband spectral emissivity said surfaces would be again ε=0.9, i.e. relatively high, and thus most (of the remaining) radiation converted to thermal energy, the temperature changes of said horizontal and vertical layer would still only be $$\Delta T = \varepsilon \cdot Q \cdot (V \cdot c_{p'})^{-1}$$

$$\Delta T_h = 0.9 \cdot 10^{-2} \cdot 8 \text{ kWh/m}^2 \cdot (0.1 \text{ m}^3 \cdot 1.16 \text{ kWh/}(m^3 \cdot K))^{-1} = 0.62 \text{ K}$$

$$\Delta T_v = 0.9 \cdot 10^{-2} \cdot 2.4 \text{ kWh/m}^2 \cdot (0.1 \text{ m}^3 \cdot 1.16 \text{ kWh/}(m^3 \cdot K))^{-1} = 0.19 \text{ K}$$

i.e. the effect on the temperature of the thermal carrier medium, here water, due to radiative energy transfer, will be relatively small. (If said functional elements were adjusted the opposite way, i.e., exposing said walls predominantly to said solar radiation, the temperature change of thermal carrier liquid would be almost as in the first example, i.e. a modulation range of approaching approximately 100:1)

Again, these are highly idealized examples, and they shall only serve to illustrate the order of magnitude of effects under such idealized conditions.

Firstly, this illustrates the potential, if desired, to collect thermal energy e.g. for night-time use, but it also illustrates the need to modulate the conversion ratio, i.e. effective reflectivity. Secondly, it also illustrates the benefit of being able to intentionally and dynamically redistribute thermal energy within the envelope of a building.

Thus the disclosed invention further comprises in some embodiments means to establish a continuous and/or discontinuous flow of said thermal carrier medium through said thermal carrier medium filled panels 701, which also serves to redistribute, remove, or deposit thermal energy.

As previously mentioned, the energetic effort for spatially adjusting said functional elements 701 is small compared to the achieved modulation of thermal energy input. A similar effect applies to redistributing said thermal carrier medium: The gravitational potential energy of said thermal carrier medium is typically relatively small compared to the stored (or removed) thermal energy. As is well known, the change in potential gravitational energy is given by $$\Delta E_{pot} = m \cdot g \cdot \Delta h$$

with g being the gravitational acceleration ($\approx 9.8$ m/s$^2$ at the surface of the earth) and $\Delta h$ being the change in height.

For example, on the surface of earth, moving 1 m$^3$ of water upward by 1 m requires (ideally) only $$10^3 \text{ kg} \cdot 9.8 \text{ m/s}^2 \cdot 1 \text{ m} = 9.8 \cdot 10^3 \text{ Ws}$$
$$= 2.7 \text{ Wh}$$
$$= 0.0027 \text{ kWh}$$

whereas a temperature change of $\Delta T = 1$ K of said 1 m$^3$ of water corresponds to 1.16 kWh (see Table 1). Conversely, said thermal energy of a temperature change of $\Delta T = 1$ K of said 1 m$^3$ of water is equivalent to a change in potential gravitational energy corresponding to change in height of 1.16 kWh/0.0027 kWh·m$^{-1}$ = 430 m Thus, spatially redistributing thermal carrier medium, which in some embodiments may predominantly be water, within and/or in the vicinity of a predominantly enclosed space (i.e., between said thermal carrier medium filled panels and/or additional tanks), is energetically very inexpensive compared to the required electrical or chemical energy to affect a temperature change of several Kelvin.

For example, moving 1 m$^3$ of water upward by 8 m (e.g. from the base of said simplified model of a building, represented by said (8 m)$^3$ cube to its roof) requires (ideally) only $$10^3 \text{ kg} \cdot 9.8 \text{ m/s}^2 \cdot 8 \text{ m} = 7.84 \cdot 10^4 \text{ Ws}$$
$$= 21 \text{ Wh}$$
$$= 0.021 \text{ kWh}$$

whereas a temperature change of 1 K of said 1 m$^3$ of water corresponds to 1.16 kWh (see Table 1), i.e. 55 times as much.

Therefore, as subsequently pointed out in more detail, in some other embodiments relatively cold water from a natural reservoir may at least partially be pumped into said thermal carrier medium filled panels 701. To give an example, if we assume that the exploited temperature difference is only 7 K (e.g. the temperature of a given reservoir is 18° C., the water is pumped to said panels 701, and the maximum temperature to which solar radiation would be allowed to heat the water is 25° C., before the water is removed from said panels), and even if we assume furthermore that the overall efficiency of pumping is 50% (losses in the electric motor, mechanical friction losses in the pump, friction of the water flow itself (turbulence) and friction of the water against the wall of pipes etc), pumping 1 m$^3$ of water upward by 100 m (i.e., a building would be 100 m above said reservoir), would require 0.54 kWh electricity, yet said amount of water would be able remove the equivalent of 8.1 kWh as thermal energy at the assumed temperature difference, i.e. more than 15× as much.

Thus, in some embodiments the disclosed invention further comprises said flow of thermal liquid in said flow circuitry and liquid filled panels to be controlled in such a manner that a desired level of temperature inside said predominantly enclosed space is approximated and wherein, if said functional elements are mounted in said spatially adjustable in a manner, their position is also adjusted by said control system to approximate said desired level of temperature inside said predominantly enclosed space.

In some embodiments said thermal carrier medium filled panels or reservoirs constitute effectively a substantial portion of the inner shell, i.e., the walls from which said inner shell is comprised, are effectively a single (non-planar) one or a plurality of said panels. In some such embodiments the inner shell is predominantly a double-hulled container, which in some embodiments is predominantly comprised of a fiber-reinforced polymer and in other embodiments is predominantly comprised of metal.

In some embodiments the inner shell is predominantly made from typically welded sheets of steel and the predominantly liquid filled panels are mounted on the outside of these walls, thus also reducing the risk of leaks. In some embodiments said thermal carrier medium filled panels are also partially mounted on the inside of the inner shell. In such embodiments the thermal carrier medium, which is being used to dynamically distribute the thermal energy, may first be pumped through panels on the inside of the building and then through panels on the outside.

In some embodiments said thermal carrier medium filled panels or reservoirs cover a substantial portion the inner shell, and the walls from which said inner shell is comprised, comprises a plurality of a second type of said panels, which have different effective thermal properties. In some such embodiments the outer thermal carrier medium filled panels may be more suitable to distribute thermal energy, whereas the inner thermal carrier medium filled panels may be more suitable to store thermal energy.

In some embodiments the disclosed invention further comprises said control system at least in part being based on any single or any combination of strategies comprising:

As a reaction to relative high primary irradiance and undesirably increasing thermal energy budget within said predominantly enclosed space the thermal carrier medium is predominantly flowing from panels, which are at least partially facing in the direction of the primary radiation source, into panels, which are predominantly shadowed from the primary radiation source, and from those panels which are predominantly shadowed from the primary radiation source into panels which are at least partially facing in the direction of the primary radiation source, and positioning said functional elements, if mounted in said spatially adjustable manner, such that the area of the inner shell and of said thermal carrier medium filled panels mounted thereon, which is at least partially exposed to the primary radiation source, is relatively small.

As a reaction to relative high primary irradiance and desirably increasing thermal energy budget within said predominantly enclosed space the thermal carrier medium is predominantly flowing from panels which are at least partially facing in the direction of the primary radiation source into panels which are predominantly shadowed from the primary radiation source, and from those panels which are predominantly shadowed from the primary radiation source into panels which are at least partially facing in the direction of the primary radiation source, and positioning said functional elements, if mounted in said spatially adjustable manner, such that the area of the inner shell and of said thermal carrier medium filled panels mounted thereon, which is at least partially exposed to the primary radiation source, is relatively large.

As a reaction to relative low primary irradiance and desirably constant thermal energy budget within said predominantly enclosed space the thermal carrier medium is predominantly flowing in such a manner that its temperature is approximately the same in all thermal carrier medium filled panels, and positioning said functional elements, if mounted in said spatially adjustable manner, such that the entire area of the inner shell and of thermal carrier medium filled panels mounted thereon, which is exposed to the outside, is relatively small.

As a reaction to relative low primary irradiance and desirably sinking thermal energy budget within said predominantly enclosed space the thermal carrier medium is predominantly flowing in such a manner that its temperature is approximately the same in all thermal carrier medium filled panels, and positioning said functional elements, if mounted in said spatially adjustable manner, such that the area of the inner shell and of thermal carrier medium filled panels mounted thereon, which is exposed to the outside, is relatively large.

As a reaction to relative negligible primary irradiance and desirably enhanced sinking of the thermal energy budget within said predominantly enclosed space the thermal carrier medium is predominantly pumped in such a manner that its temperature is approximately the same in all liquid filled panel, and positioning said functional elements, if mounted in said spatially adjustable manner, such that the area of the inner shell and of thermal carrier medium filled panels mounted thereon, which is effectively exposed via reflection on the predominantly inward facing side of said functional elements towards the night sky, is relatively large.

While the disclosed methods of redistributing said thermal carrier medium and thus stored thermal energy (or the ability to absorb such) among said thermal carrier medium filled panels will already considerably increase the ability of a predominantly enclosed space to dynamically react to changing levels of exposure to electromagnetic radiation and other changing environmental factors, and thereby in many embodiments enable to predominantly maintaining a certain desired temperature level inside said predominantly enclosed space, and/or reduce the required energy for additional conventional heating and/or cooling, additional improvements can be achieved by any one or both of the following:

a) Having additional functionally connected additional panels 701, beside those mounted on the inner shell, which are placed in the vicinity of said predominantly enclosed space, and (b) having additional, functionally connected, thermally highly insulated storage tanks for said thermal carrier medium.

These additional components are specifically useful in cases when the relative amount of available time to increase or to reduce the thermal budget of said predominantly enclosed space and thus also of said thermal carrier medium is relative small compared to the overall time, since said additional components will increase (a) the power, i.e. energy per time, which can be absorbed or emitted, and (b) increase the amount of thermal energy which can be retained at a certain temperature.

In case of buildings this is for example useful in areas where there are only relatively few hours per day of high solar radiation, and/or few hours per day (at night), with relatively clear sky and below average ambient temperatures. For example, specifically during summer and in tropical and subtropical regions there may be only a relatively small amount of time available during the night (e.g. midnight to 5:00) to cool said thermal carrier liquid down compared to the time of considerable solar input (e.g. 7:00 to 19:00) during which the thermal carrier medium is heated.

Thus, in some embodiments the disclosed invention further comprises enhancing the total power with which energy can desirably be deposited in or removed from said thermal carrier medium, by placing within the relative vicinity of said predominantly enclosed space at least one additional thermal carrier medium filled panel, functionally connected to said predominantly closed flow circuitry, and also covered by said at least in one degree of freedom spatially adjustable functional elements, and said control system being able to independently adjust the rate of flow through said at least one additional thermal carrier medium filled panel.

In some embodiments the disclosed invention may also further comprises increasing the amount (i.e. mass) of stored thermal carrier medium and thus of total thermal capacity, and reducing the power, with which thermal energy is undesirably removed from or deposited into said thermal carrier medium, relative to said stored amount of thermal energy, by placing, within the relative vicinity, under, over, or inside of said predominantly enclosed space, at least one, thermally insulated, at least partially filled thermal carrier medium storage tank, which has predominantly a small surface to volume ratio, and which is functionally connected to said predominantly closed flow circuitry, and said control system being able to independently adjust the rate of flow to and from said at least one additional at least partially filled thermal carrier medium storage tank.

In some such embodiments said control system at least partially operates such that at least one of said at least partially filled thermal carrier medium storages tanks is acting as a reservoir for said thermal carrier medium, which is kept at least temporarily at below average temperature of said thermal carrier medium, i.e., it is predominantly used to store the ability to cool the shell of said predominantly enclosed space. In such an embodiment thermal carrier medium would typically be cooled at least in some of said panels to below average operating temperature and then accumulated in at least one of said thermal carrier medium storage tanks.

In some such embodiments said control system at least partially operates such that at least one of said at least partially filled thermal carrier medium storage tanks is acting as a reservoir for said thermal carrier medium, which is kept at least temporarily at above average temperature of said thermal carrier medium, i.e., it is predominantly used to store the ability to heat the shell said predominantly enclosed space. In such an embodiment thermal carrier medium would typically be heated at least in some of said panels to above average operating temperature and then accumulated in at least one of said thermal carrier medium storage tanks.

In some such embodiments both types of tanks are present, i.e. said control system at least partially operates such that at least on of said at least partially filled thermal carrier medium storage tank is acting as a reservoir for said thermal carrier medium, which is kept at below average temperature of said thermal carrier medium, i.e., it is predominantly used to store the ability to cool the shell of said predominantly enclosed space, and that at least one other of said at least partially filled thermal carrier medium storage tanks is acting as a reservoir for said thermal carrier medium, which is kept at above average temperature of said thermal carrier medium, i.e., it is predominantly used to store the ability to heat the shell said predominantly enclosed space.

In some such embodiments thermal carrier medium would at night be flowing from said at least one tank with at least temporarily above average temperature into at least some of said panels to be cooled by (a) thermal energy flowing into said inner shell (and thus helping to maintain a certain temperature level therein) and (b) by thermal energy being given to the outside, and said thermal carrier medium then flowing to said at least one tank which accumulates thermal carrier liquid with at least temporarily below average temperature. During the day, i.e. time of relatively high solar radiation, the process would be reversed, i.e., thermal carrier medium would predominantly be flowing from said at least one tank, which accumulates thermal carrier medium with below average temperature, to said panels where said thermal carrier medium gets to some degree heated, but prevents substantial heating of said inner shell, and then flows into said at least one tank which accumulates thermal carrier medium with at least temporarily above average temperature.

Specifically the last embodiment may desirably enable the use of relatively thin versions of said thermal carrier medium filled panels, since not the entire amount of thermal energy which is e.g. predominantly absorbed during daytime and emitted predominantly during the night, must completely be retained in the thermal carrier medium, which resides in said panels mounted on said inner shell. Instead, in some such embodiments said panels may only be a few cm thick or even only a fraction of a cm. Thus the total amount of thermal carrier medium, which is at one given time present in all panels mounted on said inner shell, is reduced and thus the structural load in the entire predominantly enclosed space and/or said inner shell and/or a frame or other elements predominantly mechanically supporting said panels is reduced. Likewise the mechanical load on the walls of said panel is reduced.

Based on such configurations, in some embodiments of the disclosed invention said control system may at least in part be based on any single or any combination of the following general strategies:

As a reaction to relative high primary irradiance and undesirably increasing thermal energy budget within said predominantly enclosed space it may cause said thermal carrier medium at least in part to be flowing from said at least one at least partially filled thermal carrier medium storage tank, which is kept at least temporarily at below average temperature, to panels, which are at least partially facing in the direction of the primary radiation source, to panels, which are predominantly shadowed from the primary radiation source, and/or to said at least one at least partially thermal carrier medium liquid storage tanks at least temporarily kept at above average temperature.

As a reaction to relative low or negligible primary irradiance, and desirably sinking thermal energy budget within said predominantly enclosed space it may cause said thermal carrier medium at least in part to be flowing from said at least one at least partially filled thermal carrier medium storage tank, which is kept at least temporarily at above average temperature to panels, which are predominantly exposed to the outside, and/or panels, which are effectively exposed via reflection on the predominantly inward facing side of said functional elements towards the night sky, to said at least one at least partially filled thermal carrier medium storage tank, which is kept at least temporarily at below average temperature.

In terms of the general layout of said flow circuitry, which connects at least some of said panels, storage tanks, pumps, valve, inlets, and outlets etc, there are the following different types of principle embodiments: those with a predominantly closed flow circuitry, and those with a predominantly closed flow circuitry, as well as mixed configurations.

As embodiments with a predominantly closed flow circuitry shall be considered those wherein the amount of thermal carrier medium, which must be refilled at times, is relatively small compared to the average throughput amount between refills.

Among such embodiments may be further specific embodiments wherein said thermal carrier medium is predominantly based on water. In some such embodiments said flow circuitry may be at least temporarily connected to a local fresh water supply network, such as a drinking water supply, to be initially filled up, i.e. said thermal carrier medium predominantly comprises water taken from said local network, and subsequently said control system also monitors the fill level said water and affects occasionally automatic refills to compensate for any losses.

In other embodiments the water for the initial filling may be provided by a truck or accumulated from rain.

In some embodiments suitable chemicals may be added to said thermal carrier medium to reduce detrimental effects on said thermal carrier medium filled panels and said flow circuitry. In particular, in some embodiments suitable chemicals may be added to lower the freezing point of the thermal carrier medium.

In some embodiments said thermal carrier medium is based on oil, and/or alcohol, and/or a polar solvent, and/or a polyol, in particular glycerol, and/or a fluorocarbon.

In some embodiments nano- and micro-particles from populations with predominantly distinct size distributions, shape distributions, chemical compositions, crystal structures, and crystallinity distributions are added to said thermal carrier medium, and any one or any combination of effective volumetric heat capacity, latent heat, and heat conductivity of said thermal carrier liquid is modified compared to base properties of the pure carrier medium.

In some embodiments said thermal carrier medium and/or substances contained therein, are at least in part undergoing at least one phase change of their molecular structure at a temperature which is between the minimum and maximum operating temperature of thermal carrier medium.

In some embodiments said flow circuitry may be predominantly sealed and said thermal carrier medium at least in some location under a pressure, which is higher than the ambient gas pressure.

In another class of embodiments said flow circuitry may be a predominantly open, and said thermal carrier medium may predominantly comprise water taken from a natural reservoir, including water from lakes, springs, rivers, or sea water from the ocean. In some such embodiments the flow of said thermal carrier medium in said flow circuitry, thermal carrier medium filled panels and, if present, tanks is controlled in such a manner that a desired level of temperature inside said predominantly enclosed space is approximated, and wherein subsequently predominantly the same amount of thermal carrier medium, i.e. water, flows back to said natural reservoir, or is released into the ground. Furthermore, the position and/or orientation of said functional elements, if mounted in said spatially adjustable manner, is also adjusted by said control system to approximate said desired level of temperature inside said predominantly enclosed space.

For example, in tropical or sub-tropical regions the ambient air may easily reach T=32 C or more, but in many embodiments it may be possible to obtain e.g. sea water (in a predominantly open flow circuitry) at T=20° C. or lower, specifically if the inlet point is not directly at the surface but desirably at least at a few meter depth. If a sufficiently large portion of the surface area of the inner shell is covered with said thermal carrier medium filled panels, and windows and doors are kept closed and relatively airtight, then the temperature inside said inner shell will not only be substantially lower compared to the case of exposing said predominantly enclosed space directly e.g. to solar radiation, it may in many instances in fact be lower than the ambient temperature. As pointed out above, the expenditure of external energy (electricity, gasoline etc.) for pumping the required amount of water may be small compared to the otherwise required amount of electrical energy for conventional air conditioning.

In some such embodiments, again, suitable chemicals are added to said water to reduce the detrimental effects of the water on said thermal carrier medium filled panels and said flow circuitry.

In yet other embodiments said flow circuitry may comprise a combination of above discussed open and closed flow circuitry and flow paths. In such embodiments said thermal carrier medium may at times flow in predominantly closed paths, and at other times, e.g. when the thermal budget it requires and in order to avoid e.g. additional conventional air conditioning, thermal carrier medium from an external reservoir may be added in a predominantly open flow path.

Again, in some such embodiments said thermal carrier medium predominantly comprises water taken from a local fresh water supply network, and the flow of said thermal carrier medium in said flow circuitry, thermal carrier medium filled panels, and, if present, thermal carrier medium storage tanks, is controlled in such a manner that a desired level of temperature inside said predominantly enclosed space is approximated. Again, said functional elements are mounted in said spatially adjustable in a manner, then their position is also adjusted by said control system to approximate said desired level of temperature inside said predominantly enclosed space.

There are several preferable embodiments with respect to said control system.

In typical embodiments said control system comprises at least one processing unit 1602, which may further comprise a plurality of analog and/or digital I/O boards, which send signals and/or power to and/or receive signals from a plurality of sensors (such as 1202 and 1203, including MEMS based sensors), motors, and other actuators, such as for example motors affecting the spatial adjustment of said functional elements 202 (e.g. a rotational motion pivoting on hinge-like elements 401) and of said flow of thermal carrier medium (e.g. via said at least one pump 1102 and said valves 1201 and 1303).

In some embodiments some signal lines from said plurality of analog and/or digital I/O boards may be directly connected to said plurality of sensors, motors, and other actuators, while some other signals may have to undergo amplification, filtering, conversion, or other processing in additional electronic components 1605. This may in some embodiments comprise power semiconductors (including e.g. power (MOS)FETs, thyristors, triacs), power amplifiers, or electronic or electromechanical relays, drive electronics for stepper motors, signal modulators/demodulators etc. to drive and control various means such as electric motors, stepper motors, pumps, valves, other relays etc, and thus affect at least in part said spatial adjustment of said functional elements. Said control system can furthermore, if said thermal carrier medium filled panels are present, affect at least in part the flow and distribution of said thermal carrier medium therein, and, if said thermal carrier medium storage tanks are present, is able to affect at least in part the flow and distribution of said thermal carrier medium therein.

In some embodiments said control system may a at least partially use digital signals based on standards comprising RS232, RS485, RS422, GPM, LonWorks, SCADA, CAN, CANopen, Profibus, SafetyBUS, INTERBUS, SERCOS, Sinec H1, Ethernet, EtherCAT, (and all other Ethernet based communications systems) or other types of networks and field buses. The processing unit may be based on any suitable computational architecture, incl. for example x86, x86-64, ARM etc, incl. embedded systems, and may at least partially also comprise FPGAs and/or PLCs. The chassis and/or bus structure of said processing unit 1602 may in some embodiments be based on PCI, PXI, PXIe.

In some embodiments said control system receives signals from a single or a plurality of zero-, and/or one-, and two-dimensional electronic sensors, which acquire irradiance levels, and/or directional information of said irradiance, and/or temperature measurement of any one or any combination of radiation sources and sinks, which are external to said predominantly closed space. In some embodiments this may include sub-units for solar tracking.

In some embodiments such sensors are used to acquire thermal radiation levels, and/or directional information of said thermal radiation, and/or temperature measurement, of the direct environment of said predominantly closed space, and/or of said predominantly closed space itself.

In some embodiments said sensors are used acquire thermal radiation levels, and/or directional information of said thermal radiation, and/or temperature measurement, of said functional elements.

In some embodiments said sensors are used to acquire the temperature of said thermal carrier medium filled panels, and/or, if present, of said thermal carrier medium storage tanks, and/or, the temperature, and/or flow speed, and/or throughput of said thermal carrier medium. Said signals are provided as input to said control system, which uses said signals to approximate at least one control target, based on a local user input, and/or a remote user input, and/or a remote computer input, and/or a preset value, and/or a computed value.

In some embodiments at least one of said zero-, and/or one-, and two-dimensional electronic sensors is at least in part sensitive to radiation at NIR and/or MIR wavelength.

In some embodiments said control systems also receives signals from at least one sensors to determine the flow rate of said thermal carrier medium and said control systems has at least one means, such as an adjustable valve and/or a pump, to adjust said flow rate in said flow circuitry.

In some, relatively simple embodiments said control system may be based on analog electronics of relatively low complexity and still achieve some basic functionality, for example the angular adjustment of said functional elements may be based on sensor signals which, indicate the direction of solar radiation, or even more simply said analog electronics may just change at least one spatial degree of freedom of said adjustably mounted functional elements while attempting to maximize or minimize the radiative input on said thermal carrier medium filled panels, but without having precise directional information of the radiation source.

Furthermore, in some embodiments said control system has predictive capabilities concerning the expected development of the thermal budget of said predominantly enclosed space and derives promising control strategies.

Traditionally, conventional indoor temperature and climate control systems of buildings are predominantly 'reactive' in the sense that they operate by activation and modulation of networked thermal energy sources and sinks in spaces based on thermostatic feed-back, i.e. they comprise conventional control loops, which react to a deviation from a control target, after such a deviation occurs.

In contrast, in some, more advanced embodiments said control system may have sufficient data storage capacity and computational power to at least in part be able to execute an algorithm to achieve at least one desired target. In some such advanced embodiments, the disclosed control system poses an internal model to anticipate desirable control actions to achieve its at least one control target. In order to realize such a model-based control strategy, said control system incorporates a simplified virtual model, a so-called reduced order model, of the building, which in some such embodiments runs a virtual model (i.e. numerical simulation) parallel to the building's actual physical operation.

The true response (in terms of thermal budget and internal temperatures) of a real, relatively complex predominantly enclosed space, such as a building, which consists of various compartments, different materials with different thermal capacity, thermal conductivity etc, is in most cases difficult to predict precisely and requires in general to numerically solve the underlying differential equations, which describe the various coupled physical effects, in three spatial dimensions and time. Frequently, such numerical simulations are based on FEM methods, and if different coupled effects are considered they are referred to as multi-physics simulations. Such computations are generally numerically expensive, i.e. require a relatively large amount of floating point operations and data storage capacity, which may be readily available on a suitable (computer) workstation or computer cluster, but too demanding for said (preferably inexpensive) control system. However, in many instances said multi-physics simulations may serve to develop said reduced order model of a specific predominantly enclosed space, derived from a plurality of simulated responses to various simulated inputs under various conditions. Such a reduced order models, while specific e.g. to a given building, and less but still sufficiently accurate, will require orders of magnitude less compute power to predict the response of a building e.g. to the expected solar input during a day, the required time to cool said thermal carrier medium to a certain level, the expected temperature change inside said building etc., i.e. such reduced order models are well suited to support the operation of more advanced embodiments of said control system.

Thus, in some such more advanced embodiments said control system may at least in part be based on a reduced order model of the thermal properties of said predominantly closed space, including said functional elements, and if present, of said thermal carrier medium filled panel, tanks, and circuitry. Said control system uses at least in part said reduced order model to estimate responses to possible actions initiated by said control system, which overall serves to enhance the performance of said control system.

Thus, while the real building can only react to the actually present conditions (e.g., local solar radiation levels, other weather conditions etc.), occupancy interventions, and building control operations, the virtual model can move forward in time so as to predict the building's response to alternative control scenarios and thereby determine favorable strategies and outputs.

In some more advanced embodiments said control system may electronically receive weather forecast data, which it uses to calculate estimates of expected future changes to the energy budget of said predominantly enclosed space, and wherein such estimates are used to enhance the performance of said control system. In some such embodiments said control system may receive said weather forecast data via an at least temporarily established internet connection.

In some embodiments said control system has sufficient data storage capacity and computational power to be at least in part based on an algorithm to achieve at least one desired target, and to also retain previously obtained signals and/or data corresponding to such signals, subsequently also referred to as 'historic data', obtained from at least one of said sensors, and uses said historic data to improve over time its performance. In some such embodiments said data also comprise historic performance data, i.e. data, which are at least in some degree a measure how well the control system performed. A measure for performance may in some embodiments be e.g. how precisely or quickly a desired targeted temperature on the inside of said predominantly enclosed space has been reached, for how long a certain temperature range could by maintained, or how much additional external energy, e.g. in form of electricity or gas, had to be used to maintain such a temperature range. In other words, said control system improves its performance by learning from previous, accumulated experience. In some such embodiments said control system may use such historic data to enhance or correct said reduced order model, i.e. it may correct or fine-tune certain parameters of said reduced order model, in other words said control system learns over time to better predict the response to certain inputs (e.g. solar radiation) and to its own actions, and thus improves its control strategy accordingly. In some such embodiments said control system may retain such historic data ranging from a few days to a few years, in particular including complete seasonal cycles. In some such embodiments said control system may retain such historic data during its entire lifetime.

In some additional such embodiments such collected historic data (sensor data, performance data, reduced order model data), in particular including complete seasonal cycles, are collected by a first control system on one specific predominantly enclosed space, and are later provided to and stored in a single or plurality of other (typically new) control systems, which will control a similar predominantly enclosed space. In other words said control system incorporates learning experience previously obtained by similar control systems e.g. on similar buildings.

In some embodiments said control system is at least temporarily being connected to the internet and provides any one or any combination of the following services comprising: In some such embodiments said control system is sending status and performance data per email. In some such embodiments said control system enables remote log-ins to display status and performance data on a remote computer or a remote mobile device. In some such embodiments said control system enables remote log-ins to manipulate the operation of said control system, including to change control target data, from a remote computer or a remote mobile device, including in particular from a so-called smart phone or so-called wearable device.

In some embodiments said control systems from a plurality of buildings are at least temporarily connected to the internet, and are providing any one or any combination of the following services comprising: In some such embodiments said control systems from a plurality of buildings are at least temporarily connecting to a common web site, and are transmitting status and/or performance data. In some such embodiments said web site enables user log-ins to said control systems of specific houses belonging to said plurality of houses, from another plurality of internet connected computers or a remote mobile devices, including in particular from a so-called smart phones or so-called wearable devices, and said web site enables displaying status and performance data, on said other plurality of internet connected computers, or remote mobile devices.

In some such embodiments said web site enables remote manipulation of the operation of any one of said control systems belonging to said plurality of houses, including changing the control target data, from said other plurality of internet connected computers or a remote mobile devices, including in particular from a so-called smart phones or so-called wearable devices.

Within the context of the disclosed invention, 'web site' shall be understood to also include any internet connected computer, or group of computers, including virtual machines or other dynamically assigned computers or computing resources depending on load conditions, addressable typically via IP address or URL, which can receive and send data by any protocols and on various ports, but such data may at least in part comprise data, which are in general not necessarily human readable, or the data may not necessarily be html or other formats interpretable by a regular internet browser to display human readable text or numbers (as would be the case for regular html based web sites).

In some embodiments said control systems from a plurality of buildings are at least temporarily connected to the internet and perform any one or any combination of the following services comprising: In some such embodiments said control systems from a plurality of buildings are at least temporarily connecting to a common web site, or to another internet connected computer at least partially acting as a server, and are transmitting any one or any combination of control system status data, and/or energy consumption data, and/or thermal budget data, and/or control system status performance data, and/or local solar radiation data, and/or local air temperature data, local air humidity data.

In some such embodiments said web site predominantly automatically analyzes said data received at least from some of said control systems belonging to said plurality of houses, and/or manipulates the operation of at least some of said control systems belonging to said plurality of houses, including changing control target data. In combination with above disclosed learning mode, said common web site or server may analyze environmental and performance data from several control systems to improve the average performance of said control systems, and by providing said control systems with updates of the required parameters, and/or reduced order models, and/or code, and/or algorithm.

In some embodiments said control system is at least temporarily connected to a mobile phone network and provides at least temporarily any one or any combination of the following services comprising: In some such embodiments said control system is sending status and performance data per sms. In some such embodiments said control system is enabling voice and/or touch-tone controlled remote log-ins, and/or providing spoken status and performance data via computer generated voice. In some such embodiments said control system is enabling voice and/or touch-tone controlled remote log-ins to manipulate via voice and/or touch-tone the operation of said control system, including to change control target data, and provides spoken feedback of such manipulations via computer generated voice.

There are several preferable embodiments with respect to the material from which said inner shell is at least partially made.

In some embodiments said inner shell is comprises concrete.

In some embodiments said inner shell is comprises cementitious material.

In some embodiments said inner shell is comprises bricks.
In some embodiments said inner shell is comprises metal.
In some embodiments said inner shell is comprises wood.
In some embodiments said inner shell is comprise wood and some material predominantly serving as thermal insulation.

In some embodiments said inner shell is comprises plastic.

In some embodiments said inner shell is comprises a fiber-reinforced polymer.

In some embodiments said inner shell is comprises glass.
In some embodiments said inner shell is comprises metal and glass.

In some embodiments said inner shell comprises at least in part a material, which undergoes at least in part at least one phase change of its molecular structure at a temperature which is between the minimum and maximum operating temperature.

There are several preferable embodiments with respect to the material from which said functional elements are at least partially made.

In some embodiments said functional elements comprise multi-layered materials.

In some embodiments said functional elements comprise a carrier on which at least one layer predominantly comprising at least one tailored mix of one or both of nano- and micro-particles has been deposited.

In some embodiments said functional elements comprise a ceramic, cementitious, or concrete carrier on which at least one layer predominantly comprising tailored mixes of one or both of nano- and micro-particles has been deposited.

In some embodiments said functional elements comprise a carrier on which at least one metallic layer has been deposited.

In some embodiments said functional elements comprise a predominantly a ceramic, cementitious, or concrete carrier on which at least one metallic layer has been deposited.

In some embodiments said functional elements comprise a predominantly glass carrier on which at least one metallic layer has been deposited.

In some embodiments said functional elements comprise a predominantly plastic carrier on which at least one metallic layer has been deposited.

In some embodiments said functional elements comprise a carrier on which at least partially one photo-voltaic layer has been deposited.

There are several embodiments with respect to the optical appearance of said functional elements of said inner shell.

As previously discussed, in preferable embodiments, specifically with respect to buildings, a substantial portion structure would be covered with said, optionally spatially adjustable, functional elements. While somewhat reducing the achievable overall thermal performance, in some such embodiments some of said functional elements may at least partially visually resemble the appearance of conventional walls (e.g. from brick, concrete, wood etc.) or of conventional, classical, or even historic roofs.

Typically this may be accomplished, as previously discussed, by painting or spraying such patterns primarily on the outside facing side of said optionally spatially adjustable functional elements, or by using correspondingly structured bulk materials, using materials or substance, which have certain desired non-white and non-black colors within the VIS wavelength range (although typically very bright colors), but retain super-reflective properties at least in the NIR wavelength range, which are at least in part based on the use of tailored mixtures of populations of nano- and/or micro particles and/or cavities with distinct properties per population.

There is a specific embodiment with respect to said control target.

In some embodiments the predominant control target is to reduce, on average, the radiative energy input in said predominantly enclosed space, specifically in case of buildings to reduce or eliminate the need for conventional air conditioning.

As partially previously referred to, there are several specific embodiments with respect to the type of predominantly enclosed space as well as some other additional aspects of general embodiments.

In some embodiments said predominantly enclosed space is a building.

In some embodiments said predominantly enclosed space is predominantly a habitat for humans.

In some embodiments said predominantly enclosed space is predominantly a habitat for animals.

In some embodiments said predominantly enclosed space is used to fabricate and/or store goods.

In some embodiments said predominantly enclosed space is predominantly a mobile house, and/or container, and/or a temporary and/or emergency shelters, and/or a tent-like structures, and/or another comparable unit.

In general for very inexpensive housing, but specifically in the aftermath of many natural disasters, such as earthquakes, floods, storms, epidemics, etc., or during and after disasters and other hard-ships primarily caused by man, such as armed conflicts, relocation of a large number of people, etc. preferably inexpensive, light, and mobile units need to be deployed, which can house humans and/or animals at least in some modest comfort. However, the lighter and more primitive such units are, the less thermal capacity they will have, and the more uncomfortable if not unbearable may living conditions be therein, unless considerable amounts of energy for heating and/or air conditioning would be spent. However, specifically under the described circumstance and/or at remote locations, energy (electricity, gas etc.) may not be readily available in sufficient quantities or be too expensive. Thus the disclosed invention can preferably be embodied in said mobile house, containers, temporary and/or emergency shelters, tent-like structures, or other comparable unit.

Conversely, in some embodiments said predominantly enclosed spaces are (potentially even relatively expensive) single family homes, apartment buildings, or other existing buildings, which are retrofitting with one or any combination of said functional elements, said thermal carrier medium fill panels, and said thermal carrier medium fill tanks, and thus the expenditure of external energy, such as e.g. electricity or gas, is reduced.

In some embodiments said predominantly enclosed space has at least temporally wheels attached which aid moving said space or support it while standing at a given place. This is to say that in some embodiments the predominantly enclosed space may be a trailer, bus, or similar recreational vehicle.

In some embodiments said predominantly enclosed space is a container for electronic equipment. This may for example be the case for boxes or containers, which house radio-communication equipment, including equipment to enable mobile phone operation or communication with satellites.

In some embodiments said predominantly enclosed space is a sealed container predominantly positioned still under atmospheric conditions but at relatively high altitude. This can in some instances include containers located at high mountain peaks, gondolas of balloons.

In some embodiments said predominantly enclosed space is a sealed container, and the ambient gas pressure is predominantly sufficiently low such that in general the energy transfer by convection via said gas is small compared to the energy transfer by radiation.

In some embodiments said control system adjusts at least one spatial degree of freedom of at least some of said spatially adjustable elements predominantly synchronous to the relative spatial position of the primary radiation source and the predominantly enclosed space.

What is claimed is:

1. A method of modulating the impact of electromagnetic irradiance on the thermal energy budget of a predominantly enclosed space, which is at least in part exposed to directionally and temporarily varying levels of said primary electromagnetic radiation, comprising the steps of:
   (a) providing at least an inner shell of said predominantly enclosed space; and
   (b) providing a plurality of functional elements at an exterior position relative to an outside facing side of said inner shell;
      (i) wherein outside facing surfaces of said functional elements have higher reflectivity in the visible (VIS) wavelength range and near infrared (NIR) wavelength range relative to the mid-infrared (MIR) wavelength range;
      (ii) wherein inside facing surfaces of said functional elements have higher reflectivity in the NIR wavelength range and MIR wavelength range relative to the VIS wavelength range;
      (iii) wherein a thickness of said functional elements is equal to or smaller than a thickness of said inner shell; and
      (iv) wherein the plurality of functional elements are mounted in the exterior position with a plurality of support elements small in size and or thermal conductivity compared to the size and or thermal conductivity of the functional element, to reduce thermal conductivity between the functional elements and the inner shell;
   thereby modulating the impact of electromagnetic irradiance on said enclosed space.

2. Method according to claim 1, wherein said functional elements comprise a plurality of distinct populations of nano- and/or micro particles and/or of nano- and/or micro-cavities, a first population of said plurality of distinct populations comprising one or more of distinct size distributions, shape distributions, chemical compositions, crystal structures, and crystallinity distributions, relative to a second population of said plurality of distinct populations;
   such that at least one of the outside or inside facing surfaces of said functional elements has broadband super reflective properties.

3. Method according to claim 1, wherein said functional elements and/or the inner shell comprise a plurality of distinct populations of nano- and/or micro particles and/or of nano- and/or micro-cavities, a first population of said plurality of distinct populations comprising one or more of distinct size distributions, shape distributions, chemical compositions, crystal structures, and crystallinity distributions, relative to a second population of said plurality of distinct populations;
   thereby effecting broadband spectral reflectance characteristics which comprise non-white and non-black colors within the VIS wavelength range and predominantly independent of their NIR and MIR reflectance, and
   wherein outside facing surfaces of said inner shell have relatively high emissivity in the NIR wavelength range and MIR wavelength range relative to the VIS wavelength range.

4. Method according to any one of the previous claims further comprising reducing a radiative thermal power input on said inner shell by
   arranging said functional elements such that a plurality of predominantly parallel outer layers is formed, which are positioned in relative proximity compared to the size of the functional elements, and
   wherein said layers are mounted such that the outermost layer predominantly receives the incident electromagnetic radiation and converts, according to the reflective spectral properties of the outermost layer, a relatively small portion thereof to thermal energy, and wherein the conductive thermal power transfer between said layers is small compared to the radiative thermal power transfer between those layers, and wherein the radiant emittance of the inside of one layer constitutes the predominant radiative input of the adjacent inwardly located layer, and whereby the, ultimately thereby reduced, radiant emittance of the most inwardly located layer constitutes the predominant radiative input of the inner shell.

5. Method according to any one of claim 1, claim 2, or claim 3 further comprising a panel at least partially filled with a thermal carrier medium,
   wherein the panel is at least one of:
      mounted onto the outside facing surface of said inner shell to form conductive thermal contact between the panel and the outside facing surface of the inner shell; and
      wherein the panel at least partially forms said inner shell and
   wherein the panel is configured to increase the thermal capacity of said inner shell.

6. Method according to claim 5 wherein the outside facing side of said panel is configured to functionally replace the absorption, reflection, and emission of radiation properties of the corresponding outside facing side of the inner shell.

7. Method according to claim 6 further comprising means to
   establish flow
   of thermal carrier medium through said panel, wherein said means also serve
   to redistribute, remove, or deposit thermal energy.

8. Method according to claim 7 wherein the means to establish flow are configured to form a flow circuitry, further comprising at least one of:
   controlling flow of said thermal carrier medium in said flow circuitry and panel, such that at least one desired level of temperature inside said predominantly enclosed space is approximated; and
   adjusting the spatial position of said functional elements to approximate at least one desired level of temperature inside said predominantly enclosed space.

9. Method according to claim 5, wherein surfaces of said panels comprise a plurality of distinct populations of nano- and/or micro particles and/or of nano- and/or micro-cavities, a first population of said plurality of distinct populations comprising one or more of distinct size distributions, shape distributions, chemical compositions, crystal structures, and crystallinity distributions, relative to a second population of said plurality of distinct populations, providing highly absorbing, and thus emissive, properties of the panels at least in the NIR and MIR wavelength range.

10. Method according to claim 5 further comprising means to
   establish flow
   of thermal carrier medium through said panel, wherein said means also serve
   to redistribute, remove, or deposit thermal energy.

11. Method according to claim 10 wherein the means to establish flow are configured to form a flow circuitry, further comprising at least one of:
controlling flow of said thermal carrier medium in said flow circuitry and panel, such that at least one desired level of temperature inside said predominantly enclosed space is approximated; and
adjusting the spatial position of said functional elements to approximate at least one desired level of temperature inside said predominantly enclosed space.

12. Method according to claim 11, further comprising
undergoing at least one phase change of a molecular structure of at least one substance of the thermal carrier medium, at a temperature which is between a minimum and maximum operating temperature.

13. Method according to claim 5, further comprising adding to the thermal carrier medium a plurality of distinct populations comprising one or both of nano- and micro-particles, a first population of said plurality of distinct populations comprising one or more of distinct size distributions, shape distributions, chemical compositions, crystal structures, and crystallinity distributions, relative to a second population of said plurality of distinct populations to modify one or more of a volumetric heat capacity, latent heat, and heat conductivity of said thermal carrier medium.

14. Method according to claim 5, further comprising
undergoing at least one phase change of a molecular structure of at least one substance of the thermal carrier medium, at a temperature which is between a minimum and maximum operating temperature.

15. Method according to claim 5 further comprising:
providing an electronic control system;
adjusting the spatial position of at least some of said functional
elements with the electronic control system;
adjusting the flow and distribution of said thermal carrier medium in the panel;
acquiring with one or more of 0-, 1-, and 2-dimensional electronic sensors one or more of irradiance, directional, and temperature measurement signals of one or more of
radiation sources or sinks, which are external to said predominantly closed space,
and the direct environment of said predominantly closed space,
and of said predominantly closed space itself,
and of said functional elements,
and, if present, of said thermal carrier medium,
and, if present, of said thermal carrier medium filled panels,
and, if present, of said thermal carrier medium filled tanks,
and providing said signals as input to said control system,
which uses said signals to approximate at least one control target,
based on one or more of
a local user input,
a remote user input,
a remote computer input,
a preset value,
a computed value.

16. Method according to claim 1 further comprising
a panel at least partially filled with a thermal carrier medium, wherein the panel is at least one of:
mounted onto the outside facing surface of said inner shell to form conductive thermal contact between the panel and the outside facing surface of the inner shell; and
wherein the panel at least partially forms said inner shell and
wherein the panel is configured to increase the thermal capacity of said inner shell, and
wherein the outside facing side of said panel is configured to functionally replace the absorption, reflection, and emission of radiation of the corresponding outside facing side of the inner shell.

17. Method according to claim 16 further comprising means to
establish flow
of thermal carrier medium through said panel,
wherein said means also serve to redistribute, remove, or deposit thermal energy.

18. Method according to claim 17 wherein the means to establish flow are configured to form a flow circuitry, further comprising at least one of:
controlling flow of said thermal carrier medium in said flow circuitry and panel, such that at least one desired level of temperature inside said predominantly enclosed space is approximated; and
adjusting the spatial position of said functional elements to approximate at least one desired level of temperature inside said predominantly enclosed space.

19. Method according to claim 18 further comprising one or more of:
(a) controlling with a controller, in response to an amount of primary irradiance that is sufficiently high that a resulting reduced energy gain to the thermal energy budget within said predominantly enclosed space serves to at least approximate at least one target value:
(i) the flow of thermal carrier medium
from panels, which are at least partially facing in the direction of the primary electromagnetic radiation, into panels, which are predominantly shadowed from the primary electromagnetic radiation, and
from those panels which are predominantly shadowed from the primary electromagnetic radiation into panels which are at least partially facing in the direction of the primary electromagnetic radiation; and
(b) controlling with the controller, in response to an amount of primary irradiance that is sufficiently low that the resulting reduced energy loss to the thermal energy budget within said predominantly enclosed space serves to approximate the at least one target value:
the flow of thermal carrier medium in such a manner that the temperature of the thermal carrier medium is approximately the same in all panels.

20. Method according to claim 19 further comprising:
providing at least one at least partially thermal carrier medium filled storage tank which is functionally connected to said flow circuitry, to increase the amount of thermal carrier medium and thermal capacity; and
adjusting the rate of flow to and from said storage tank with the control system.

21. Method according to claim 19, wherein the controller comprises an electronic controller.

22. Method according to claim 18 further comprising:
providing at least one at least partially thermal carrier medium filled storage tank which is functionally connected to said flow circuitry, to increase the amount of thermal carrier medium and thermal capacity; and adjusting the rate of flow to and from said storage tank with the control system.

23. Method according to claim 22, wherein the at least one at least partially filled thermal carrier medium storage tank comprises a first tank and a second tank, further comprising:

controlling, at least temporarily, with the control system, a temperature of said thermal carrier medium within the first tank at below an average temperature of said thermal carrier medium and at least one other of said at least partially filled thermal carrier medium storage tanks; and controlling, at least temporarily, with the control system, a temperature of said thermal carrier medium within the second tank at above the average temperature of said thermal carrier medium.

24. Method according to 23 further comprising one or more of:

(a) controlling with the controller, in response to an amount of primary irradiance that is sufficiently high that a resulting reduced energy gain to the thermal energy budget within said predominantly enclosed space serves to at least approximate the at least one target value:

(i) the flow of said thermal carrier medium at least in part from said first tank, to panels, which are at least partially facing in the direction of the primary electromagnetic radiation, to panels, which are predominantly shadowed from the primary electromagnetic radiation, and to said second tank; and (b) controlling with the controller, in response to an amount of primary irradiance that is sufficiently low that the resulting energy loss to the thermal energy budget within said predominantly enclosed space serves to approximate the at least one target value:

(i) the flow of said thermal carrier medium at least in part from said second tank to panels, which are predominantly exposed to the night sky to said first tank.

25. Method according to claim 18, further comprising undergoing at least one phase change of a molecular structure of at least one substance of the thermal carrier medium, at a temperature which is between a minimum and maximum operating temperature.

26. Method according to claim 16, further comprising undergoing at least one phase change of a molecular structure of at least one substance of the thermal carrier medium, at a temperature which is between a minimum and maximum operating temperature.

27. Method according to any one of claim 1, 2, 3, 16, 18, 19, 24, or 26, further comprising:

providing an electronic control system;

adjusting the spatial position of at least some of said functional elements with the electronic control system;

adjusting the flow and distribution of said thermal carrier medium in the panel;

acquiring with one or more of 0-, 1-, and 2-dimensional electronic sensors one or more of irradiance, directional, and temperature measurement signals of one or more of radiation sources or sinks, which are external to said predominantly closed space, and the direct environment of said predominantly closed space, and of said predominantly closed space itself, and of said functional elements, and, if present, of said thermal carrier medium, and, if present, of said thermal carrier medium filled panels, and, if present, of said thermal carrier medium filled tanks, and providing said signals as input to said control system, which uses said signals to approximate at least one control target, based on one or more of a local user input, a remote user input, a remote computer input, a preset value, a computed value.

28. Method according to claim 27 wherein said control system is configured to be at least temporarily connected to the internet, and performing one or more of the following with said control system:

sending status and performance data per email, enabling remote log-ins to display status and performance data on a remote computer or a remote mobile device, and enabling remote log-ins to manipulate the operation of said control system, including to change control target data, from a remote computer or a remote mobile device.

29. Method according to any one of claim 1 or 16, further comprising undergoing at least one phase change of a molecular structure of at least one material of said inner shell at a temperature which is between a minimum and maximum operating temperature.

30. Method according to claim 1, wherein said predominantly closed space is a building.

* * * * *